(12) United States Patent
Emura et al.

(10) Patent No.: US 10,800,487 B2
(45) Date of Patent: Oct. 13, 2020

(54) BICYCLE SPROCKET AND BICYCLE DRIVE TRAIN

(71) Applicant: SHIMANO INC., Sakai (JP)

(72) Inventors: Atsuhiro Emura, Sakai (JP); Yasufumi Fukunaga, Sakai (JP); Tsuyoshi Fukumori, Sakai (JP)

(73) Assignee: SHIMANO INC., Sakai (JP)

( * ) Notice: Subject to any disclaimer, the term of this patent is extended or adjusted under 35 U.S.C. 154(b) by 260 days.

(21) Appl. No.: 15/989,162

(22) Filed: May 24, 2018

(65) Prior Publication Data

US 2019/0359285 A1 Nov. 28, 2019

(51) Int. Cl.
*B62M 9/10* (2006.01)
*F16G 13/06* (2006.01)
*F16H 55/30* (2006.01)

(52) U.S. Cl.
CPC .............. *B62M 9/10* (2013.01); *F16G 13/06* (2013.01); *F16H 55/30* (2013.01)

(58) Field of Classification Search
CPC .......... B62M 9/10; B62M 9/12; B62M 9/122; F16H 55/30; F16G 13/06
USPC ....................................................... 474/160
See application file for complete search history.

(56) References Cited

U.S. PATENT DOCUMENTS

| | | | | |
|---|---|---|---|---|
| 4,889,521 A * | 12/1989 | Nagano | ................... | B62M 9/10 474/164 |
| 5,192,249 A * | 3/1993 | Nagano | ................... | B62M 9/10 474/160 |
| 6,013,001 A * | 1/2000 | Miyoshi | ................... | B62M 9/10 474/156 |
| 6,045,472 A * | 4/2000 | Sung | ........................ | B62M 9/10 474/158 |
| 6,139,456 A * | 10/2000 | Lii | ........................... | B62M 9/10 474/152 |
| 6,340,338 B1 * | 1/2002 | Kamada | ................... | B62M 9/10 474/152 |
| 6,958,026 B2 * | 10/2005 | Wang | ...................... | F16H 55/30 474/148 |
| 7,846,047 B2 * | 12/2010 | Nakano | ................... | B62M 9/10 474/152 |
| 7,846,048 B2 * | 12/2010 | Reiter | ..................... | B62M 9/10 474/158 |
| 7,871,347 B2 * | 1/2011 | Kamada | ................... | B62M 9/10 474/152 |

(Continued)

*Primary Examiner* — Henry Y Liu
(74) *Attorney, Agent, or Firm* — Mori & Ward, LLP

(57) ABSTRACT

A bicycle sprocket comprises a sprocket body, a plurality of sprocket teeth, and at least one upshifting facilitation area. The plurality of sprocket teeth extends radially outwardly from the sprocket body with respect to the rotational center axis. The plurality of sprocket teeth includes at least one axially recessed upshifting initiation tooth. The at least one axially recessed upshifting initiation tooth includes a driving surface, a non-driving surface and a tooth tip portion. The non-driving surface includes a non-driving surface protrusion disposed radially inwardly from a non-driving surface side tooth tip end with respect to a rotational center axis. The non-driving surface protrusion has a protrusion tip disposed closer to the second axially-facing surface than the non-driving-surface-side tooth tip end in the axial direction so that a guiding slope extends from the protrusion tip toward the first axially-facing surface.

13 Claims, 43 Drawing Sheets

(56) References Cited

U.S. PATENT DOCUMENTS

| | | | | |
|---|---|---|---|---|
| 7,959,529 B2* | 6/2011 | Braedt | ............... | B62M 9/10 |
| | | | | 474/152 |
| 8,066,603 B2* | 11/2011 | Braedt | ............... | B62M 9/10 |
| | | | | 474/160 |
| 8,226,511 B2* | 7/2012 | Kamada | ............... | B62M 9/10 |
| | | | | 474/152 |
| 8,517,874 B2* | 8/2013 | Reiter | ............... | B62M 9/10 |
| | | | | 474/160 |
| 9,334,014 B2* | 5/2016 | Fukunaga | ............... | B62M 9/10 |
| 9,376,165 B2* | 6/2016 | Oishi | ............... | B62M 9/10 |
| 9,463,844 B2* | 10/2016 | Fukunaga | ............... | B62M 9/10 |
| 9,915,336 B1* | 3/2018 | Fukunaga | ............... | B62M 9/10 |
| 9,926,038 B2* | 3/2018 | Fukunaga | ............... | B62M 9/10 |
| 10,378,638 B2* | 8/2019 | Chin | ............... | F16H 55/30 |

\* cited by examiner

|  | SP1 | SP2 | SP3 | SP4 | SP5 | SP6 | SP7 | SP8 | SP9 | SP10 | SP11 | SP12 |
|---|---|---|---|---|---|---|---|---|---|---|---|---|
| EMBODIMENT | 10 | 12 | 14 | 16 | 18 | 21 | 24 | 28 | 32 | 36 | 40 | 45 |
| MODIFICATION 1 | 10 | 12 | 14 | 16 | 18 | 21 | 24 | 28 | 33 | 39 | 45 | 51 |
| MODIFICATION 2 | 10 | 12 | 14 | 16 | 18 | 21 | 24 | 28 | 33 | 39 | 45 | — |

*FIG. 43*

BICYCLE SPROCKET AND BICYCLE DRIVE TRAIN

BACKGROUND OF THE INVENTION

Field of the Invention

The present invention relates to a bicycle sprocket and a bicycle drive train.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with a first aspect of the present invention, a bicycle sprocket comprises a sprocket body, a plurality of sprocket teeth, and at least one upshifting facilitation area. The sprocket body includes a first axially-facing surface and a second axially-facing surface which face in an axial direction with respect to a rotational center axis of the bicycle sprocket. The second axially-facing surface is provided on a reverse side of the first axially-facing surface in the axial direction. The first axially-facing surface is configured to face toward a center plane of a bicycle in an assembled state where the bicycle sprocket is mounted to the bicycle. The plurality of sprocket teeth extends radially outwardly from the sprocket body with respect to the rotational center axis. The at least one upshifting facilitation area is configured to facilitate shifting a bicycle chain from the bicycle sprocket toward a smaller sprocket adjacent to the bicycle sprocket without another sprocket therebetween in the axial direction. The plurality of sprocket teeth includes at least one axially recessed upshifting initiation tooth recessed axially with respect to the rotational center axis. The at least one axially recessed upshifting initiation tooth is disposed in the at least one upshifting facilitation area and is configured to disengage an inner link plate of the bicycle chain from the at least one axially recessed upshifting initiation tooth during an upshifting operation in which the bicycle chain shifts from the bicycle sprocket toward the smaller sprocket. The at least one axially recessed upshifting initiation tooth includes a driving surface, a non-driving surface and a tooth tip portion. The driving surface includes a driving-surface-side tooth tip end. The non-driving surface includes a non-driving-surface-side tooth tip end. The tooth tip portion connects the driving-surface-side tooth tip end and the non-driving-surface-side tooth tip end. The non-driving surface extends from the non-driving-surface-side tooth tip end in a circumferential direction with respect to the rotational center axis. The non-driving surface includes a non-driving surface protrusion disposed radially inwardly from the non-driving surface side tooth tip end with respect to the rotational center axis. The non-driving surface protrusion has a protrusion tip disposed closer to the second axially-facing surface than the non-driving-surface-side tooth tip end in the axial direction so that a guiding slope extends from the protrusion tip toward the first axially-facing surface.

With the bicycle sprocket according to the first aspect, the non-driving surface protrusion restricts the upshifting operation in a first chain-phase where a position of the at least one axially recessed upshifting initiation tooth corresponds to a position of an opposed pair of outer link plates of the bicycle chain. The non-driving surface protrusion allows the upshifting operation to perform in a second chain-phase where a position of the at least one axially recessed upshifting initiation tooth corresponds to a position of an opposed pair of inner link plates of the bicycle chain. Thus, it is possible to reduce a shock caused by the first chain-phase with maintaining shifting performance in the upshifting operation.

In accordance with a second aspect of the present invention, the bicycle sprocket according to the first aspect is configured so that the protrusion tip is disposed radially inwardly from the non-driving-surface-side tooth tip end with respect to the rotational center axis.

With the bicycle sprocket according to the second aspect, it is possible to further reduce a shock caused by the first chain-phase with maintaining shifting performance in the upshifting operation.

In accordance with a third aspect of the present invention, the bicycle sprocket according to the first or second aspect is configured so that the protrusion tip is disposed radially outwardly from a tooth bottom circle of the bicycle sprocket with respect to the rotational center axis.

With the bicycle sprocket according to the third aspect, it is possible to further reduce a shock caused by the first chain-phase with maintaining shifting performance in the upshifting operation.

In accordance with a fourth aspect of the present invention, the bicycle sprocket according to any one of the first to third aspects is configured so that the plurality of sprocket teeth includes a lastly chain-engaging tooth adjacent to the at least one axially recessed upshifting initiation tooth. The lastly chain-engaging tooth is disposed on a downstream side of the at least one axially recessed upshifting initiation tooth with respect to a rotational driving direction. The lastly chain-engaging tooth is configured to lastly disengage from an outer link plate of the bicycle chain in the upshifting operation.

With the bicycle sprocket according to the fourth aspect, it is possible to further reduce a shock caused by the first chain-phase with maintaining shifting performance in the upshifting operation.

In accordance with a fifth aspect of the present invention, the bicycle sprocket according to any one of the first to fourth aspects is configured so that the plurality of sprocket teeth includes at least one axially recessed tooth adjacent to the at least one axially recessed upshifting initiation tooth without another tooth in a circumferential direction with respect to the rotational center axis on an upstream side of the at least one axially recessed upshifting initiation tooth with respect to a rotational driving direction.

With the bicycle sprocket according to the fifth aspect, the at least one axially recessed upshifting initiation tooth and the axially recessed tooth make the upshifting operation smoother.

In accordance with a sixth aspect of the present invention, the bicycle sprocket according to any one of the first to fifth aspects is configured so that the at least one axially recessed upshifting initiation tooth includes a plurality of axially recessed upshifting initiation teeth.

With the bicycle sprocket according to the sixth aspect, the plurality of axially recessed upshifting initiation teeth enables a quick upshifting operation.

In accordance with a seventh aspect of the present invention, the bicycle sprocket according to any one of the first to fifth aspects is configured so that the at least one axially recessed upshifting initiation tooth includes a first axially recessed upshifting initiation tooth and a second axially recessed upshifting initiation tooth. A total tooth number of the bicycle sprocket is equal to or larger than 11.

With the bicycle sprocket according to the seventh aspect, it is possible to perform a driving efficient and quick upshifting operation.

In accordance with an eighth aspect of the present invention, the bicycle sprocket according to any one of the first to fifth aspects is configured so that the at least one axially recessed upshifting initiation tooth includes a first axially recessed upshifting initiation tooth, a second axially recessed upshifting initiation tooth, and a third axially recessed upshifting initiation tooth. A total tooth number of the bicycle sprocket is equal to or larger than 19.

With the bicycle sprocket according to the eighth aspect, it is possible to perform a driving efficient and quick upshifting operation in a middle-sized or larger sprocket.

In accordance with a ninth aspect of the present invention, the bicycle sprocket according to any one of the first to fifth aspects is configured so that the at least one axially recessed upshifting initiation tooth includes a first axially recessed upshifting initiation tooth, a second axially recessed upshifting initiation tooth, a third axially recessed upshifting initiation tooth, and a fourth axially recessed upshifting initiation tooth. A total tooth number of the bicycle sprocket is equal to or larger than 25.

With the bicycle sprocket according to the ninth aspect, it is possible to perform a driving efficient and quick upshifting operation in a large-sized or larger sprocket.

In accordance with a tenth aspect of the present invention, the bicycle sprocket according to any one of the first to fifth aspects is configured so that the at least one axially recessed upshifting initiation tooth includes a first axially recessed upshifting initiation tooth, a second axially recessed upshifting initiation tooth, a third axially recessed upshifting initiation tooth, a fourth axially recessed upshifting initiation tooth, and a fifth axially recessed upshifting initiation tooth. A total tooth number of the bicycle sprocket is equal to or larger than 41.

With the bicycle sprocket according to the tenth aspect, it is possible to perform a driving efficient and quick upshifting operation in a large-sized or larger sprocket.

In accordance with an eleventh aspect of the present invention, a bicycle drive train comprises the bicycle sprocket according to any one of the first to tenth aspects and a bicycle chain comprising an inner link plate. The inner link plate includes a first inner-link end portion, a second inner-link end portion, and an inner-link intermediate portion interconnecting the first inner-link end portion and the second inner-link end portion.

With the bicycle drive train according to the eleventh aspect, it is possible to further reduce a shock caused by the first chain-phase with maintaining shifting performance in the upshifting operation.

In accordance with a twelfth aspect of the present invention, the bicycle drive train according to the eleventh aspect is configured so that the first inner-link end portion has a first longitudinally elongated edge in a longitudinal direction with respect to a longitudinal centerline of the inner link plate. The first longitudinally elongated edge extends in a first longitudinal direction defined from the second inner-link end portion toward the first inner-link end portion along the longitudinal direction. The first longitudinally elongated edge is configured to support one of the plurality of sprocket teeth of the bicycle sprocket in the axial direction in an engagement state where the one of the plurality of sprocket teeth is positioned in an outer link space defined between a pair of outer link plates of the bicycle chain.

With the bicycle drive train according to the twelfth aspect, it is possible to reduce a shock caused by the first chain-phase with maintaining shifting performance in the upshifting operation. Furthermore, it is possible to improve chain-holding performance of the bicycle sprocket.

In accordance with a thirteenth aspect of the present invention, the bicycle drive train according to the twelfth aspect is configured so that the second inner-link end portion has a second longitudinally elongated edge in the longitudinal direction. The second longitudinally elongated edge extends in a second longitudinal direction defined from the first inner-link end portion toward the second inner-link end portion along the longitudinal direction. The second longitudinally elongated edge is configured to support one of the plurality of sprocket teeth of the bicycle sprocket in the axial direction in an engagement state where the one of the plurality of sprocket teeth is positioned in an outer link space defined between a pair of outer link plates of the bicycle chain.

With the bicycle drive train according to the thirteenth aspect, it is possible to reduce a shock caused by the first chain-phase with maintaining shifting performance in the upshifting operation. Furthermore, it is possible to improve chain-holding performance of the bicycle sprocket with improving assembling of the bicycle chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 43 is a list indicating a combination of total tooth numbers of the sprockets of the bicycle multiple sprocket and combinations of total tooth numbers of sprockets of bicycle multiple sprockets in accordance with modifications.

DESCRIPTION OF THE EMBODIMENTS

Figure 1:
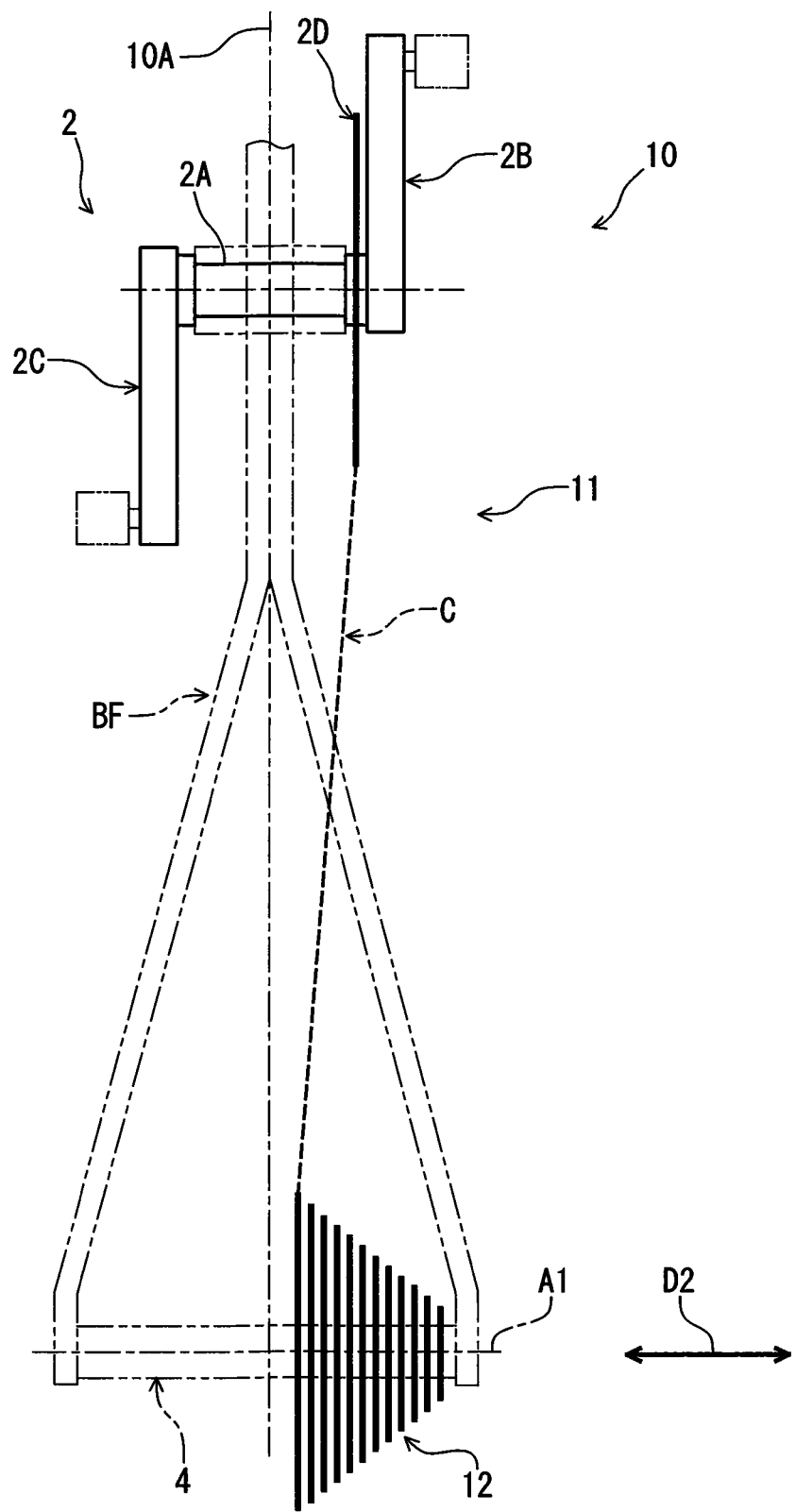
FIG. 1 is a schematic diagram of a bicycle including a bicycle drive train.

The embodiment(s) will now be described with reference to the accompanying drawings, wherein like reference numerals designate corresponding or identical elements throughout the various drawings.

Referring initially to FIG. 1, a bicycle 10 includes a bicycle frame BF and a bicycle drive train 11. The bicycle drive train 11 comprises a crank assembly 2, a hub assembly 4, a bicycle multiple sprocket 12, and a bicycle chain C. The bicycle multiple sprocket 12 is mounted on the hub assembly 4. The crank assembly 2 includes a crank axle 2A, a right crank arm 2B, a left crank arm 2C, and a front sprocket 2D. The right crank arm 2B and the left crank arm 2C are secured to the crank axle 2A. The front sprocket 2D is secured to at least one of the crank axle 2A and the right crank arm 2B. The bicycle chain C is engaged with the front sprocket 2D and the bicycle multiple sprocket 12 to transmit a pedaling force from the front sprocket 2D to the bicycle multiple sprocket 12. The crank assembly 2 includes the front sprocket 2D as a single sprocket in the illustrated embodiment. However, the crank assembly 2 can includes a plurality of front sprockets. The bicycle multiple sprocket 12 is a rear sprocket assembly. However, structures of the bicycle multiple sprocket 12 can be applied to the front sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle multiple sprocket 12, should be interpreted relative to the bicycle equipped with the bicycle multiple sprocket 12 as used in an upright riding position on a horizontal surface.

Figure 2:
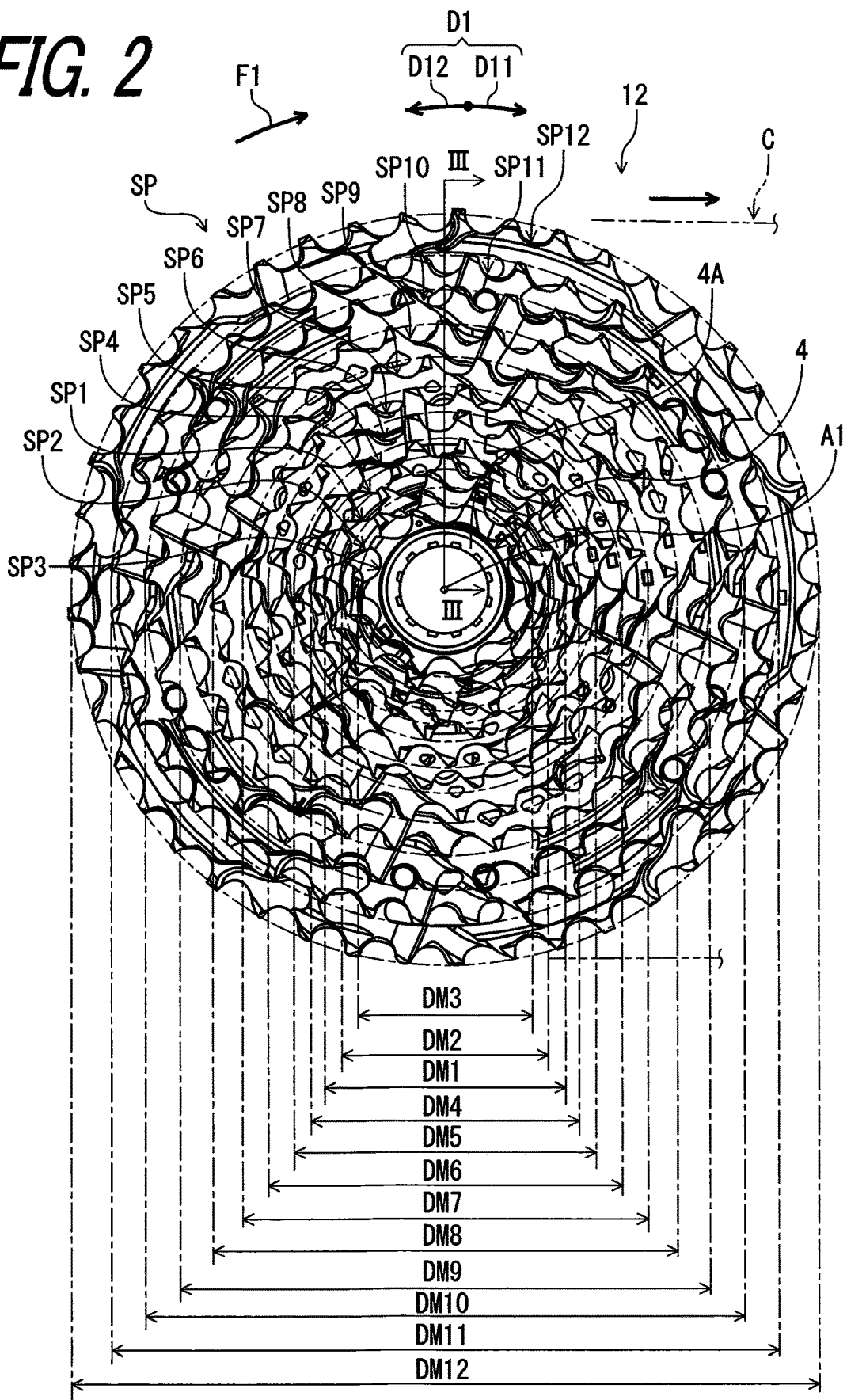
FIG. 2 is a side elevational view of a bicycle multiple sprocket of the bicycle drive train illustrated in FIG. 1.

As seen in FIG. 2, the bicycle multiple sprocket 12 has a rotational center axis A1. The bicycle multiple sprocket 12 is rotatably supported by the hub assembly 4 relative to the bicycle frame BF (FIG. 1) about the rotational center axis A1. The bicycle multiple sprocket 12 is secured to a sprocket support body of the hub assembly 4 with a lock member 4A. The bicycle multiple sprocket 12 is configured to be engaged with the bicycle chain C to transmit a driving rotational force F1 between the bicycle chain C and the bicycle multiple sprocket 12 during pedaling. The bicycle multiple sprocket 12 is rotated about the rotational center axis A1 in a rotational driving direction D11 during pedaling. The rotational driving direction D11 is defined along a circumferential direction D1 with respect to the rotational center axis A1 of the bicycle multiple sprocket 12. A reverse rotational direction D12 is an opposite direction of the rotational driving direction D11 and is defined along the circumferential direction D1.

The bicycle multiple sprocket 12 comprises a plurality of sprockets SP. The plurality of sprockets SP includes a first sprocket SP1 and a second sprocket SP2. The plurality of sprockets SP includes third to twelfth sprockets SP3 to SP12. The first to twelfth sprockets SP1 to SP12 can also be respectively referred to as bicycle sprockets SP1 to SP12. Thus, the bicycle drive train 11 comprises the bicycle sprocket and the bicycle chain C. The total number of the sprockets SP is equal to or larger than 10. The total number of the sprockets SP is preferably equal to or larger than 11. The total number of the sprockets SP is more preferably equal to or larger than 12. In this embodiment, a total number of the sprockets SP is 12. However, the total number of the sprockets SP is not limited to this embodiment and the above ranges.

In this embodiment, the sprocket SP12 is the largest sprocket in the bicycle multiple sprocket 12. The third sprocket SP3 is the smallest sprocket in the bicycle multiple sprocket 12. The first sprocket SP1 has a first maximum outer diameter DM1. The second sprocket SP2 has a second maximum outer diameter DM2 that is smaller than the first maximum outer diameter DM1. The third sprocket SP3 has a third maximum outer diameter DM3 that is smaller than the second maximum outer diameter DM2. The fourth to twelfth sprockets SP4 to SP12 respectively have fourth maximum outer diameter DM4 to twelfth maximum outer diameter DM12. The third maximum outer diameter DM3 is the smallest among the first to twelfth maximum outer diameters DM1 to DM12. The twelfth maximum outer diameter DM12 is the largest among the first to twelfth maximum outer diameters DM1 to DM12. The dimensional relationship among the sprockets SP1 to SP12 is not limited to this embodiment.

Figure 3:
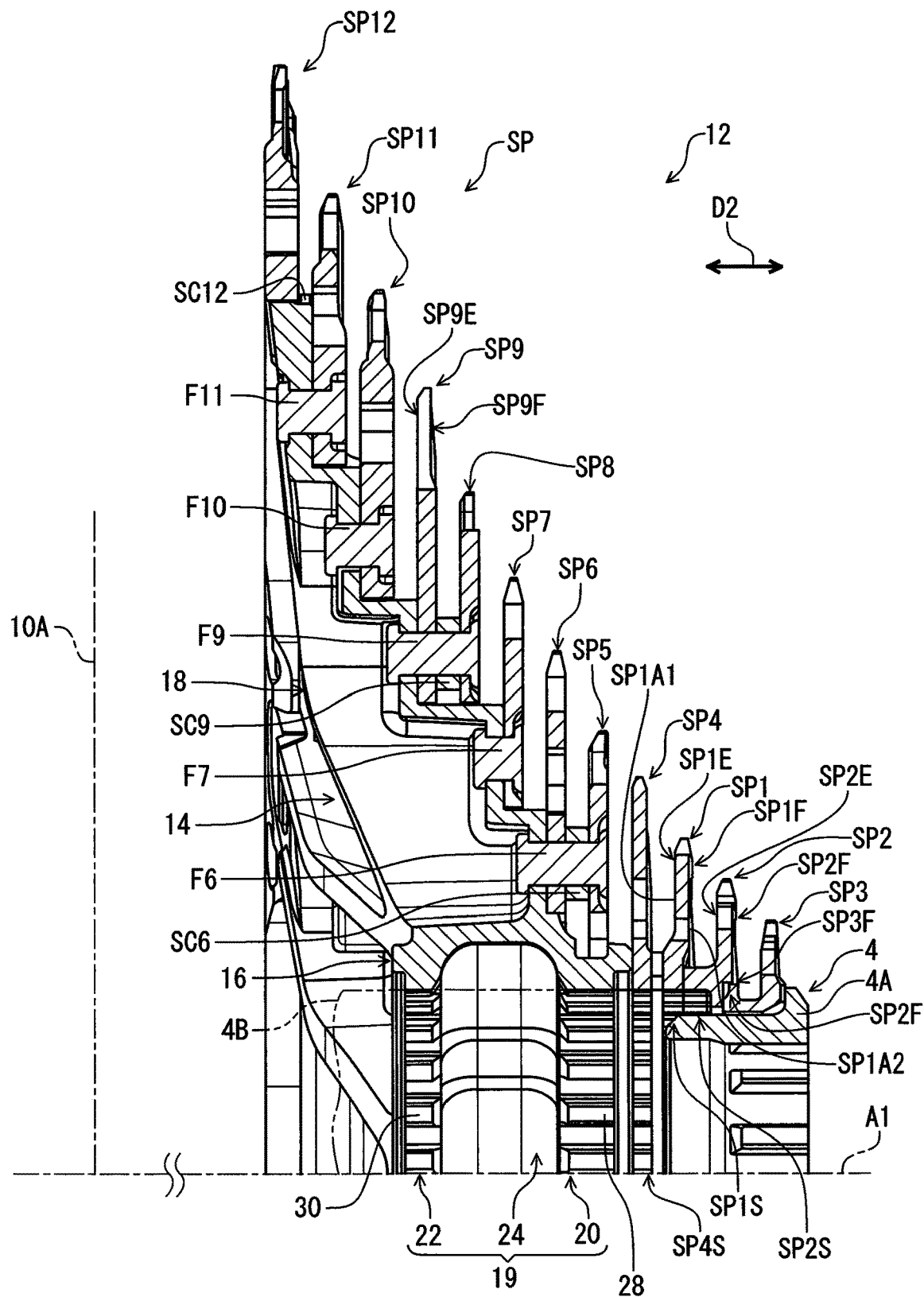
FIG. 3 is a cross-sectional view of the bicycle multiple sprocket taken along line III-III of FIG. 2.

As seen in FIG. 3, the second sprocket SP2 is adjacent to the first sprocket SP1 without another sprocket therebetween in an axial direction D2 with respect to the rotational center axis A1. The axial direction D2 is parallel to the rotational center axis A1. The third sprocket SP3 is adjacent to the second sprocket SP2 without another sprocket therebetween in the axial direction D2. The third, second first, and fourth to twelfth sprockets SP3, SP2, SP1, and SP4 to SP12 are arranged in the axial direction D2 in this order. The sprockets SP1 to SP12 are separate members from each other. However, at least two of the sprockets SP1 to SP12 can be at least partly provided integrally with each other as a one-piece unitary member. The sprockets SP1 to SP12 are made of a metallic material such as titanium or aluminum. However, materials of the sprockets SP1 to SP12 are not limited to this embodiment. At least one of the sprockets SP1 to SP12 can be made of another metallic material or a non-metallic material. At least one of the sprockets SP1 to SP12 can have a composite structure made of a plurality of materials that are different from each other.

Figure 4:
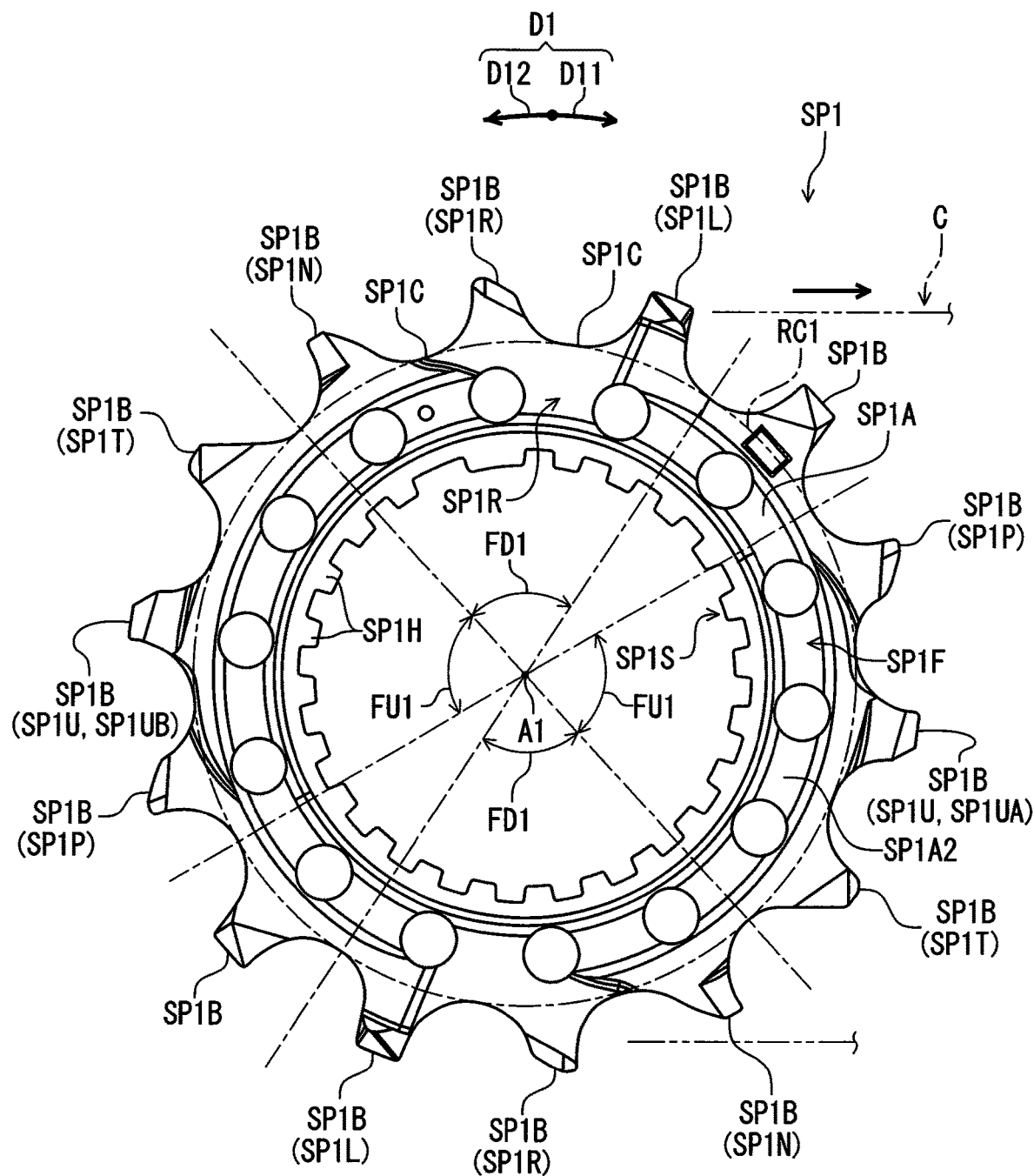
FIG. 4 is a side elevational view of a sprocket of the bicycle multiple sprocket illustrated in FIG. 2.

As seen in FIG. 4, the first sprocket SP1 includes a first sprocket body SP1A and a plurality of first sprocket teeth SP1B. The plurality of first sprocket teeth SP1B extends radially outwardly from the first sprocket body SP1A with respect to the rotational center axis A1 of the bicycle multiple sprocket 12. The first sprocket SP1 can also be referred to as a bicycle sprocket SP1. The first sprocket body SP1A can also be referred to as a sprocket body SP1A. The plurality of first sprocket teeth SP1B can also be referred to as a plurality of sprocket teeth SP1B. Namely, the bicycle sprocket SP1 comprises the sprocket body SP1A and the plurality of sprocket teeth SP1B. The plurality of sprocket teeth SP1B extends radially outwardly from the sprocket body SP1A with respect to the rotational center axis A1.

The first sprocket SP1 includes a plurality of tooth bottoms SP1C. The tooth bottom SP1C is provided between adjacent two of the sprocket teeth SP1B. The first sprocket SP1 has a tooth bottom circle RC1 defined by the plurality of tooth bottoms SP1C. A total tooth number of the bicycle sprocket SP1 (a total number of the plurality of sprocket teeth SP1B) is equal to or larger than 11. In this embodiment, the total tooth number of the first sprocket SP1 is 14. However, the total number of the plurality of sprocket tooth SP1B of the first sprocket SP1 is not limited to this embodiment.

The first sprocket SP1 includes at least one first downshifting facilitation area FD1 configured to facilitate shifting the bicycle chain C from the second sprocket SP2 (FIG. 3) toward the first sprocket SP1. The bicycle sprocket SP1 comprises at least one upshifting facilitation area FU1 configured to facilitate shifting the bicycle chain C from the bicycle sprocket SP1 toward the smaller sprocket SP2 (FIG. 3) adjacent to the bicycle sprocket SP1 without another sprocket therebetween in the axial direction D2. In this embodiment, the first sprocket SP1 includes a plurality of downshifting facilitation areas FD1 and a plurality of upshifting facilitation areas FU1. In this embodiment, the first sprocket SP1 includes two downshifting facilitation areas FD1 and two upshifting facilitation areas FU1. However, a total number of the downshifting facilitation areas FD1 is not limited to this embodiment. The total number of the upshifting facilitation areas FU1 is not limited to this embodiment.

Figure 5:
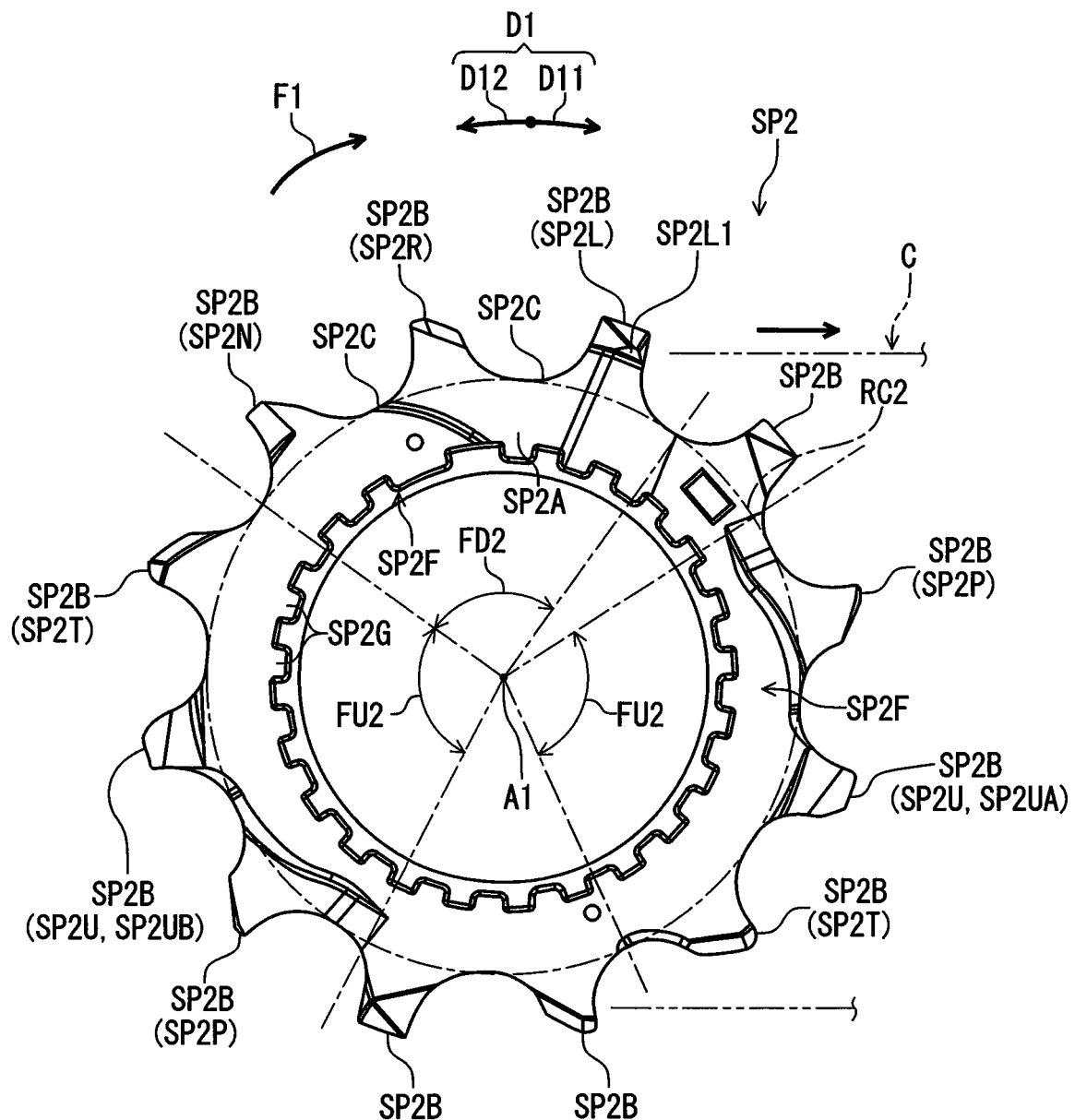
FIG. 5 is a side elevational view of a sprocket of the bicycle multiple sprocket illustrated in FIG. 2.

As seen in FIG. 5, the second sprocket SP2 includes a second sprocket body SP2A and a plurality of second sprocket teeth SP2B. The plurality of second sprocket teeth SP2B extends radially outwardly from the second sprocket body SP2A with respect to the rotational center axis A1. The second sprocket SP2 can also be referred to as a bicycle sprocket SP2. The second sprocket body SP2A can also be referred to as a sprocket body SP2A. The plurality of second sprocket teeth SP2B can also be referred to as a plurality of sprocket teeth SP2B. Namely, the bicycle sprocket SP2 comprises the sprocket body SP2A and the plurality of sprocket teeth SP2B. The plurality of sprocket teeth SP2B extends radially outwardly from the sprocket body SP2A with respect to the rotational center axis A1.

The second sprocket SP2 includes a plurality of tooth bottoms SP2C. The tooth bottom SP2C is provided between adjacent two of the sprocket teeth SP2B. The second sprocket SP2 has a tooth bottom circle RC2 defined by the plurality of tooth bottoms SP2C. A total tooth number of the bicycle sprocket SP2 (a total number of the plurality of sprocket teeth SP2B) is equal to or larger than 11. In this embodiment, the total tooth number of the second sprocket SP2 is 12. However, the total number of the plurality of sprocket tooth SP2B of the second sprocket SP2 is not limited to this embodiment.

The sprocket SP2 includes at least one downshifting facilitation area FD2 configured to facilitate shifting the bicycle chain C from the smaller sprocket SP3 toward the sprocket SP2. The sprocket SP2 comprises at least one upshifting facilitation area FU2 configured to facilitate shifting the bicycle chain C from the sprocket SP2 toward the smaller sprocket SP3. In this embodiment, the second sprocket SP2 includes one downshifting facilitation area FD2 and a plurality of upshifting facilitation areas FU2. In this embodiment, the second sprocket SP2 includes two upshifting facilitation areas FU2. However, a total number of the downshifting facilitation areas FD2 is not limited to this embodiment. The total number of the upshifting facilitation areas FU2 is not limited to this embodiment.

As seen in FIG. 3, the first sprocket SP1 has a first bicycle-inboard surface SP1E and a first bicycle-outboard surface SP1F provided on a reverse side of the first bicycle-inboard surface SP1E in the axial direction D2. The second sprocket SP2 has a second bicycle-inboard surface SP2E and a second bicycle-outboard surface SP2F provided on a reverse side of the second bicycle-inboard surface SP2E in the axial direction D2. The first bicycle-outboard surface SP1F and the second bicycle-inboard surface SP2E face each other in the axial direction D2. The first bicycle-inboard surface SP1E is configured to face toward a center plane 10A (FIG. 1) of the bicycle 10 in an assembled state where the bicycle sprocket SP1 is mounted to the bicycle 10. The second bicycle-inboard surface SP2E is configured to face toward the center plane 10A (FIG. 1) of the bicycle 10 in the assembled state where the bicycle sprocket SP1 is mounted to the bicycle 10.

The sprocket body SP1A includes a first axially-facing surface SP1A1 and a second axially-facing surface SP1A2 which face in the axial direction D2 with respect to the rotational center axis A1 of the bicycle sprocket SP1. The second axially-facing surface SP1A2 is provided on a reverse side of the first axially-facing surface SP1A1 in the axial direction D2. The first axially-facing surface SP1A1 is configured to face toward the center plane 10A (FIG. 1) of the bicycle 10 in the assembled state where the bicycle sprocket SP1 is mounted to the bicycle 10.

Figure 6:
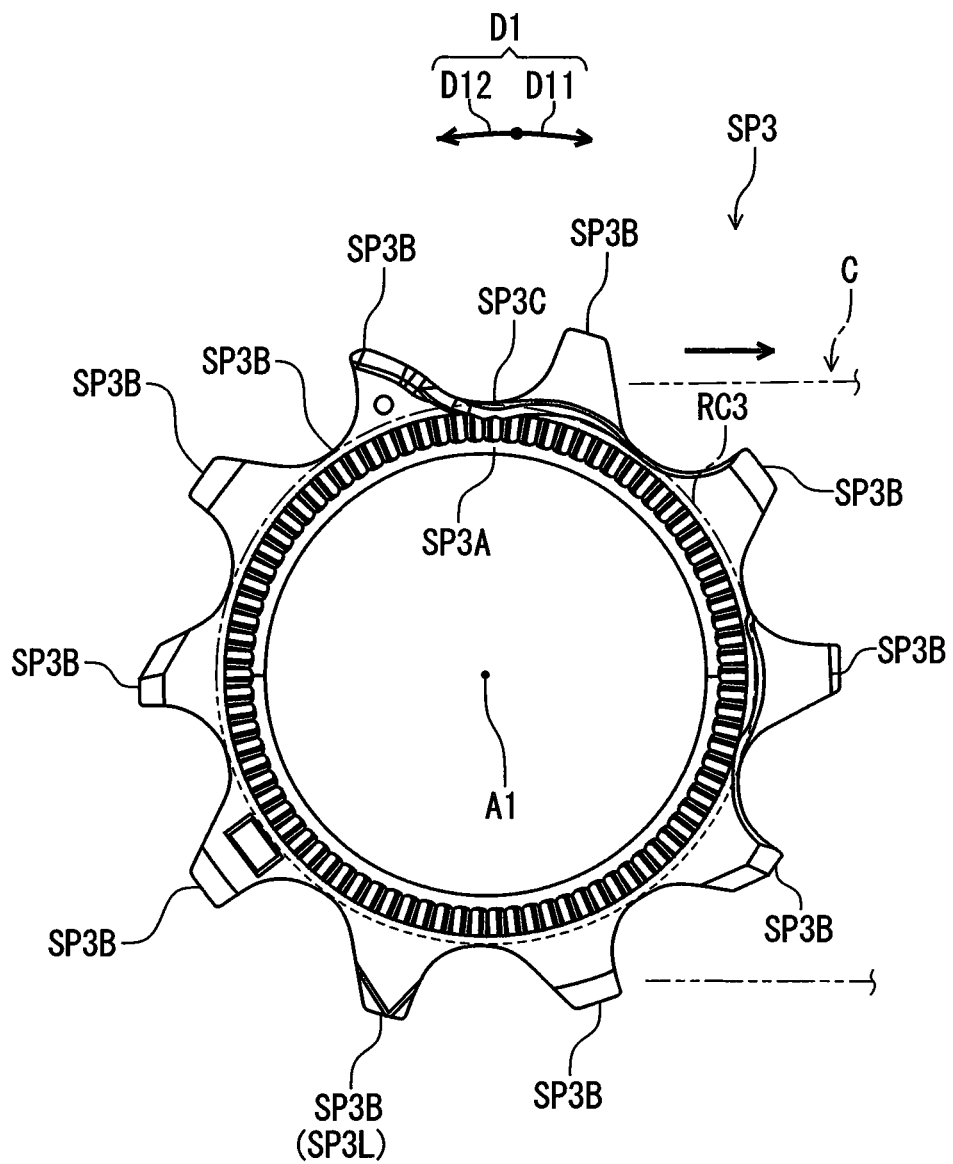
FIG. 6 is a side elevational view of a sprocket of the bicycle multiple sprocket illustrated in FIG. 2.

As seen in FIG. 6, the third sprocket SP3 includes a third sprocket body SP3A and a plurality of third sprocket teeth SP3B. The plurality of third sprocket teeth SP3B extends radially outwardly from the third sprocket body SP3A with respect to the rotational center axis A1. The third sprocket SP3 includes a plurality of tooth bottoms SP3C. The tooth bottom SP3C is provided between adjacent two of the sprocket teeth SP3B. The third sprocket SP3 has a tooth bottom circle RC3 defined by the plurality of tooth bottoms SP3C. A total tooth number of the third sprocket SP3 (a total number of the plurality of sprocket teeth SP3B) is 10. However, the total number of the plurality of sprocket tooth SP3B of the third sprocket SP3 is not limited to this embodiment.

Figure 7:
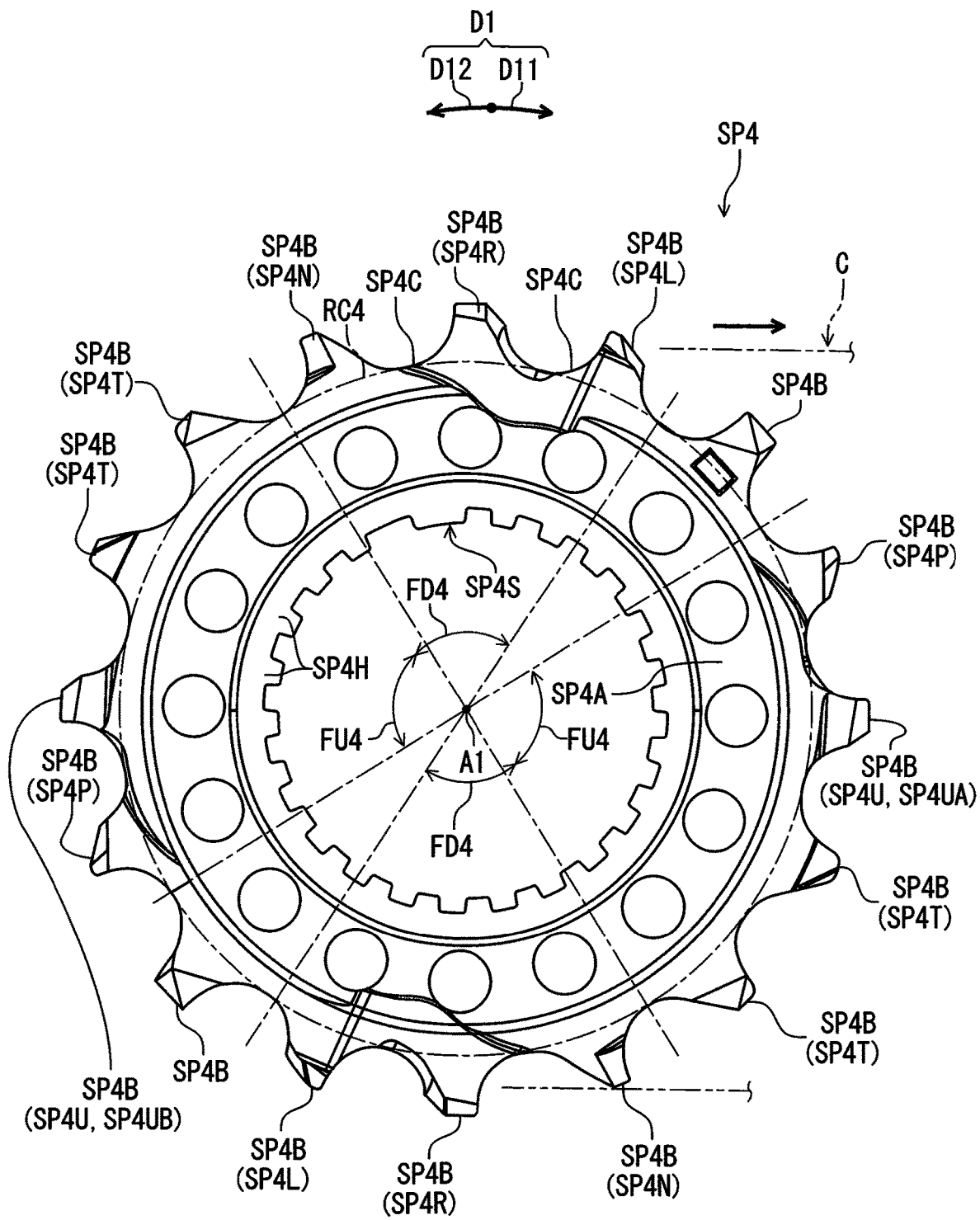
FIG. 7 is a side elevational view of a sprocket of the bicycle multiple sprocket illustrated in FIG. 2.

As seen in FIG. 7, the fourth sprocket SP4 includes a fourth sprocket body SP4A and a plurality of fourth sprocket teeth SP4B. The plurality of fourth sprocket teeth SP4B extends radially outwardly from the fourth sprocket body SP4A with respect to the rotational center axis A1. The fourth sprocket SP4 includes a plurality of tooth bottoms SP4C. The tooth bottom SP4C is provided between adjacent two of the sprocket teeth SP4B. The fourth sprocket SP4 has a tooth bottom circle RC4 defined by the plurality of tooth bottoms SP4C. A total tooth number of the bicycle sprocket SP4 (a total number of the plurality of sprocket teeth SP4B) is equal to or larger than 11. In this embodiment, the total tooth number of the fourth sprocket SP4 is 16. However, the total number of the plurality of sprocket tooth SP4B of the fourth sprocket SP4 is not limited to this embodiment.

The sprocket SP4 includes at least one downshifting facilitation area FD4 configured to facilitate shifting the bicycle chain C from the smaller sprocket SP1 toward the sprocket SP4. The sprocket SP4 comprises at least one upshifting facilitation area FU4 configured to facilitate shifting the bicycle chain C from the sprocket SP4 toward the smaller sprocket SP1. In this embodiment, the second sprocket SP4 includes a plurality of downshifting facilitation areas FD4 and a plurality of upshifting facilitation areas FU4. In this embodiment, the second sprocket SP4 includes two downshifting facilitation areas FD4 and two upshifting facilitation areas FU4. However, a total number of the downshifting facilitation areas FD4 is not limited to this embodiment. The total number of the upshifting facilitation areas FU4 is not limited to this embodiment.

Figure 8:
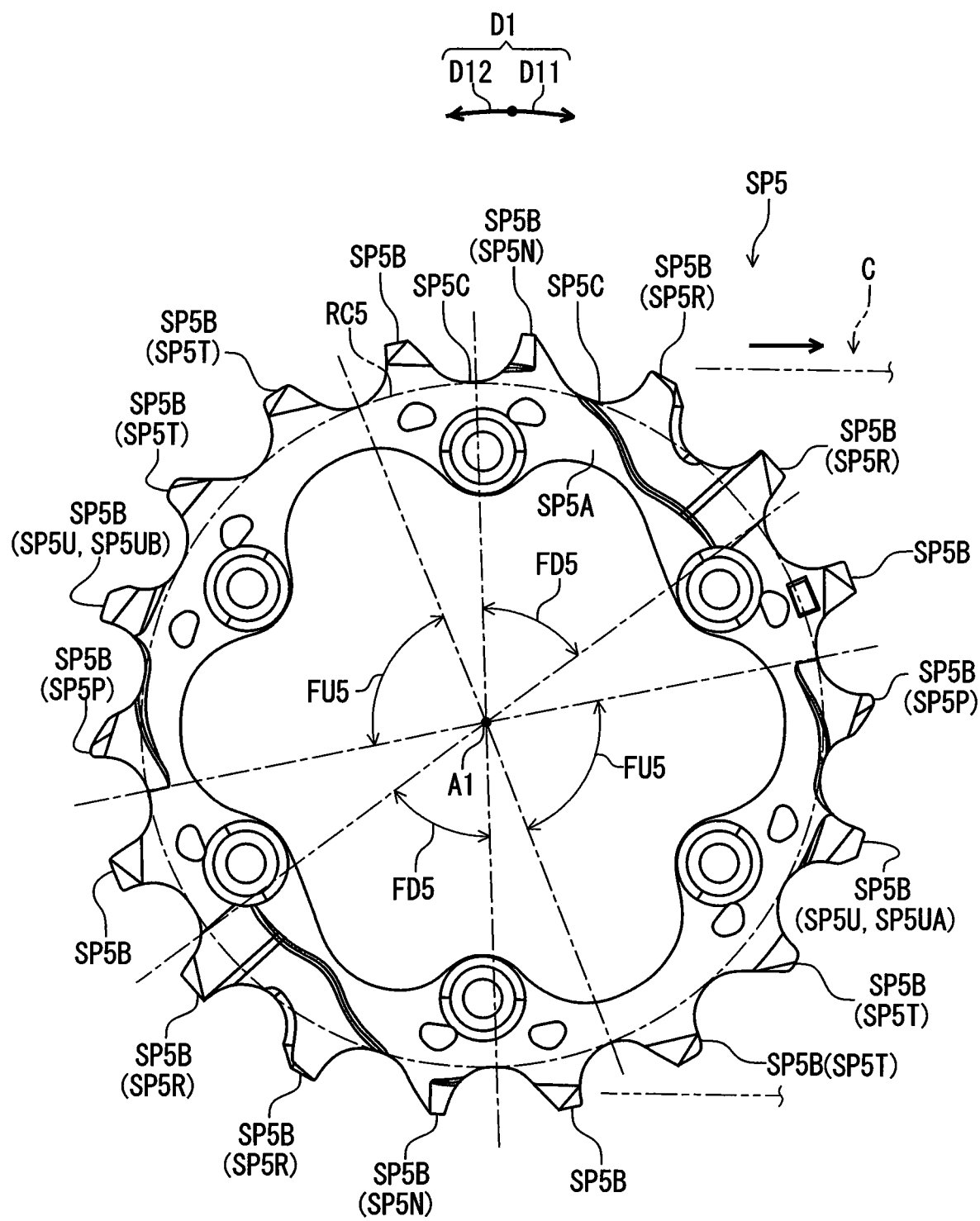
FIG. 8 is a side elevational view of a sprocket of the bicycle multiple sprocket illustrated in FIG. 2.

As seen in FIG. 8, the fifth sprocket SP5 includes a fifth sprocket body SP5A and a plurality of fifth sprocket teeth SP5B. The plurality of fifth sprocket teeth SP5B extends radially outwardly from the fifth sprocket body SP5A with respect to the rotational center axis A1. The fifth sprocket SP5 includes a plurality of tooth bottoms SP5C. The tooth bottom SP5C is provided between adjacent two of the sprocket teeth SP5B. The fifth sprocket SP5 has a tooth bottom circle RC5 defined by the plurality of tooth bottoms SP5C. A total tooth number of the bicycle sprocket SP5 (a total number of the plurality of sprocket teeth SP5B) is equal to or larger than 11. In this embodiment, the total tooth number of the fifth sprocket SP5 is 18. However, the total number of the plurality of sprocket tooth SP5B of the fifth sprocket SP5 is not limited to this embodiment.

The sprocket SP5 includes at least one downshifting facilitation area FD5 configured to facilitate shifting the bicycle chain C from the smaller sprocket SP4 toward the sprocket SP5. The sprocket SP5 comprises at least one upshifting facilitation area FU5 configured to facilitate shifting the bicycle chain C from the sprocket SP5 toward the smaller sprocket SP4. In this embodiment, the second sprocket SP5 includes a plurality of downshifting facilitation areas FD5 and a plurality of upshifting facilitation areas FU5. In this embodiment, the second sprocket SP5 includes two downshifting facilitation areas FD5 and two upshifting facilitation areas FU5. However, a total number of the downshifting facilitation areas FD5 is not limited to this embodiment. The total number of the upshifting facilitation areas FU5 is not limited to this embodiment.

Figure 9:
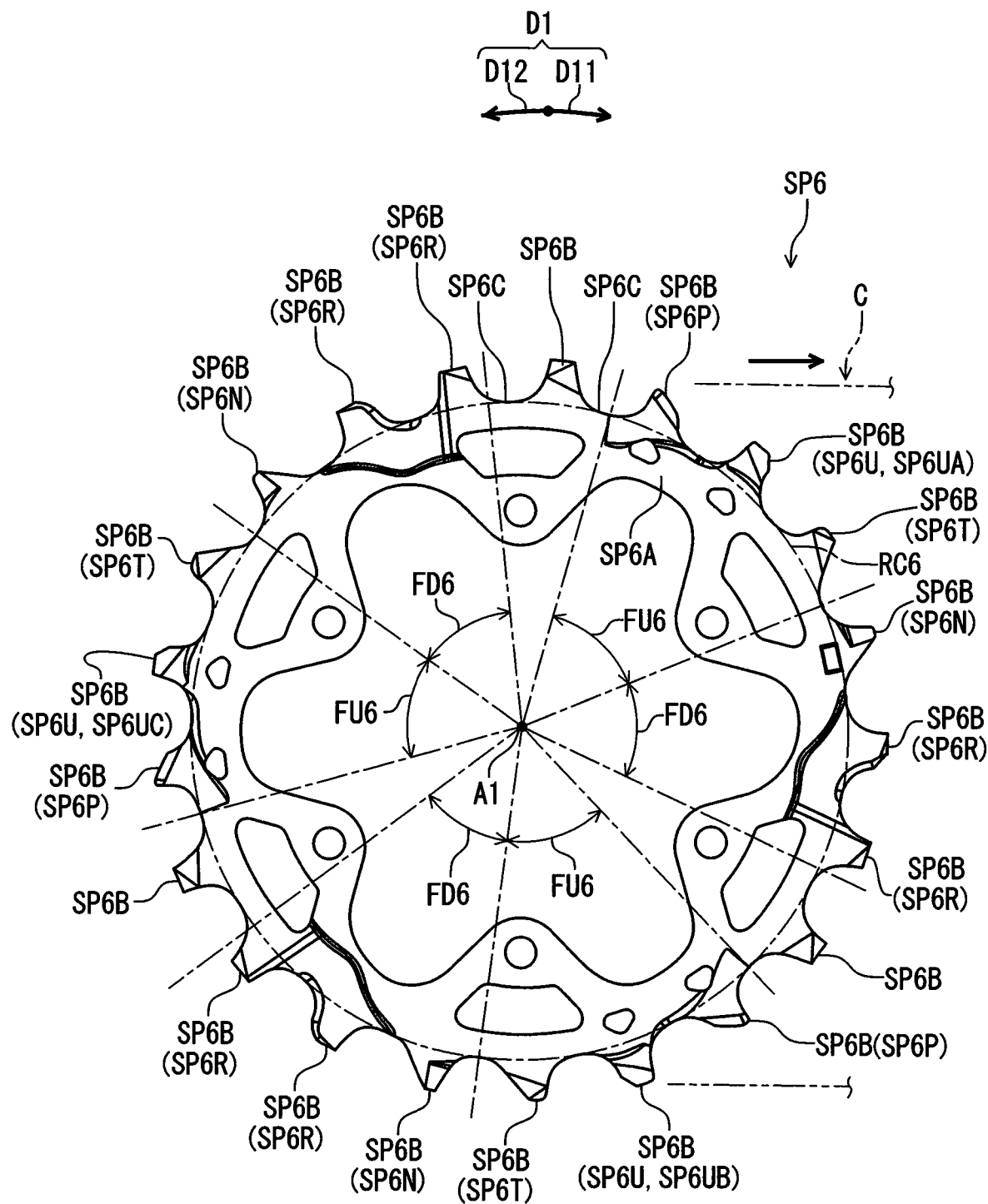
FIG. 9 is a side elevational view of a sprocket of the bicycle multiple sprocket illustrated in FIG. 2.

As seen in FIG. 9, the sixth sprocket SP6 includes a sixth sprocket body SP6A and a plurality of sixth sprocket teeth SP6B. The plurality of sixth sprocket teeth SP6B extends radially outwardly from the sixth sprocket body SP6A with respect to the rotational center axis A1. The sixth sprocket SP6 includes a plurality of tooth bottoms SP6C. The tooth bottom SP6C is provided between adjacent two of the sprocket teeth SP6B. The sixth sprocket SP6 has a tooth bottom circle RC6 defined by the plurality of tooth bottoms SP6C. A total tooth number of the bicycle sprocket SP6 (a total number of the plurality of sprocket teeth SP6B) is equal to or larger than 19. In this embodiment, the total tooth number of the sixth sprocket SP6 is 21. However, the total number of the plurality of sprocket tooth SP6B of the sixth sprocket SP6 is not limited to this embodiment.

The sprocket SP6 includes at least one downshifting facilitation area FD6 configured to facilitate shifting the bicycle chain C from the smaller sprocket SP5 toward the sprocket SP6. The sprocket SP6 comprises at least one upshifting facilitation area FU6 configured to facilitate shifting the bicycle chain C from the sprocket SP6 toward the smaller sprocket SP5. In this embodiment, the second sprocket SP6 includes a plurality of downshifting facilitation areas FD6 and a plurality of upshifting facilitation areas FU6. In this embodiment, the second sprocket SP6 includes three downshifting facilitation areas FD6 and three upshifting facilitation areas FU6. However, a total number of the downshifting facilitation areas FD6 is not limited to this embodiment. The total number of the upshifting facilitation areas FU6 is not limited to this embodiment.

Figure 10:
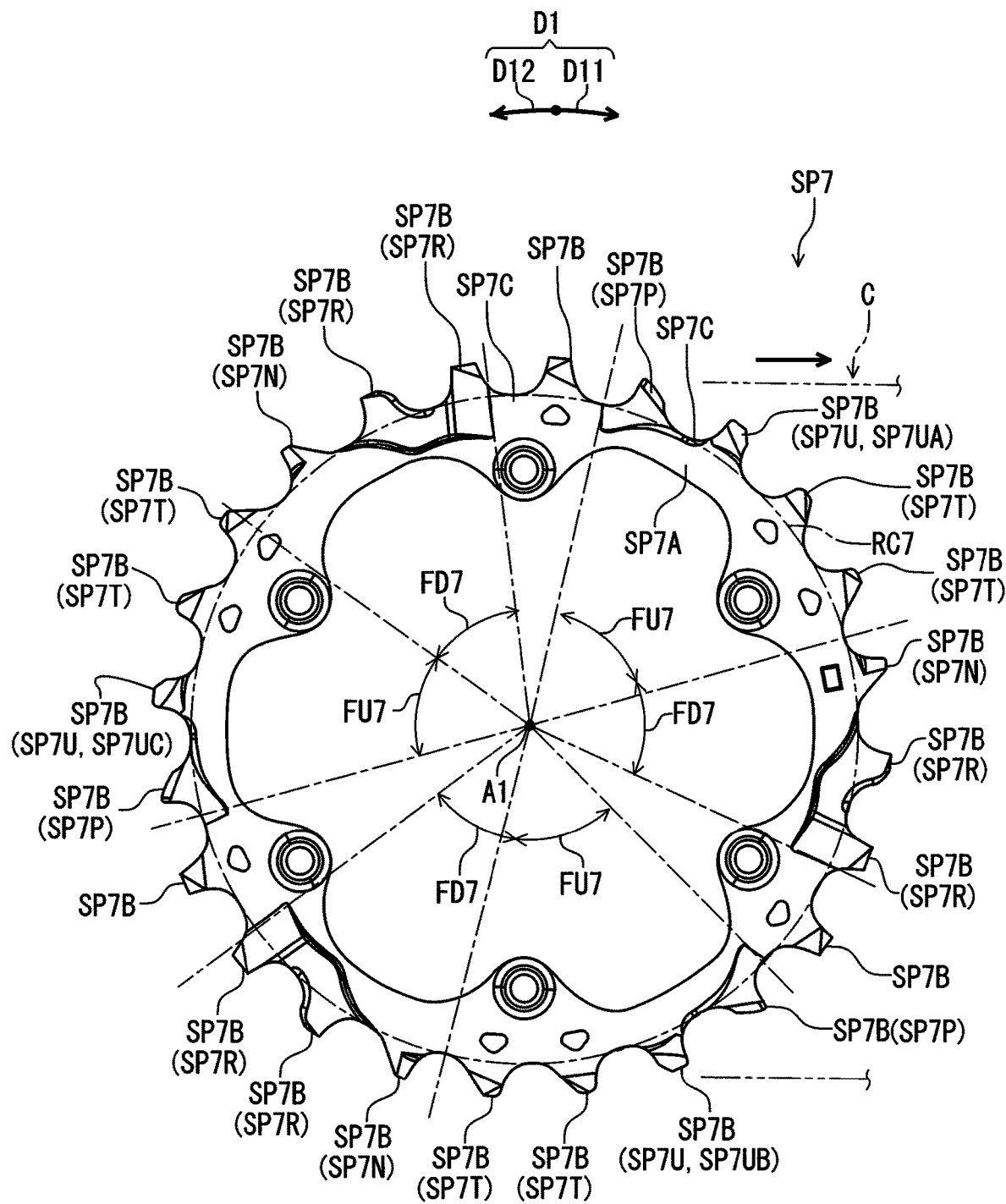
FIG. 10 is a side elevational view of a sprocket of the bicycle multiple sprocket illustrated in FIG. 2.

As seen in FIG. 10, the seventh sprocket SP7 includes a seventh sprocket body SP7A and a plurality of seventh sprocket teeth SP7B. The plurality of seventh sprocket teeth SP7B extends radially outwardly from the seventh sprocket body SP7A with respect to the rotational center axis A1. The seventh sprocket SP7 includes a plurality of tooth bottoms SP7C. The tooth bottom SP7C is provided between adjacent two of the sprocket teeth SP7B. The seventh sprocket SP7 has a tooth bottom circle RC7 defined by the plurality of tooth bottoms SP7C. A total tooth number of the bicycle sprocket SP7 (a total number of the plurality of sprocket teeth SP7B) is equal to or larger than 19. In this embodiment, the total tooth number of the seventh sprocket SP7 is 24. However, the total number of the plurality of sprocket tooth SP7B of the seventh sprocket SP7 is not limited to this embodiment.

The sprocket SP7 includes at least one downshifting facilitation area FD7 configured to facilitate shifting the bicycle chain C from the smaller sprocket SP6 toward the sprocket SP7. The sprocket SP7 comprises at least one upshifting facilitation area FU7 configured to facilitate shifting the bicycle chain C from the sprocket SP7 toward the smaller sprocket SP6. In this embodiment, the second sprocket SP7 includes a plurality of downshifting facilitation areas FD7 and a plurality of upshifting facilitation areas FU7. In this embodiment, the second sprocket SP7 includes three downshifting facilitation areas FD7 and three upshifting facilitation areas FU7. However, a total number of the downshifting facilitation areas FD7 is not limited to this embodiment. The total number of the upshifting facilitation areas FU7 is not limited to this embodiment.

Figure 11:
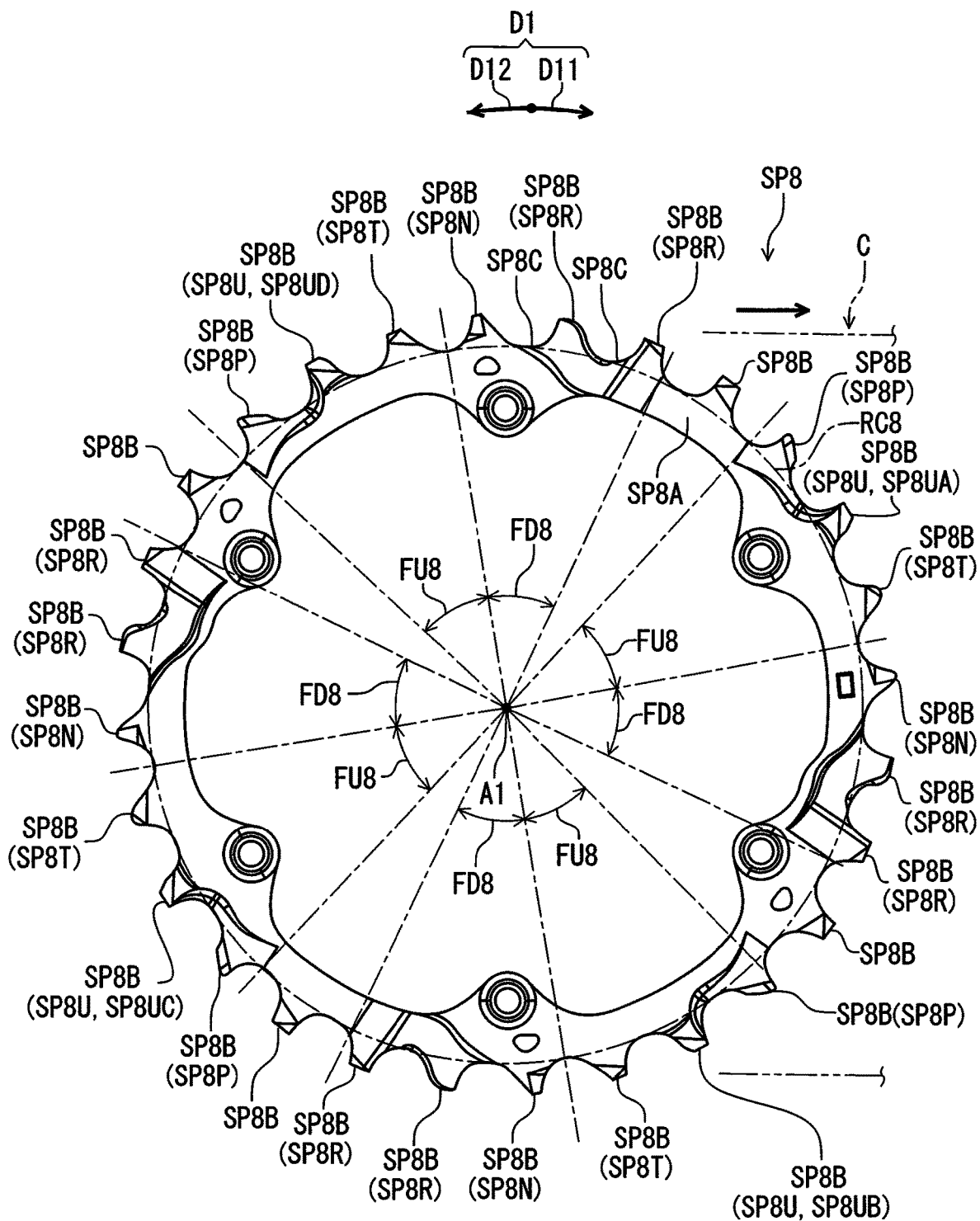
FIG. 11 is a side elevational view of a sprocket of the bicycle multiple sprocket illustrated in FIG. 2.

As seen in FIG. 11, the eighth sprocket SP8 includes an eighth sprocket body SP8A and a plurality of eighth sprocket teeth SP8B. The plurality of eighth sprocket teeth SP8B extends radially outwardly from the eighth sprocket body SP8A with respect to the rotational center axis A1. The eighth sprocket SP8 includes a plurality of tooth bottoms SP8C. The tooth bottom SP8C is provided between adjacent two of the sprocket teeth SP8B. The eighth sprocket SP8 has a tooth bottom circle RC8 defined by the plurality of tooth bottoms SP8C. A total tooth number of the bicycle sprocket SP8 (a total number of the plurality of sprocket teeth SP8B) is equal to or larger than 25. In this embodiment, the total tooth number of the eighth sprocket SP8 is 28. However, the total number of the plurality of sprocket tooth SP8B of the eighth sprocket SP8 is not limited to this embodiment.

The sprocket SP8 includes at least one downshifting facilitation area FD8 configured to facilitate shifting the bicycle chain C from the smaller sprocket SP7 toward the sprocket SP8. The sprocket SP8 comprises at least one upshifting facilitation area FU8 configured to facilitate shifting the bicycle chain C from the sprocket SP8 toward the smaller sprocket SP7. In this embodiment, the second sprocket SP8 includes a plurality of downshifting facilitation areas FD8 and a plurality of upshifting facilitation areas FU8. In this embodiment, the second sprocket SP8 includes four downshifting facilitation areas FD8 and four upshifting facilitation areas FU8. However, a total number of the downshifting facilitation areas FD8 is not limited to this embodiment. The total number of the upshifting facilitation areas FU8 is not limited to this embodiment.

Figure 12:
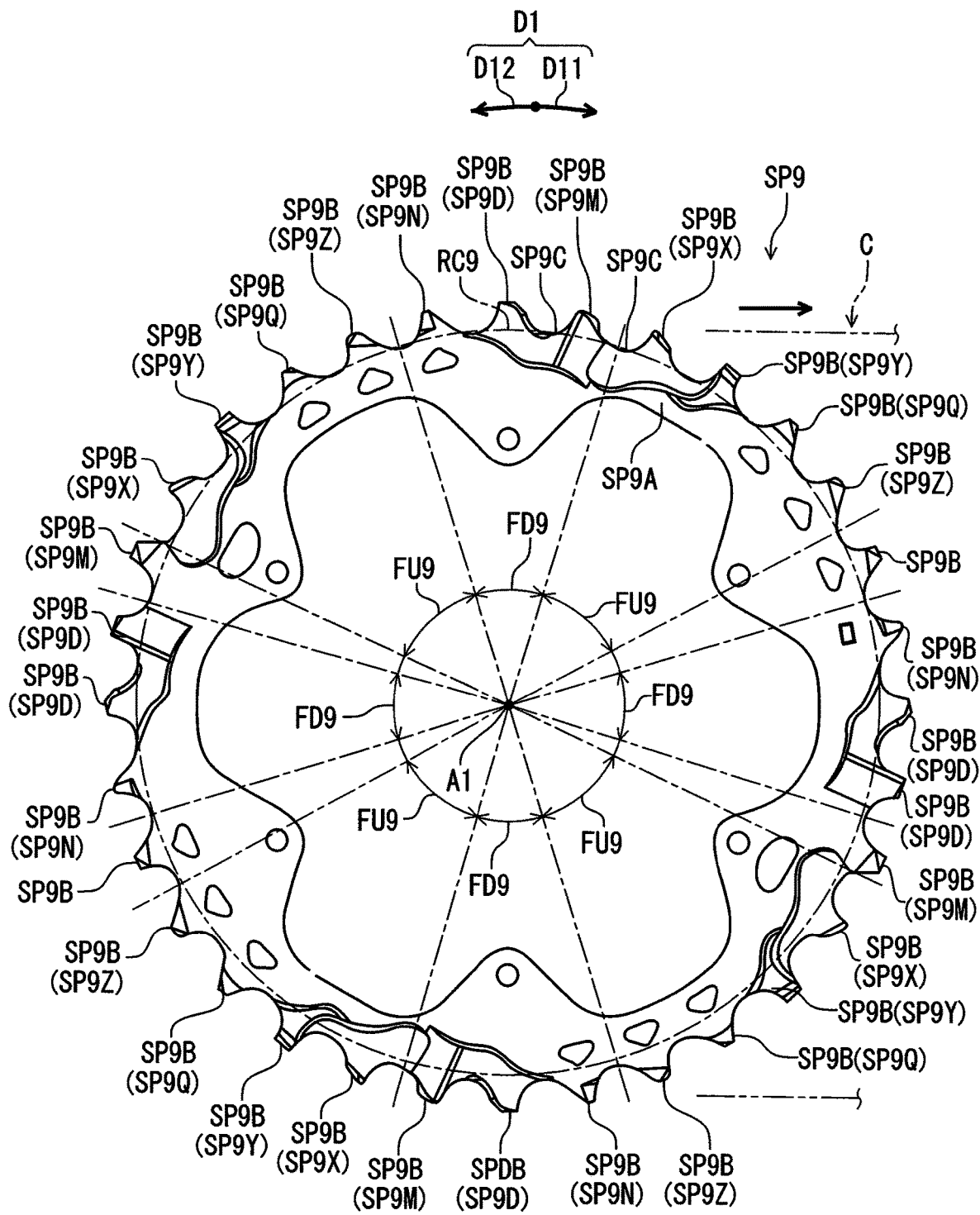
FIG. 12 is a side elevational view of a sprocket of the bicycle multiple sprocket illustrated in FIG. 2.

As seen in FIG. 12, the ninth sprocket SP9 includes a ninth sprocket body SP9A and a plurality of ninth sprocket teeth SP9B. The plurality of ninth sprocket teeth SP9B extends radially outwardly from the ninth sprocket body SP9A with respect to the rotational center axis A1. The ninth sprocket SP9 can also be referred to as a bicycle sprocket SP9. The ninth sprocket body SP9A can also be referred to as a sprocket body SP9A. The plurality of ninth sprocket teeth SP9B can also be referred to as a plurality of sprocket teeth SP9B. Thus, the bicycle sprocket SP9 comprises the sprocket body SP9A and the plurality of sprocket teeth SP9B. The plurality of sprocket teeth SP9B extends radially outwardly from the sprocket body SP9A with respect to the rotational center axis A1.

The ninth sprocket SP9 includes a plurality of tooth bottoms SP9C. The tooth bottom SP9C is provided between adjacent two of the sprocket teeth SP9B. The ninth sprocket SP9 has a tooth bottom circle RC9 defined by the plurality of tooth bottoms SP9C. A total tooth number of the bicycle sprocket SP9 (a total number of the plurality of sprocket teeth SP9B) is equal to or larger than 25. In this embodiment, the total tooth number of the ninth sprocket SP9 is 32. However, the total number of the plurality of sprocket tooth SP9B of the ninth sprocket SP9 is not limited to this embodiment.

The bicycle sprocket SP9 comprises at least one upshifting facilitation area FU9 configured to facilitate shifting the bicycle chain C from the bicycle sprocket SP9 toward the smaller sprocket SP8 adjacent to the bicycle sprocket SP9 without another sprocket therebetween in the axial direction D2. In this embodiment, the bicycle sprocket SP9 comprises a plurality of upshifting facilitation areas FU9. In this embodiment, the bicycle sprocket SP9 comprises four upshifting facilitation areas FU9. However, a total number of the upshifting facilitation areas FU9 is not limited to this embodiment.

The bicycle sprocket SP9 further comprises at least one downshifting facilitation area FD9 configured to facilitate shifting the bicycle chain C from the smaller sprocket SP8 toward the bicycle sprocket SP9. In this embodiment, the bicycle sprocket SP9 comprises a plurality of downshifting facilitation areas FD9. In this embodiment, the bicycle sprocket SP9 comprises four downshifting facilitation areas FD9. However, a total number of the downshifting facilitation areas FD9 is not limited to this embodiment.

Figure 13:
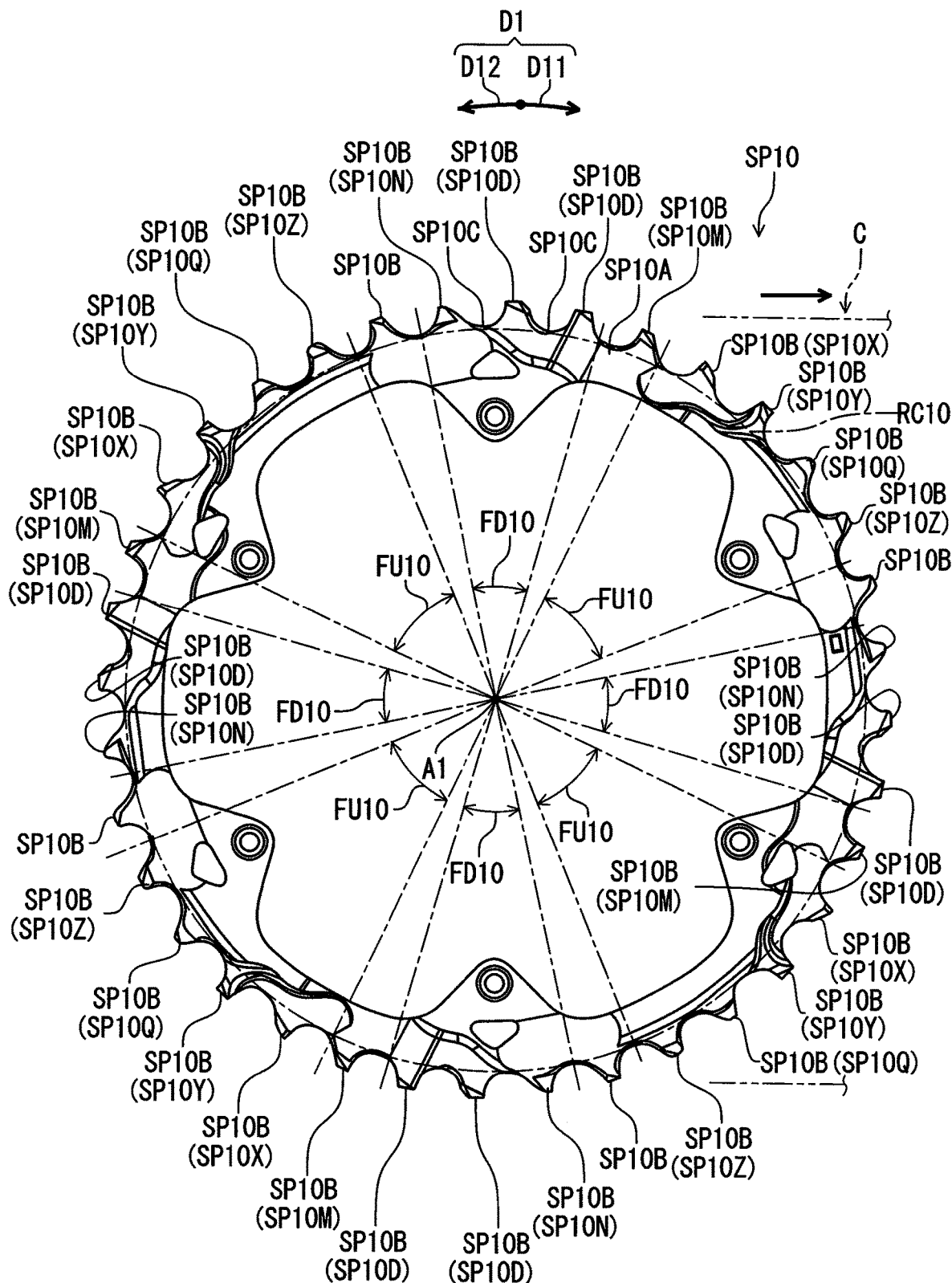
FIG. 13 is a side elevational view of a sprocket of the bicycle multiple sprocket illustrated in FIG. 2.

As seen in FIG. 13, the tenth sprocket SP10 includes a tenth sprocket body SP10A and a plurality of tenth sprocket teeth SP10B. The plurality of tenth sprocket teeth SP10B extends radially outwardly from the tenth sprocket body SP10A with respect to the rotational center axis A1. The tenth sprocket SP10 includes a plurality of tooth bottoms SP10C. The tooth bottom SP10C is provided between adjacent two of the sprocket teeth SP10B. The tenth sprocket SP10 has a tooth bottom circle RC10 defined by the plurality of tooth bottoms SP10C. A total tooth number of the bicycle sprocket SP10 (a total number of the plurality of sprocket teeth SP10B) is equal to or larger than 25. In this embodiment, the total tooth number of the tenth sprocket SP10 is 36. However, the total number of the plurality of sprocket tooth SP10B of the tenth sprocket SP10 is not limited to this embodiment.

The sprocket SP10 includes at least one downshifting facilitation area FD10 configured to facilitate shifting the bicycle chain C from the smaller sprocket SP9 toward the sprocket SP10. The sprocket SP10 comprises at least one upshifting facilitation area FU10 configured to facilitate shifting the bicycle chain C from the sprocket SP10 toward the smaller sprocket SP9. In this embodiment, the second sprocket SP10 includes a plurality of downshifting facilitation areas FD10 and a plurality of upshifting facilitation areas FU10. In this embodiment, the second sprocket SP0 includes four downshifting facilitation areas FD10 and four upshifting facilitation areas FU10. However, a total number of the downshifting facilitation areas FD10 is not limited to this embodiment. The total number of the upshifting facilitation areas FU10 is not limited to this embodiment.

Figure 14:
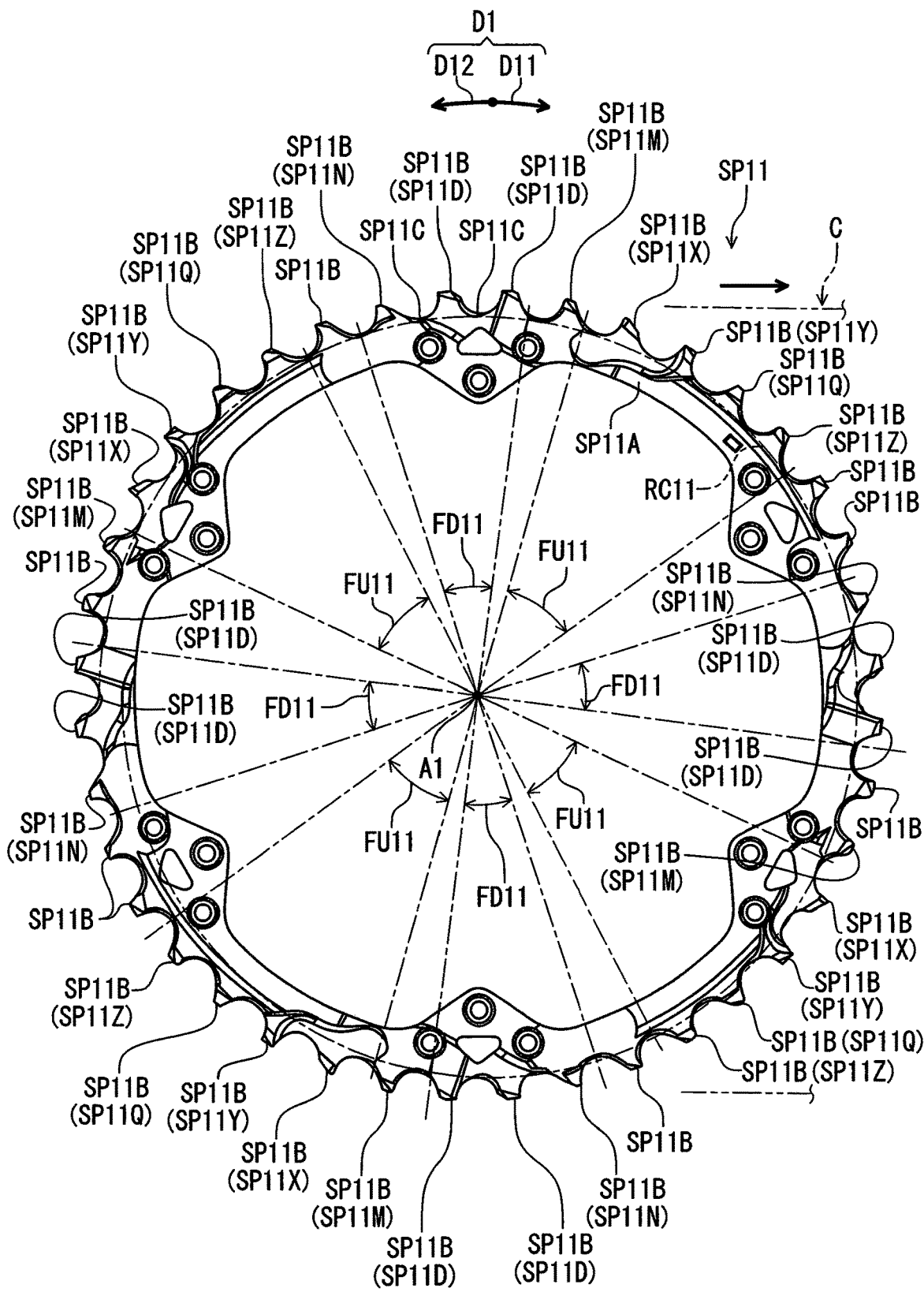
FIG. 14 is a side elevational view of a sprocket of the bicycle multiple sprocket illustrated in FIG. 2.

As seen in FIG. 14, the eleventh sprocket SP11 includes an eleventh sprocket body SP11A and a plurality of eleventh sprocket teeth SP11B. The plurality of eleventh sprocket teeth SP11B extends radially outwardly from the eleventh sprocket body SP11A with respect to the rotational center axis A1. The eleventh sprocket SP11 includes a plurality of tooth bottoms SP11C. The tooth bottom SP11C is provided between adjacent two of the sprocket teeth SP11B. The eleventh sprocket SP11 has a tooth bottom circle RC11 defined by the plurality of tooth bottoms SP11C. A total tooth number of the bicycle sprocket SP11 (a total number of the plurality of sprocket teeth SP11B) is equal to or larger than 25. In this embodiment, the total tooth number of the eleventh sprocket SP11 is 40. However, the total number of the plurality of sprocket tooth SP11B of the eleventh sprocket SP11 is not limited to this embodiment.

The sprocket SP11 includes at least one downshifting facilitation area FD11 configured to facilitate shifting the bicycle chain C from the smaller sprocket SP10 toward the sprocket SP11. The sprocket SP11 comprises at least one upshifting facilitation area FU11 configured to facilitate shifting the bicycle chain C from the sprocket SP11 toward the smaller sprocket SP10. In this embodiment, the second sprocket SP11 includes a plurality of downshifting facilitation areas FD11 and a plurality of upshifting facilitation areas FU11. In this embodiment, the second sprocket SP11 includes four downshifting facilitation areas FD11 and four upshifting facilitation areas FU11. However, a total number of the downshifting facilitation areas FD11 is not limited to this embodiment. The total number of the upshifting facilitation areas FU11 is not limited to this embodiment.

Figure 15:
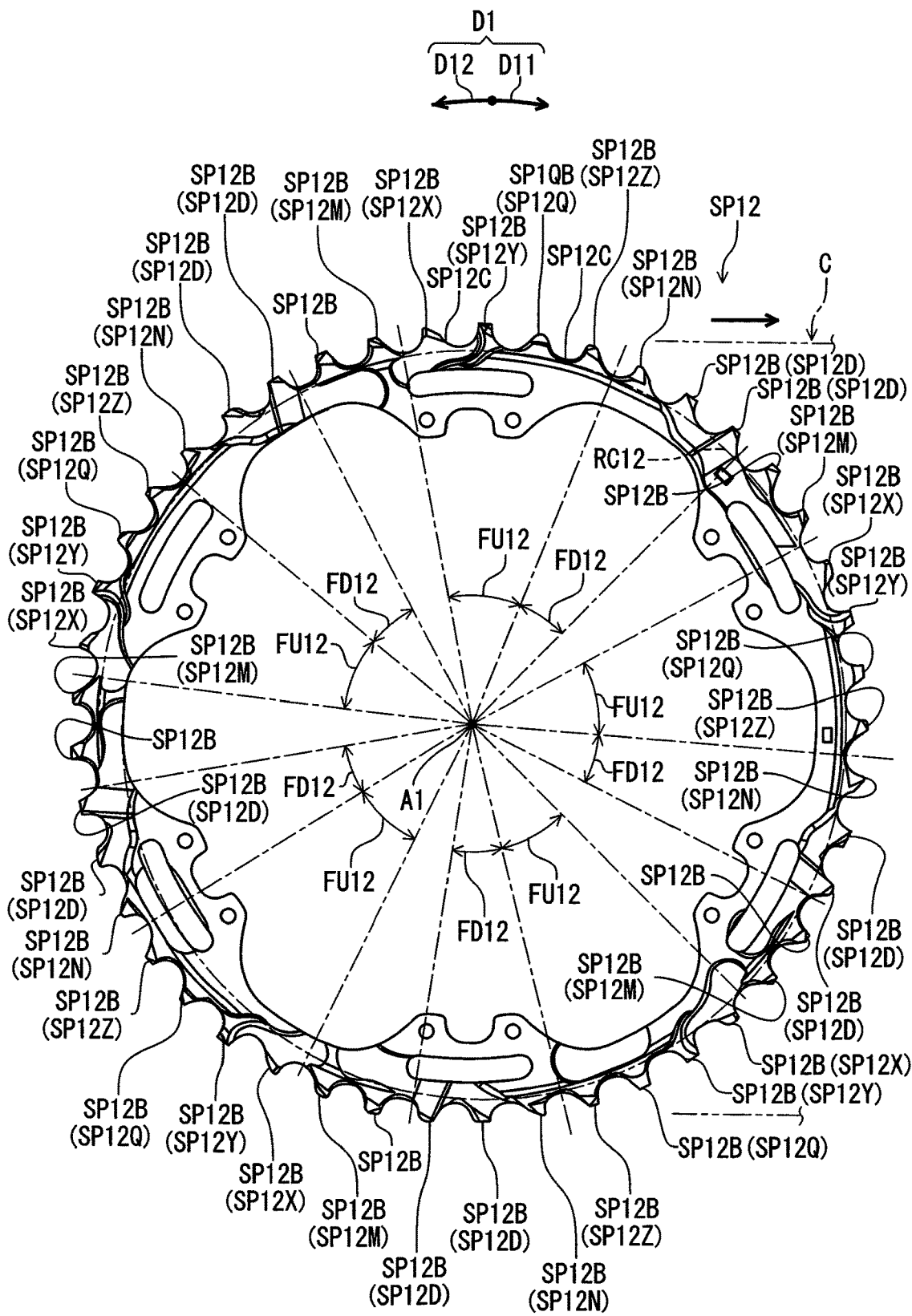
FIG. 15 is a side elevational view of a sprocket of the bicycle multiple sprocket illustrated in FIG. 2.

As seen in FIG. 15, the twelfth sprocket SP12 includes a twelfth sprocket body SP12A and a plurality of twelfth sprocket teeth SP12B. The plurality of twelfth sprocket teeth SP12B extends radially outwardly from the twelfth sprocket body SP12A with respect to the rotational center axis A1. The twelfth sprocket SP12 includes a plurality of tooth bottoms SP12C. The tooth bottom SP12C is provided between adjacent two of the sprocket teeth SP12B. The twelfth sprocket SP12 has a tooth bottom circle RC12 defined by the plurality of tooth bottoms SP12C. A total tooth number of the bicycle sprocket SP12 (a total number of the plurality of sprocket teeth SP12B) is equal to or larger than 41. In this embodiment, the total tooth number of the twelfth sprocket SP12 is 45. However, the total number of the plurality of sprocket tooth SP12B of the twelfth sprocket SP12 is not limited to this embodiment.

The sprocket SP12 includes at least one downshifting facilitation area FD12 configured to facilitate shifting the bicycle chain C from the smaller sprocket SP11 toward the sprocket SP12. The sprocket SP12 comprises at least one upshifting facilitation area FU12 configured to facilitate shifting the bicycle chain C from the sprocket SP12 toward the smaller sprocket SP11. In this embodiment, the second sprocket SP12 includes a plurality of downshifting facilitation areas FD12 and a plurality of upshifting facilitation areas FU12. In this embodiment, the second sprocket SP12 includes five downshifting facilitation areas FD12 and five upshifting facilitation areas FU12. However, a total number of the downshifting facilitation areas FD12 is not limited to this embodiment. The total number of the upshifting facilitation areas FU12 is not limited to this embodiment.

Figure 16:
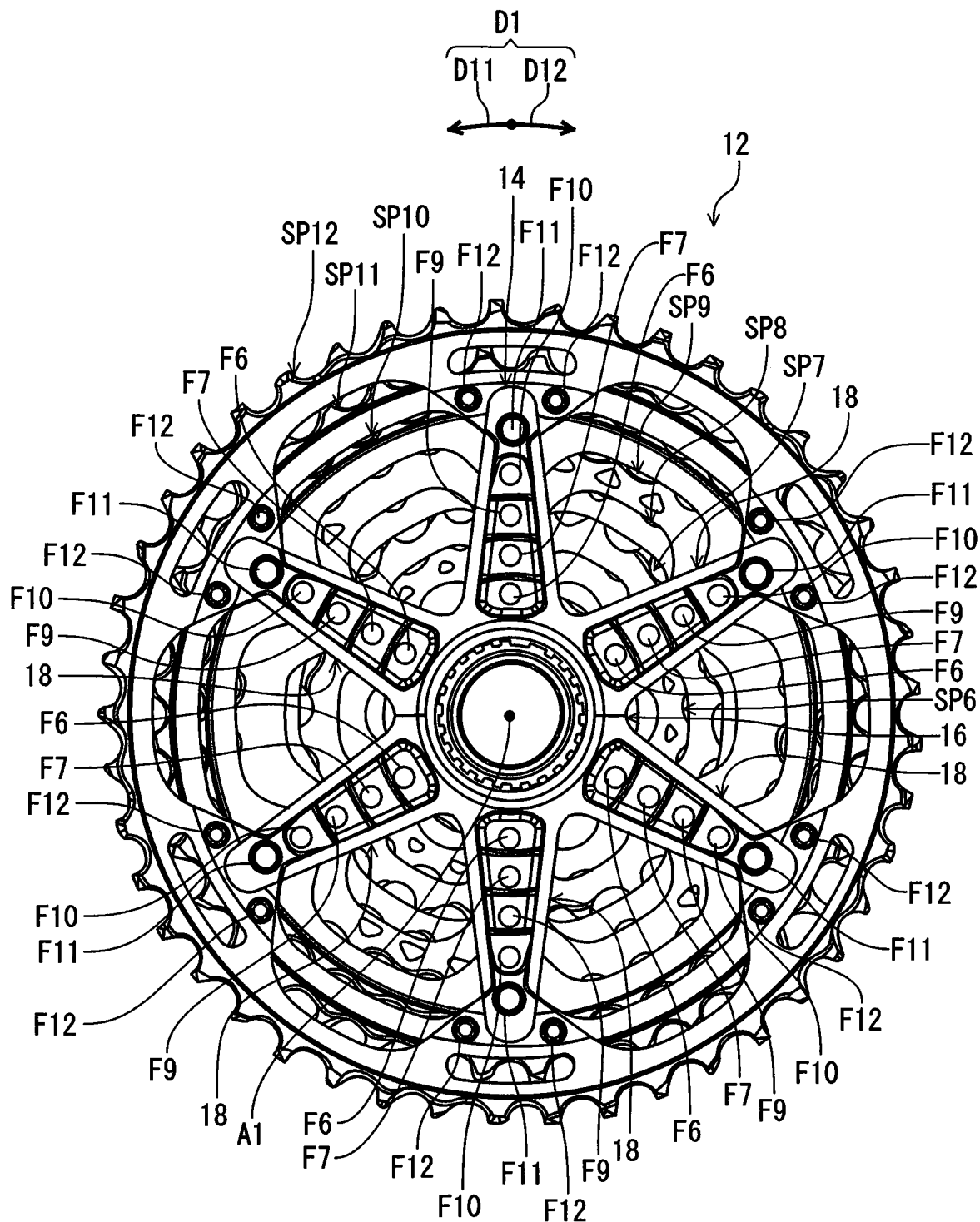
FIG. 16 is another side elevational view of the bicycle multiple sprocket illustrated in FIG. 2.

As seen in FIG. 16, the bicycle multiple sprocket 12 comprises a sprocket carrier 14. The sprocket carrier 14 includes a hub engagement part 16 and a plurality of sprocket mounting arms 18. The hub engagement part 16 is configured to engage with a sprocket support body 4B of the hub assembly 4. The plurality of sprocket mounting arms 18 extends radially outwardly from the hub engagement part 16. A total number of the sprocket mounting arms 18 is 6 in this embodiment. However, the total number of the sprocket mounting arms 18 is not limited to this embodiment.

As seen in FIG. 3, the plurality of sprockets SP6, SP7, and SP9 to SP11 is secured to the plurality of sprocket mounting arms 18. The sprocket SP6 is secured to the plurality of sprocket mounting arms 18 with a plurality of fasteners F6 (FIG. 16). The sprocket SP7 is secured to the plurality of sprocket mounting arms 18 with a plurality of fasteners F7 (FIG. 16). The sprocket SP9 is secured to the plurality of sprocket mounting arms 18 with a plurality of fasteners F9 (FIG. 16). The sprocket SP10 is secured to the plurality of sprocket mounting arms 18 with a plurality of fasteners F10 (FIG. 16). The sprocket SP11 is secured to the plurality of sprocket mounting arms 18 with a plurality of fasteners F11 (FIG. 16). The sprocket SP12 is secured to the sprocket SP11 with a plurality of fasteners F12 (FIG. 16).

The sprocket SP5 is secured to the sprocket SP6 with the plurality of fasteners F6. A plurality of spacers SC6 is provided between the sprockets SP5 and SP6. The sprocket SP8 is secured to the sprocket SP9 with the plurality of fasteners F9. A plurality of spacers SC9 is provided between the sprockets SP8 and SP9. The sprocket SP12 is secured to the sprocket SP11 with a plurality of fasteners F12. A plurality of spacers SC12 is provided between the sprockets SP11 and SP12.

The hub engagement part 16 includes a hub internal spline 19 configured to engage with a plurality of external spline teeth (not shown) of the hub assembly 4. The hub internal spline 19 includes a first hub internal spline 20 and a second hub internal spline 22. The first hub internal spline 20 is spaced apart from the second hub internal spline 22 in the axial direction D2 to define an annular recess 24 between the first hub internal spline 20 and the second hub internal spline 22 in the axial direction D2 in this embodiment. The first hub internal spline 20 can be connected to the second hub internal spline 22.

The first hub internal spline 20 includes a plurality of first internal spline teeth 28 configured to engage with the plurality of external spline teeth (not shown) of the hub assembly 4. The second hub internal spline 22 includes a plurality of second internal spline teeth 30 configured to engage with the plurality of external spline teeth (not shown) of the hub assembly 4.

As seen in FIG. 7, the sprocket SP4 includes an internal spline SP4S. The internal spline SP4S includes a plurality of internal spline teeth SP4H configured to engage with the plurality of external spline teeth (not shown) of the hub assembly 4 (FIG. 3). As seen in FIG. 3, the sprocket SP4 is held between the hub engagement part 16 of the sprocket carrier 14 and the lock member 4A of the hub assembly 4 in the axial direction D2 in a state where the bicycle multiple sprocket 12 is mounted on the hub assembly 4.

As seen in FIG. 4, the sprocket SP1 includes an internal spline SP1S. The internal spline SP1S includes a plurality of internal spline teeth SP1H configured to engage with the plurality of external spline teeth (not shown) of the hub assembly 4 (FIG. 3). As seen in FIG. 3, the sprocket SP1 is held between the hub engagement part 16 of the sprocket carrier 14 and the lock member 4A of the hub assembly 4 in the axial direction D2 in a state where the bicycle multiple sprocket 12 is mounted on the hub assembly 4.

Figure 17:
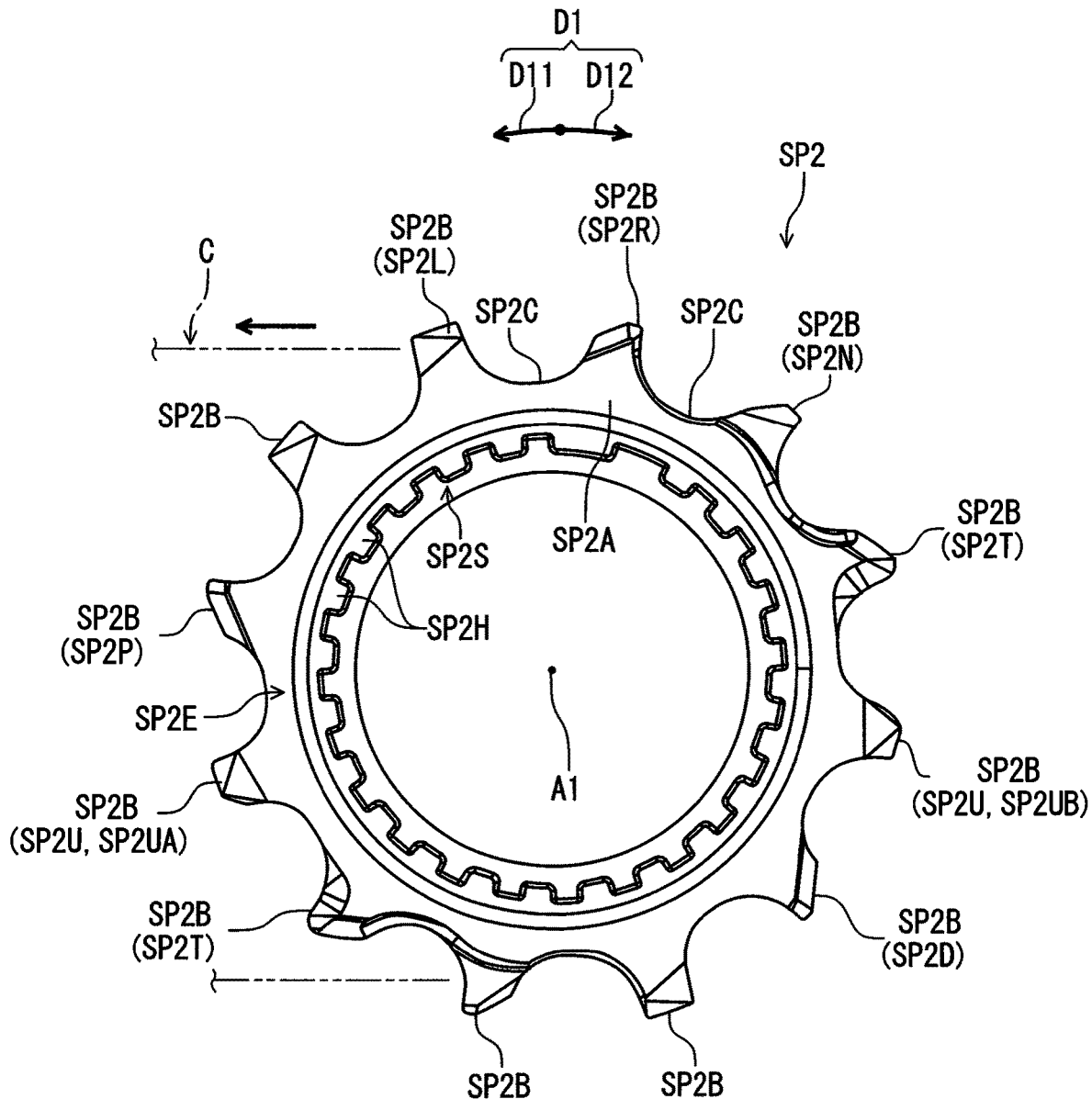
FIG. 17 is another side elevational view of the sprocket illustrated in FIG. 5.

As seen in FIG. 17, the sprocket SP2 includes an internal spline SP2S. The internal spline SP2S includes a plurality of internal spline teeth SP2H configured to engage with the plurality of external spline teeth (not shown) of the hub assembly 4 (FIG. 3). As seen in FIG. 3, the sprocket SP2 is held between the hub engagement part 16 of the sprocket carrier 14 and the lock member 4A of the hub assembly 4 in the axial direction D2 in a state where the bicycle multiple sprocket 12 is mounted on the hub assembly 4.

Figure 18:
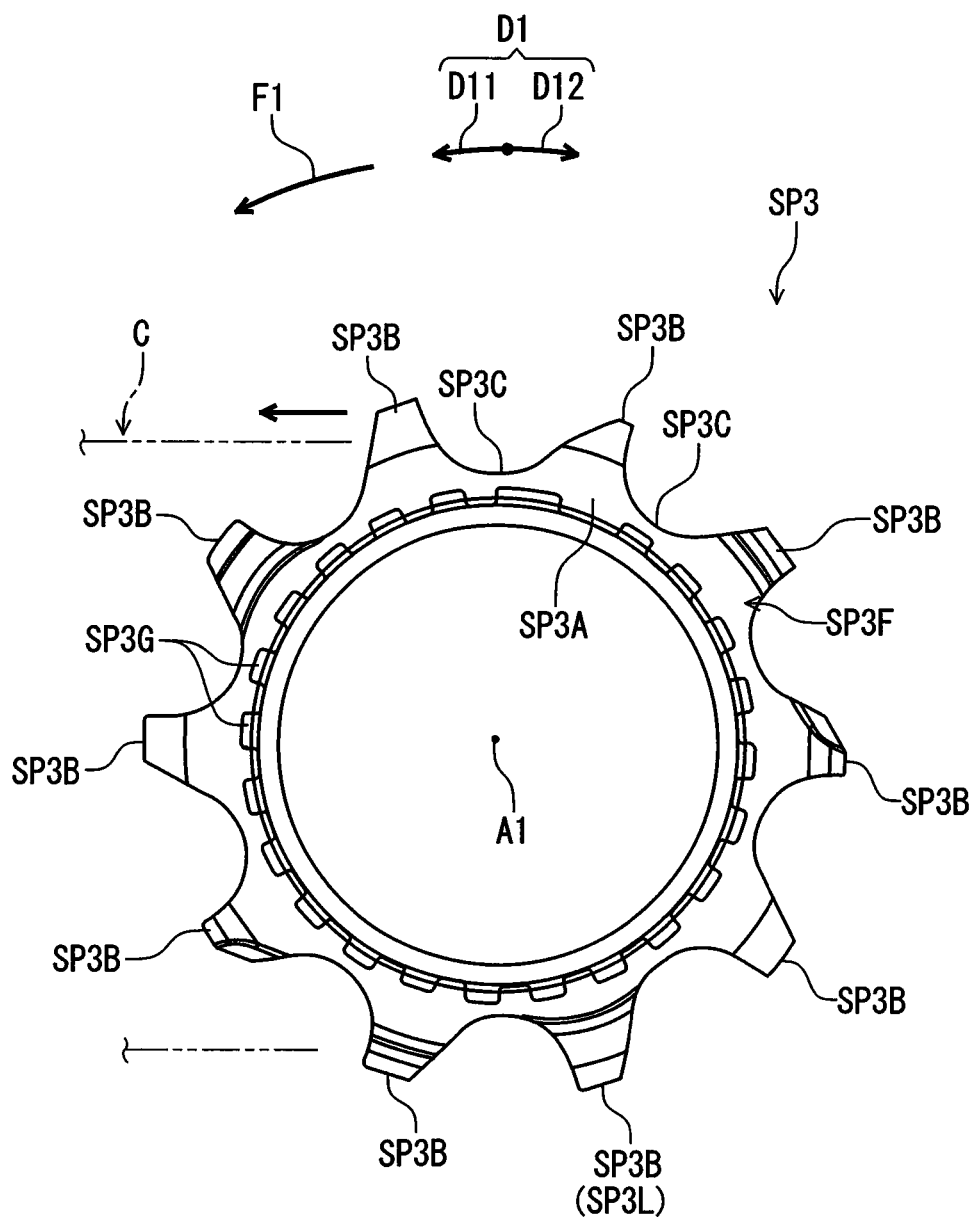
FIG. 18 is another side elevational view of the sprocket illustrated in FIG. 6.

As seen in FIG. 18, the sprocket SP3 includes a torque transmitting profile SP3F. The torque transmitting profile SP3F includes a plurality of external spline teeth SP3G configured to engage with the sprocket SP2 to transmit the driving rotational force F1. As seen in FIG. 5, the sprocket SP2 includes a torque transmitting profile SP2F. The torque transmitting profile SP2F includes a plurality of additional internal spline teeth SP2G configured to engage with the plurality of external spline teeth SP3G of the sprocket SP3 to transmit the driving rotational force F1.

As seen in FIG. 5, the plurality of second sprocket teeth SP2B includes at least one chain-curvature limiting tooth SP2L. In this embodiment, the plurality of second sprocket teeth SP2B includes a chain-curvature limiting tooth SP2L. Specifically, the second sprocket SP2 comprises twelve second sprocket teeth SP2B includes one chain-curvature limiting tooth SP2L. However, the plurality of second sprocket teeth SP2B includes another chain-curvature limiting tooth instead of or in addition to the chain-curvature limiting tooth SP2L.

Figure 19:
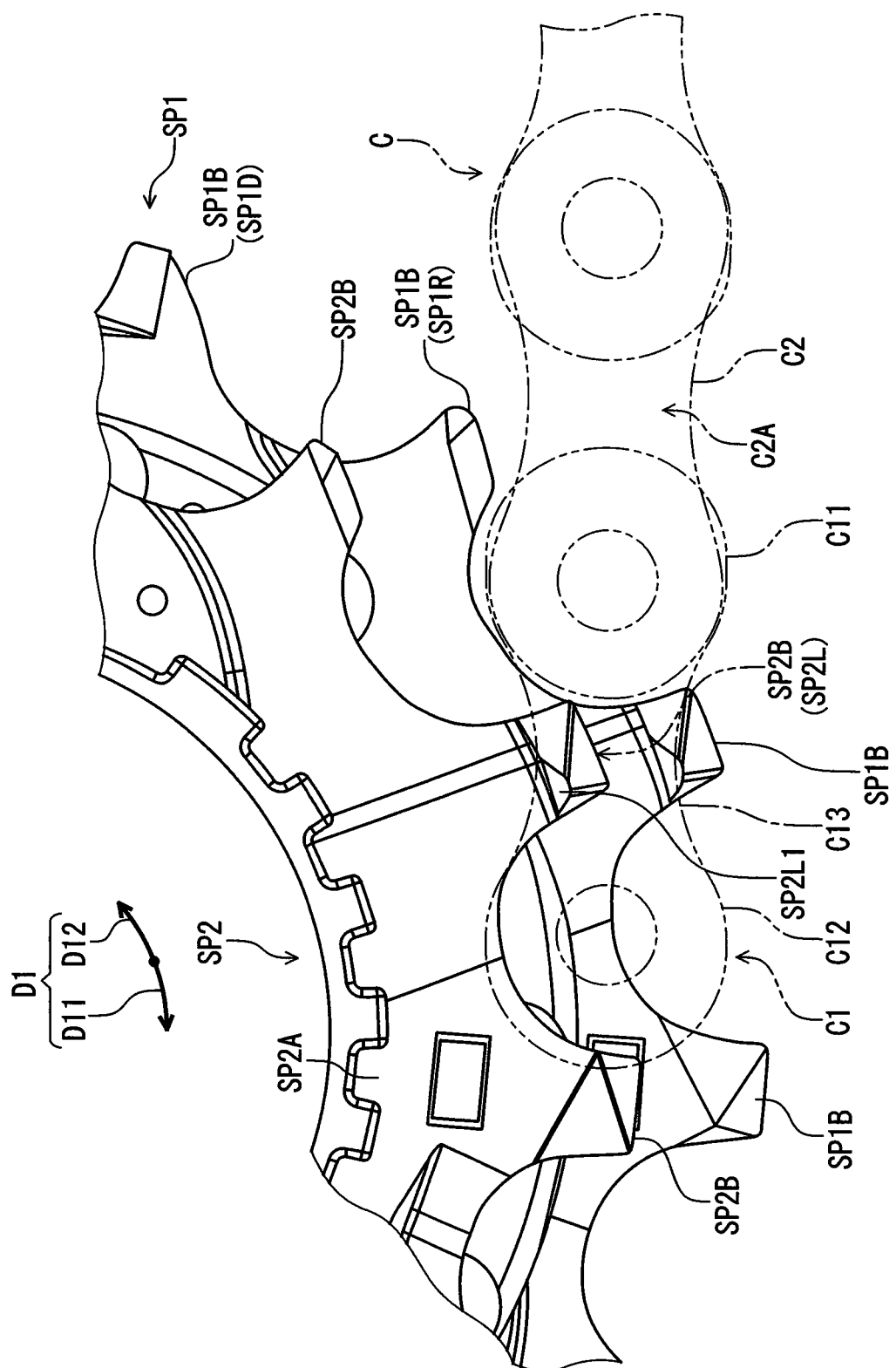
FIG. 19 is a partial side elevational view of the sprockets illustrated in FIGS. 4 and 5, with a bicycle chain.

As seen in FIG. 19, the at least one chain-curvature limiting tooth SP2L has a chain-curvature limiting surface SP2L1. The chain-curvature limiting surface SP2L1 is configured to support the inner link plate C1 of the bicycle chain C in the axial direction D2 with respect to the rotational center axis A1 in a chain-inclining state where the bicycle chain C is inclined from the at least one chain-curvature limiting tooth SP2L toward the first sprocket SP1 so as to prevent one (e.g., SP1R) of the plurality of first sprocket teeth SP1B from engaging in an outer link space C2A provided between an opposed pair of outer link plates C2 of the bicycle chain C. The chain-curvature limiting surface SP2L contacts the inner link plate C1 to restrict an axial movement of the opposed pair of outer link plates C2 in a downshifting operation in which the bicycle chain C is shifted from the second sprocket SP2 to the first sprocket SP1 by a derailleur (not shown).

Figure 20:
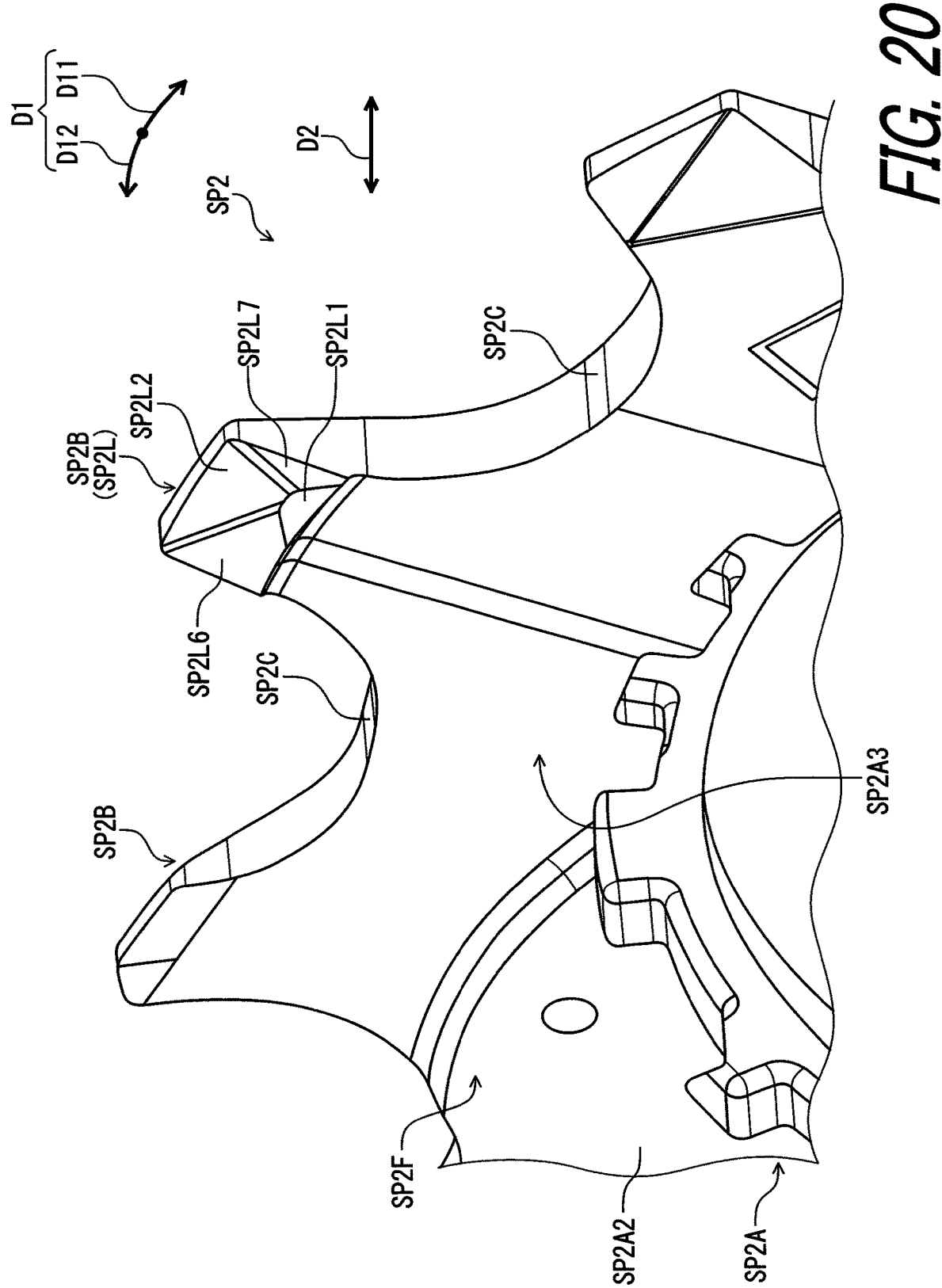
FIG. 20 is a partial perspective view of the sprocket illustrated in FIG. 5.

As seen in FIG. 20, the chain-curvature limiting surface SP2L1 is disposed in the second bicycle-outboard surface SP2F. The at least one chain-curvature limiting tooth SP2L has a chamfered portion SP2L2 disposed in the second bicycle-outboard surface SP2F.

Figure 21:
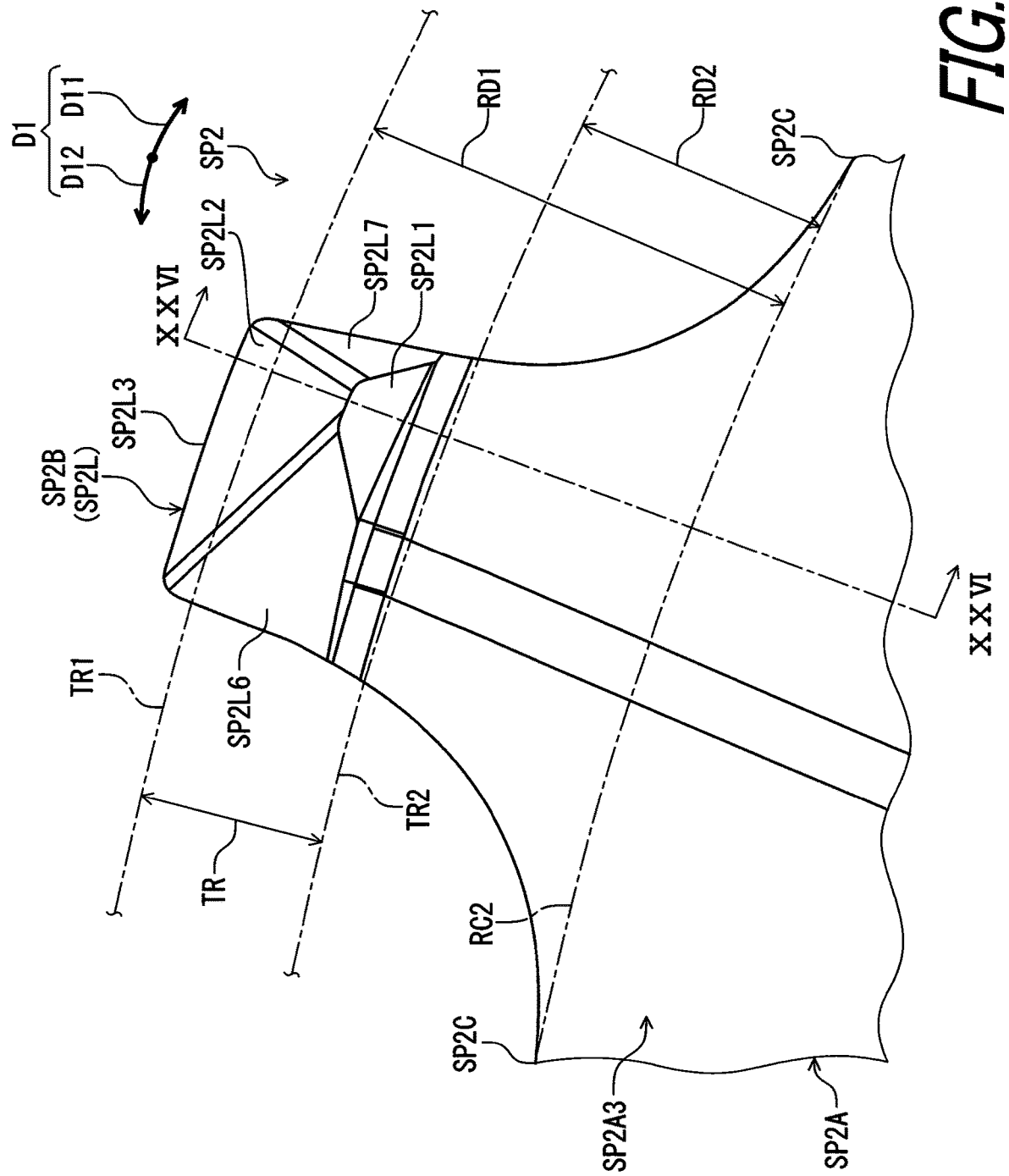
FIG. 21 is a partial side elevational view of the sprocket illustrated in FIG. 5.

As seen in FIG. 21, the chain-curvature limiting surface SP2L1 at least partly extends in a radial direction with respect to the rotational center axis A1. The chain-curvature limiting surface SP2L1 is disposed radially inwardly from the chamfered portion SP2L2 with respect to the rotational center axis A1. The chain-curvature limiting surface SP2L1 is disposed radially outwardly from the tooth bottom circle RC2 with respect to the rotational center axis A1.

The chain-curvature limiting surface SP2L1 is disposed in a radial tooth region TR with respect to the rotational center axis A1. The radial tooth region TR has a radially outermost end TR1 and a radially innermost end TR2 with respect to the rotational center axis A1. The radial tooth region TR is provided radially outwardly of the tooth bottom circle RC2. The radially outermost end TR1 of the radial tooth region TR is provided radially outwardly of the radially innermost end TR2 of the radial tooth region TR.

A first radial distance RD1 defined between the radially outermost end TR1 of the radial tooth region TR and the tooth bottom circle RC2 of the second sprocket SP2 with respect to the rotational center axis A1 is 4.5 mm. A second radial distance RD2 defined between the radially innermost end TR2 of the radial tooth region TR and the tooth bottom circle RC2 of the second sprocket SP2 with respect to the rotational center axis A1 is 2.5 mm. The first radial distance RD1 is defined radially outwardly from the tooth bottom circle RC2 to the radially outermost end TR1 of the radial tooth region TR. The second radial distance RD2 is defined radially outwardly from the tooth bottom circle RC2 to the radially innermost end TR2 of the radial tooth region TR. However, the radial tooth region TR is not limited to this embodiment.

Figure 22:
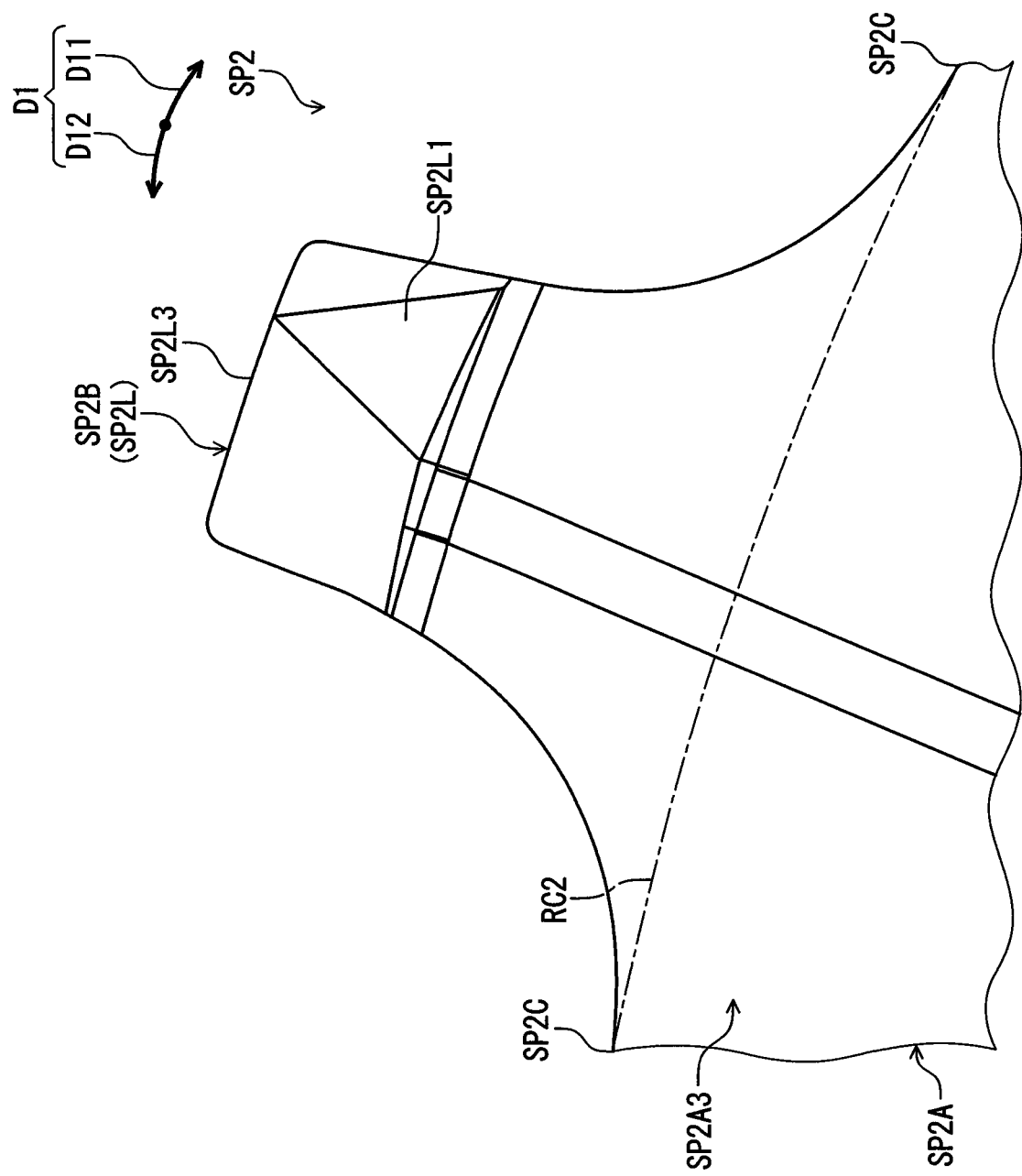
FIG. 22 is a partial side elevational view of a sprocket in accordance with a modification of the sprocket illustrated in FIG. 21.

In this embodiment, the chain-curvature limiting surface SP2L1 does not reach a tooth tip SP2L3 of the at least one chain-curvature limiting tooth SP2L. The chamfered portion SP2L2 is provided between the chain-curvature limiting surface SP2L1 and the tooth tip SP2L3 of the chain-curvature limiting tooth SP2L when viewed along the rotational center axis A1. As seen in FIG. 22, however, the chain-curvature limiting surface SP2L1 can reach the tooth tip SP2L3 of the at least one chain-curvature limiting tooth SP2L. In this modification, the chamfered portion SP2L2 is omitted from the chain-curvature limiting tooth SP2L.

As seen in FIGS. 20 and 21, the chain-curvature limiting tooth SP2L includes an upstream surface SP2L6 and a downstream surface SP2L7. The upstream surface SP2L6 is provided on an upstream side of the chain-curvature limiting surface SP2L1 in the rotational driving direction D11. The downstream surface SP2L7 is provided on a downstream side of the chain-curvature limiting surface SP2L1 in the rotational driving direction D11. The upstream surface SP2L6 is coupled to the chain-curvature limiting surface SP2L1 and the chamfered portion SP2L2. The downstream surface SP2L7 is coupled to the chain-curvature limiting surface SP2L and the chamfered portion SP2L2.

Figure 23:
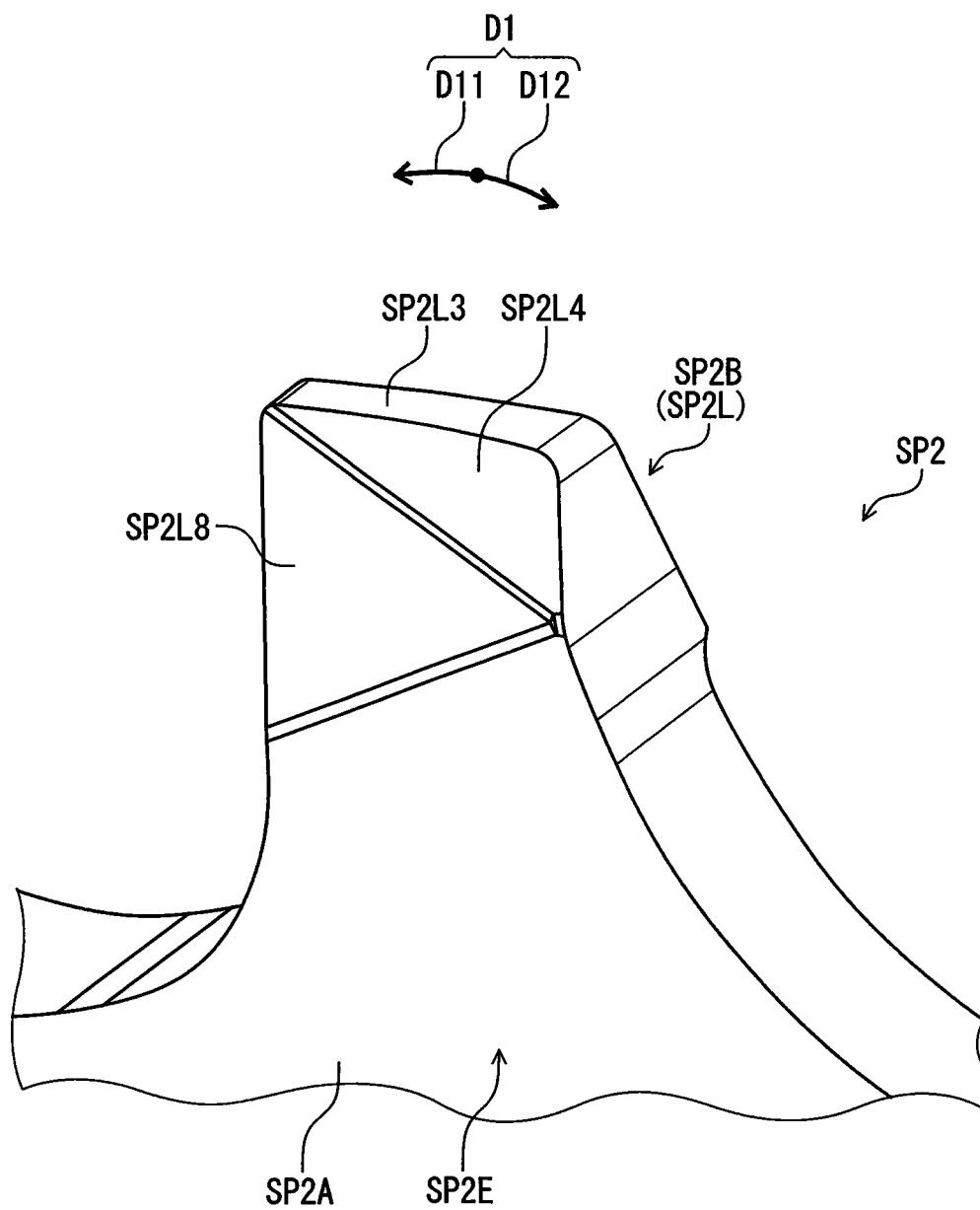
FIG. 23 is another partial perspective view of the sprocket illustrated in FIG. 5.

As seen in FIG. 23, the at least one chain-curvature limiting tooth SP2L has an additional chamfered portion SP2L4 disposed in the second bicycle-inboard surface SP2E. However, the additional chamfered portion SP2L4 can be omitted from the chain-curvature limiting tooth SP2L. The chain-curvature limiting tooth SP2L includes an additional downstream surface SP2L8. The additional downstream surface SP2L8 is provided on a downstream side of the chain-curvature limiting tooth SP2L in the rotational driving direction D11. The additional downstream surface SP2L8 is coupled to the additional chamfered portion SP2L4.

Figure 24:
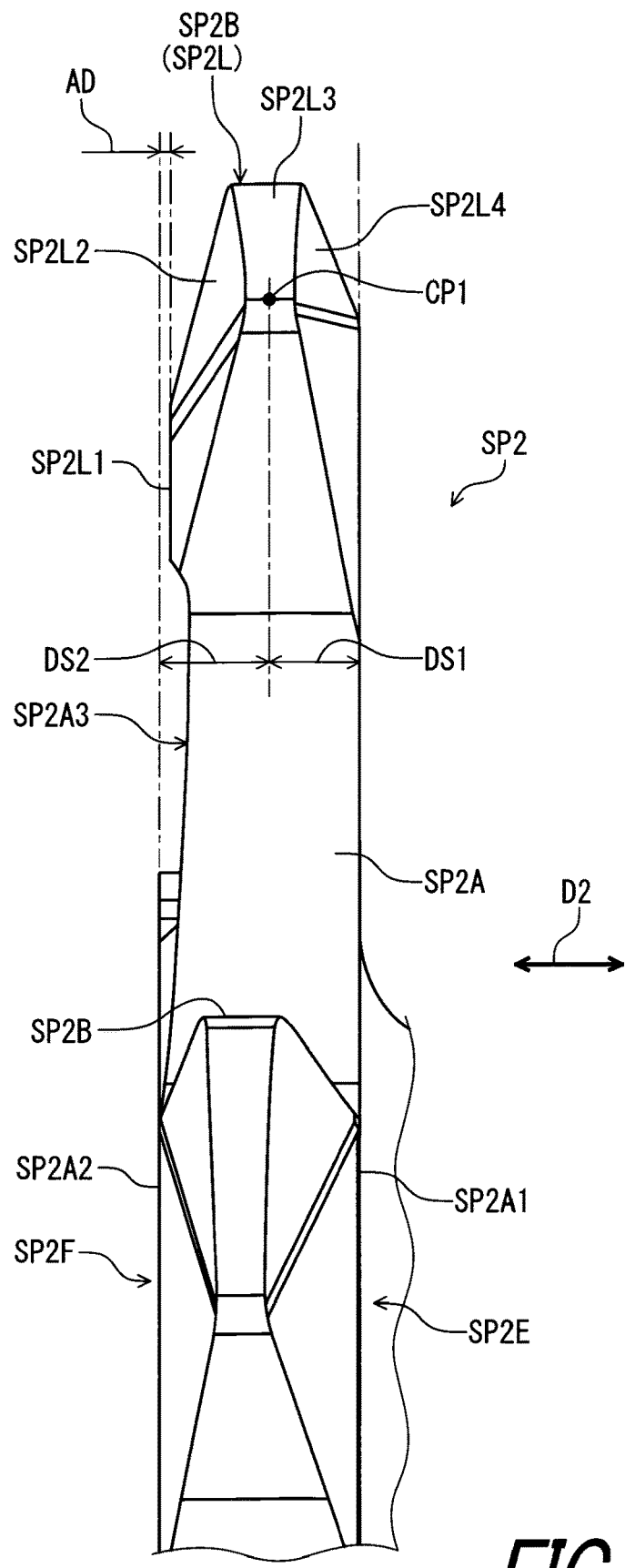
FIG. 24 is a partial front view of the sprocket illustrated in FIG. 5.

As seen in FIG. 24, the chamfered portion SP2L2 is configured so that the tooth tip SP2L3 of the at least one chain-curvature limiting tooth SP2L is at least partly disposed closer to the second bicycle-inboard surface SP2E than to the second bicycle-outboard surface SP2F in the axial direction D2. In this embodiment, the tooth tip SP2L3 of the chain-curvature limiting tooth SP2L is partly disposed closer to the second bicycle-inboard surface SP2E than to the second bicycle-outboard surface SP2F in the axial direction D2. The tooth tip SP2L3 includes an axial center point CPI provided on a circumferential end of the tooth tip SP2L3. A first distance DS1 is defined between the axial center point CPI and a surface SP2A1 in the axial direction D2. A second distance DS2 is defined between the axial center point CPI and a surface SP2A2 in the axial direction D2. The surface SP2A1 is provided on a reverse side of the surface PS2A2 in the axial direction D2. The first distance DS1 is smaller than the second distance DS2. The chamfered portion SP2L2 extends from the tooth tip SP2L3 of the at least one chain-curvature limiting tooth SP2L to the chain-curvature limiting surface SP2L1.

An axial distance AD is defined between the chain-curvature limiting surface SP2L1 and the surface SP2A2 of the second sprocket body SP2A in the second bicycle-outboard surface SP2F with respect to the rotational center axis A1. The axial distance AD ranges from 0 mm to 0.3 mm. In this embodiment, the axial distance AD is 0.1 mm. However, the axial distance AD is not limited to this embodiment and the above range.

Figure 25:
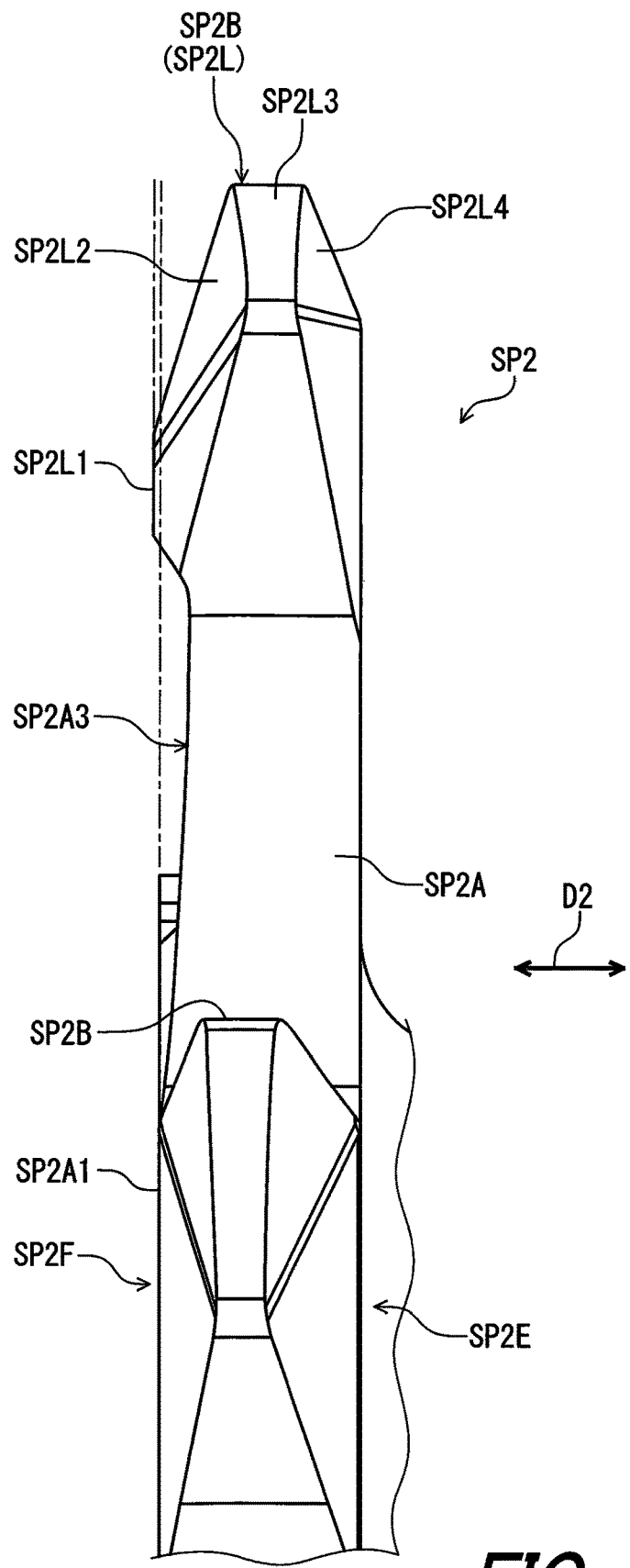
FIG. 25 is a partial front view of a sprocket in accordance with a modification of the sprocket illustrated in FIG. 5.

The chain-curvature limiting surface SP2L1 is offset from the surface SP2A2 of the second sprocket body SP2A in the axial direction D2 toward the second bicycle-inboard surface SP2E. As seen in FIG. 25, however, the chain-curvature limiting surface SP2L1 can be offset from the surface SP2A2 of the second sprocket body SP2A in the axial direction D2 away from the second bicycle-inboard surface SP2E.

Figure 26:
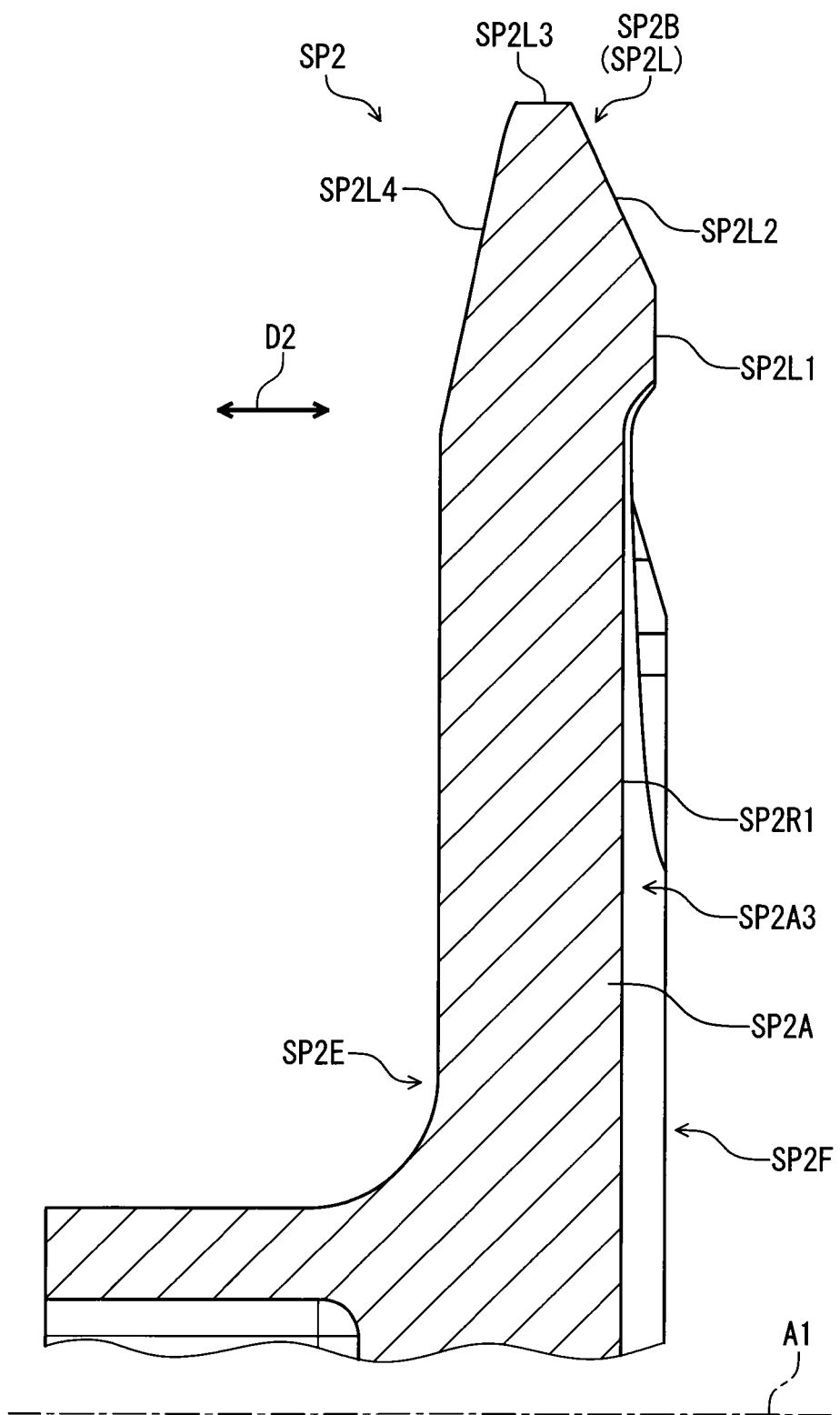
FIG. 26 is a cross-sectional view of the sprocket taken along line XXVI-XXVI of FIG. 21.

As seen in FIG. 26, the second sprocket body SP2A has an axially recessed portion SP2A3 recessed axially with respect to the rotational center axis A1. The axially recessed portion SP2A3 is recessed in the axial direction D2. The axially recessed portion SP2A3 is disposed in the second bicycle-outboard surface SP2F. The axially recessed portion SP2A3 is disposed radially inwardly from the chain-curvature limiting surface SP2L1 with respect to the rotational center axis A1.

Figure 27:
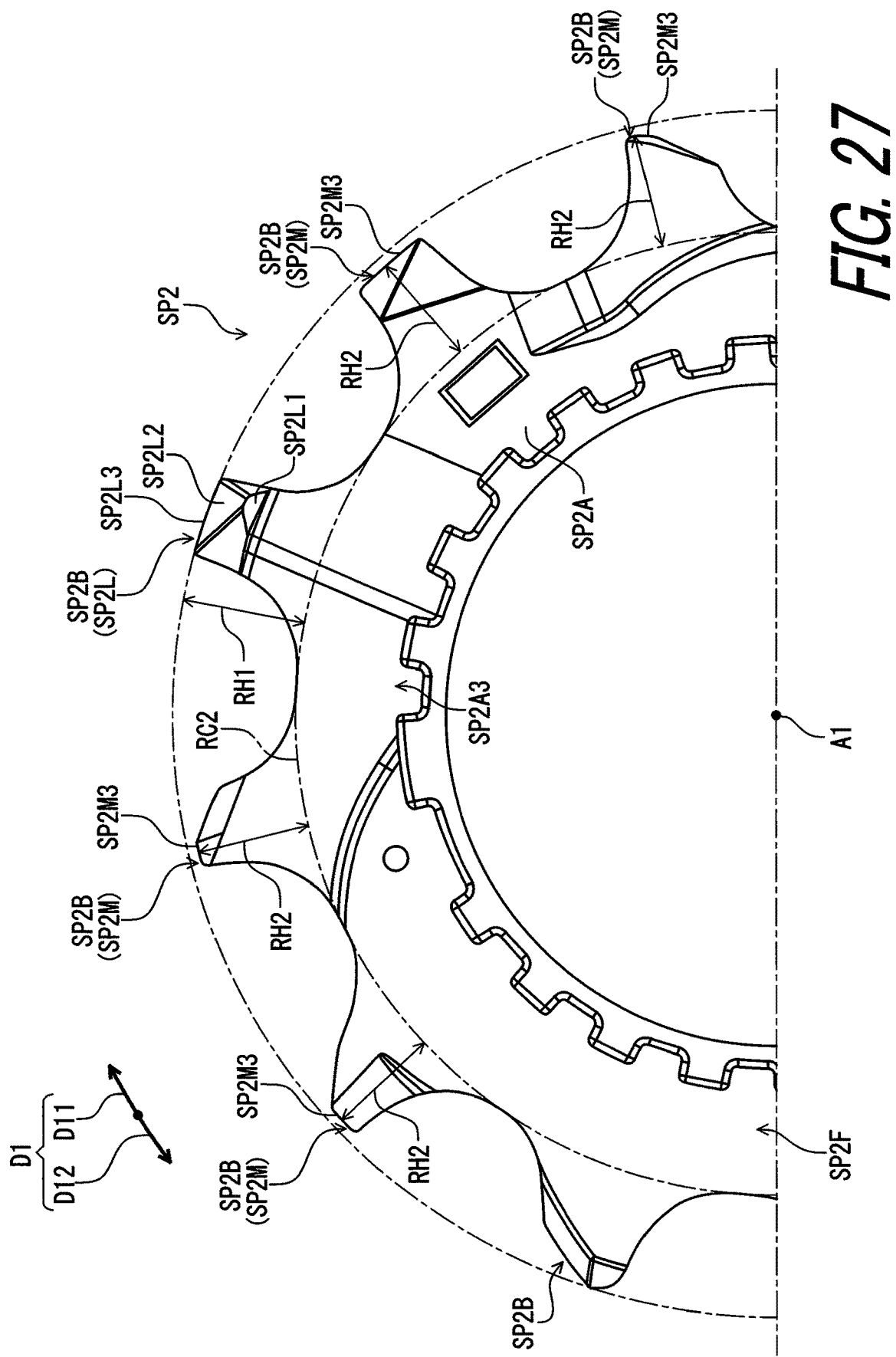
FIG. 27 is a partial side elevational view of the sprocket illustrated in FIG. 5.

As seen in FIG. 27, the at least one chain-curvature limiting tooth SP2L has a tooth radial height RH1 with respect to the rotational center axis A1. The tooth radial height RH1 of the at least one chain-curvature limiting tooth SP2L is larger than radial heights RH2 of the other teeth of the plurality of second sprocket teeth SP2B. The tooth radial height RH1 is defined radially outwardly from the tooth bottom circle RC2 to the tooth tip SP2L3 of the chain-curvature limiting tooth SP2L. The radial heights RH2 are defined radially outwardly from the tooth bottom circle RC2 to tooth tips SP2M3 of second sprocket teeth SP2M of the second sprocket teeth SP2B.

In this embodiment, for example, a difference between the tooth radial height RH1 and the radial heights RH2 of the second sprocket teeth SP2M is 0.5 mm. However, the difference between the tooth radial height RH1 and the radial heights RH2 of the second sprocket teeth SP2M is not limited to this embodiment.

As seen in FIG. 4, the plurality of sprocket teeth SP1B includes a plurality of chain-curvature limiting teeth SP1L. In this embodiment, the first sprocket SP1 comprises fourteen sprocket teeth SP1B including two chain-curvature limiting teeth SP1L. As seen in FIG. 6, the plurality of sprocket teeth SP3B includes a chain-curvature limiting tooth SP3L. In this embodiment, the third sprocket SP3 comprises ten sprocket teeth SP3B including one chain-curvature limiting tooth SP3L. As seen in FIG. 7, the plurality of sprocket teeth SP4B includes a plurality of chain-curvature limiting teeth SP4L. In this embodiment, the fourth sprocket SP4 comprises sixteen sprocket teeth SP4B including two chain-curvature limiting teeth SP4L. The chain-curvature limiting teeth SP1L, SP3L, and SP4L have substantially the same structure as that of the chain-curvature limiting tooth SP2L of the second sprocket SP2. The chain-curvature limiting tooth SP3L has substantially the same structure as that of the modification illustrated in FIG. 22. Thus, they will not be described in detail here for the sake of brevity.

As seen in FIG. 4, the plurality of first sprocket teeth SP1B includes a first downshifting initiation tooth SP1N and a first axially recessed tooth SP1R recessed axially with respect to the rotational center axis A1. The first downshifting initiation tooth SP1N is configured to first receive the bicycle chain C in a downshifting operation in which the bicycle chain C is shifted from the smaller sprocket SP2 to the first sprocket SP1. The first axially recessed tooth SP1R is configured to reduce interference between the second sprocket SP2 and the bicycle chain C in the downshifting operation.

The first axially recessed tooth SP1R is adjacent to the first downshifting initiation tooth SP1N without another tooth therebetween on a downstream side of the rotational driving direction D11. The first downshifting initiation tooth SP1N and the first axially recessed tooth SP1R are disposed in the at least one first downshifting facilitation area FD1. In this embodiment, the plurality of first sprocket teeth SP1B includes a plurality of first downshifting initiation teeth SP1N and a plurality of first axially recessed teeth SP1R. However, a total number of the first downshifting initiation teeth SP1N is not limited to this embodiment. A total number of the first axially recessed teeth SP1R is limited to this embodiment.

Figure 28:
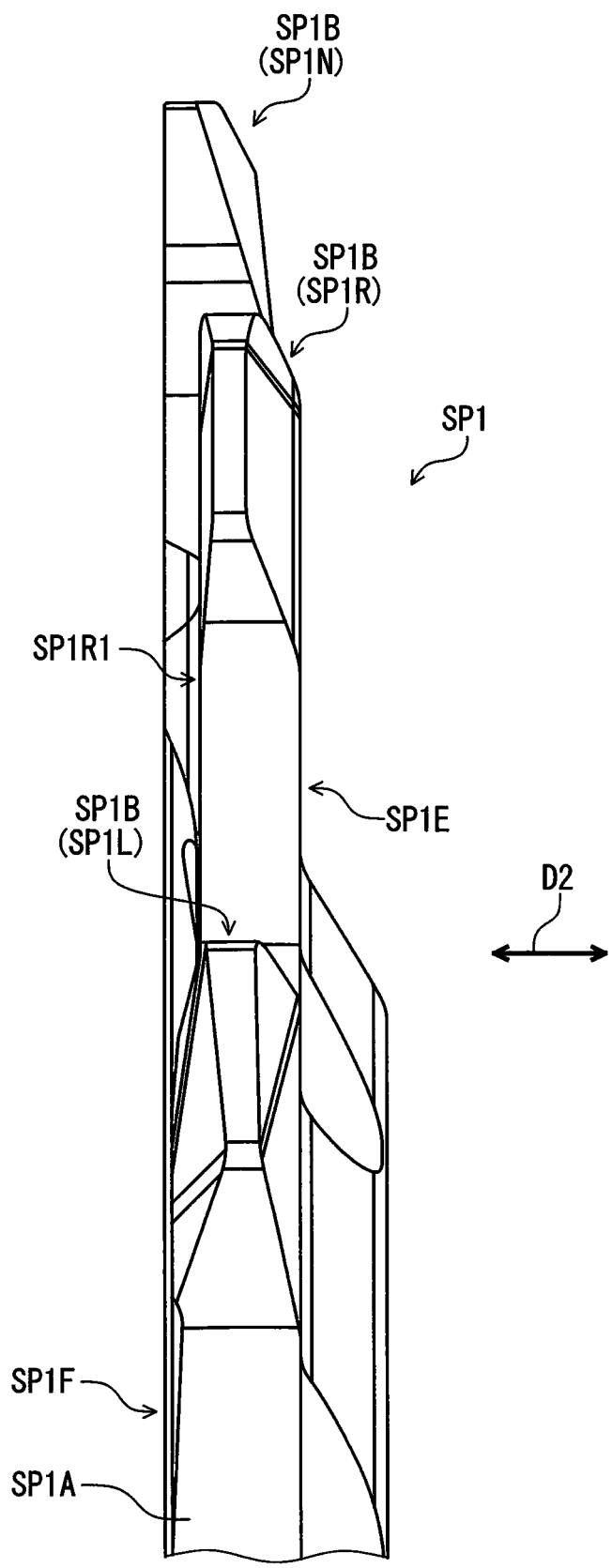
FIG. 28 is a partial front view of the sprocket illustrated in FIG. 4.

As seen in FIG. 28, in this embodiment, the first axially recessed tooth SP1R has a recess SP1R1 provided on the first bicycle-outboard surface SP1F. The recess SP1R is recessed from the first bicycle-outboard surface SP1F to the first bicycle-inboard surface SP1E in the axial direction D2.

As seen in FIG. 19, the at least one chain-curvature limiting tooth SP2L is disposed next to the first axially recessed tooth SP1R without another tooth therebetween on a downstream side of the rotational driving direction D11 when viewed from the axial direction D2 with respect to the rotational center axis A1. The chain-curvature limiting surface SP2L1 is configured to support the inner link plate C1 of the bicycle chain C in the axial direction D2 in a chain-inclining state where the bicycle chain C is inclined from the chain-curvature limiting tooth SP2L toward the first axially recessed tooth SP1R so as to prevent the first axially recessed tooth SP1R from engaging in the outer link space C2A provided between the opposed pair of outer link plates C2 of the bicycle chain C.

As seen in FIG. 4, the plurality of sprocket teeth SP1B includes at least one axially recessed upshifting initiation tooth SP1U recessed axially with respect to the rotational center axis A1. In this embodiment, the at least one axially recessed upshifting initiation tooth SP1U includes a plurality of axially recessed upshifting initiation teeth SP1U. Specifically, the at least one axially recessed upshifting initiation tooth SP1U includes a first axially recessed upshifting initiation tooth SP1UA and a second axially recessed upshifting initiation tooth SP1UB. However, a total number of the axially recessed upshifting initiation teeth SP1U is not limited to this embodiment.

The at least one axially recessed upshifting initiation tooth SP1U is disposed in the at least one upshifting facilitation area FU1. The at least one axially recessed upshifting initiation tooth SP1U is configured to disengage the inner link plate C1 of the bicycle chain C from the at least one axially recessed upshifting initiation tooth SP1U during an upshifting operation in which the bicycle chain C shifts from the bicycle sprocket SP1 toward the smaller sprocket SP2.

The axially recessed upshifting initiation tooth SP1U is configured to first derail the bicycle chain C from the first sprocket SP1 at the axially recessed upshifting initiation tooth SP1U in the upshifting operation in which the bicycle chain C is shifted from the first sprocket SP1 to the smaller sprocket SP2. The axially recessed upshifting initiation tooth SP1U is configured to first disengage from the opposed pair of inner link plates C1 of the bicycle chain C in the upshifting operation. The axially recessed upshifting initiation tooth SP1U is not configured to first disengage from the opposed pair of outer link plates C2 of the bicycle chain C in the upshifting operation since an axial width of the opposed pair of outer link plates C2 is larger than an axial width of the opposed pair of inner link plates C1.

The plurality of sprocket teeth SP1B includes a lastly chain-engaging tooth SP1T adjacent to the at least one axially recessed upshifting initiation tooth SP1U. The lastly chain-engaging tooth SP1T is disposed on a downstream side of the at least one axially recessed upshifting initiation tooth SP1U with respect to the rotational driving direction D11. The lastly chain-engaging tooth SP1T is configured to lastly disengage from the outer link plate C2 of the bicycle chain C in the upshifting operation. In this embodiment, the plurality of sprocket teeth SP1B includes lastly chain-engaging teeth SP1T. The lastly chain-engaging tooth SP1T is provided in the upshifting facilitation area FU9.

The plurality of sprocket teeth SP1B includes at least one axially recessed tooth SP1P adjacent to the at least one axially recessed upshifting initiation tooth SP1U without another tooth in the circumferential direction D1 with respect to the rotational center axis A1 on an upstream side of the at least one axially recessed upshifting initiation tooth SP1U with respect to the rotational driving direction D11. In this embodiment, the plurality of sprocket teeth SP1B includes a plurality of axially recessed teeth SP1P. However, a total number of the axially recessed teeth SP1P is not limited to this embodiment.

The axially recessed tooth SP1P is configured to reduce interference between the first sprocket SP1 and the bicycle chain C in the upshifting operation in which the bicycle chain C is shifted from the first sprocket SP1 to the smaller sprocket SP2. The axially recessed tooth SP1P is provided in the upshifting facilitation area FU1.

Figure 29:
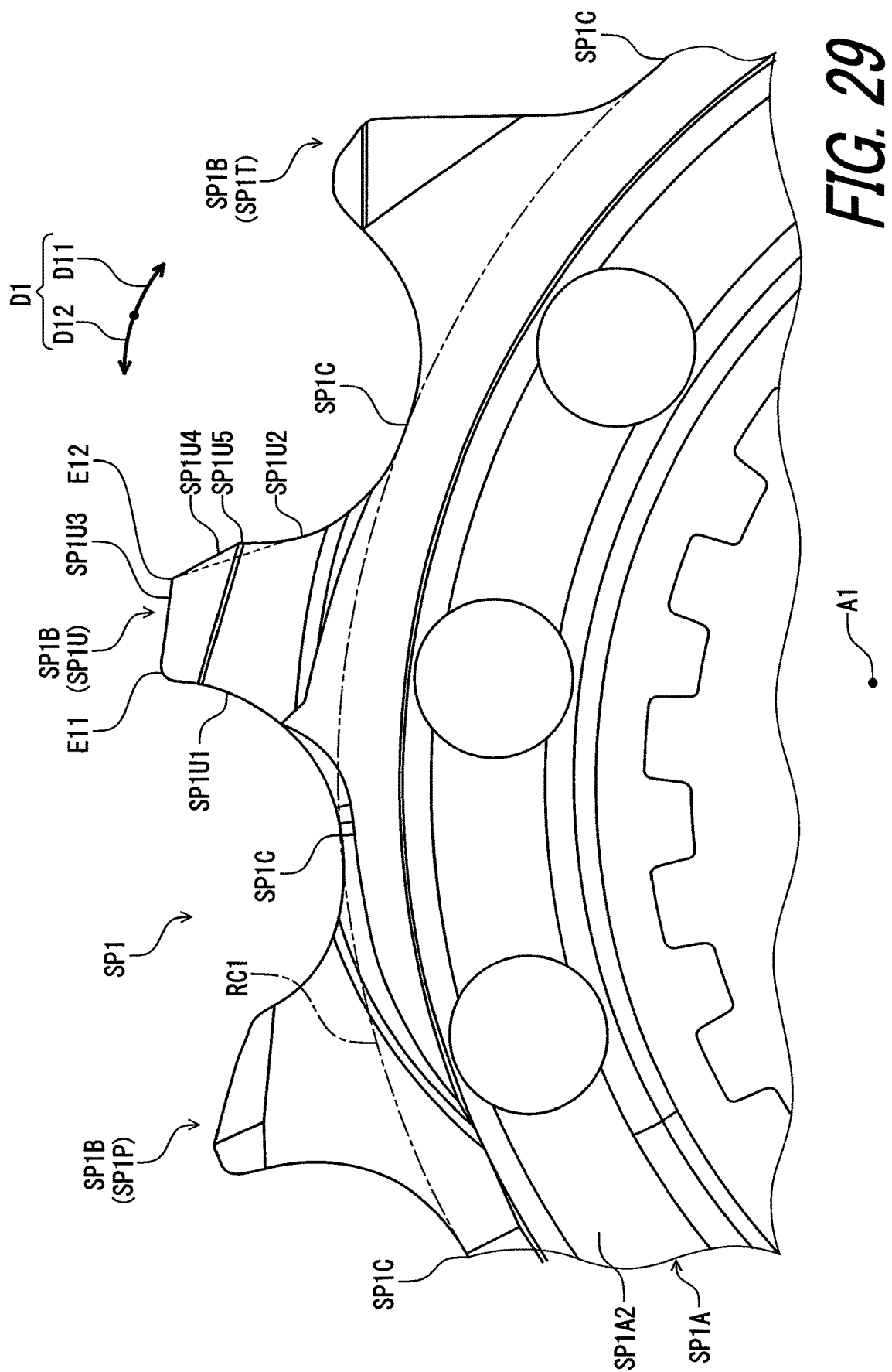
FIG. 29 is a partial side elevational view of the sprocket illustrated in FIG. 4.
Figure 30:
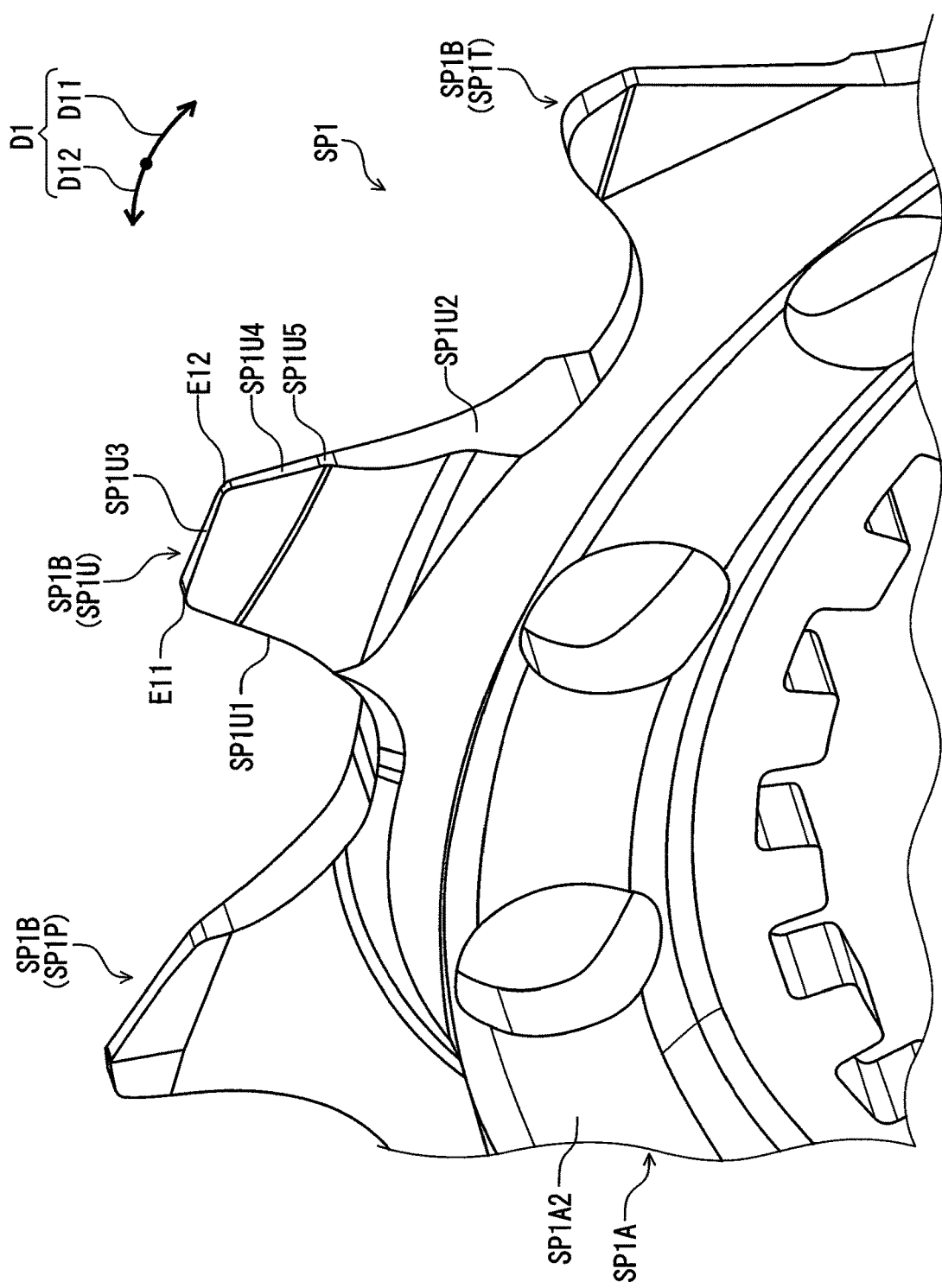
FIG. 30 is a partial perspective view of the sprocket illustrated in FIG. 4.

As seen in FIGS. 29 and 30, the at least one axially recessed upshifting initiation tooth SP1U includes a driving surface SP1U1, a non-driving surface SP1U2, and a tooth tip portion SP1U3. The driving surface SP1U1 includes a driving-surface-side tooth tip end E11. The non-driving surface SP1U2 includes a non-driving-surface-side tooth tip end E12. The tooth tip portion SP1U3 connects the driving-surface-side tooth tip end E11 and the non-driving-surface-side tooth tip end E12. The driving-surface-side tooth tip end E11 is provided at a radially outermost end of the driving surface SP1U1. The non-driving-surface-side tooth tip end E12 is provided at a radially outermost end of the non-driving surface SP1U2.

As seen in FIG. 29, the non-driving surface SP1U2 extends from the non-driving-surface-side tooth tip end E12 in the circumferential direction D1 with respect to the rotational center axis A1. The non-driving surface SP1U2 includes a non-driving surface protrusion SP1U4 disposed radially inwardly from the non-driving-surface-side tooth tip end E12 with respect to the rotational center axis A1. The non-driving surface protrusion SP1U4 has a protrusion tip SP1U5. The protrusion tip SP1U5 is disposed radially inwardly from the non-driving-surface-side tooth tip end E12 with respect to the rotational center axis A1. The protrusion tip SP1U5 is disposed radially outwardly from the tooth bottom circle RC1 of the bicycle sprocket SP1 with respect to the rotational center axis A1.

Figure 31:
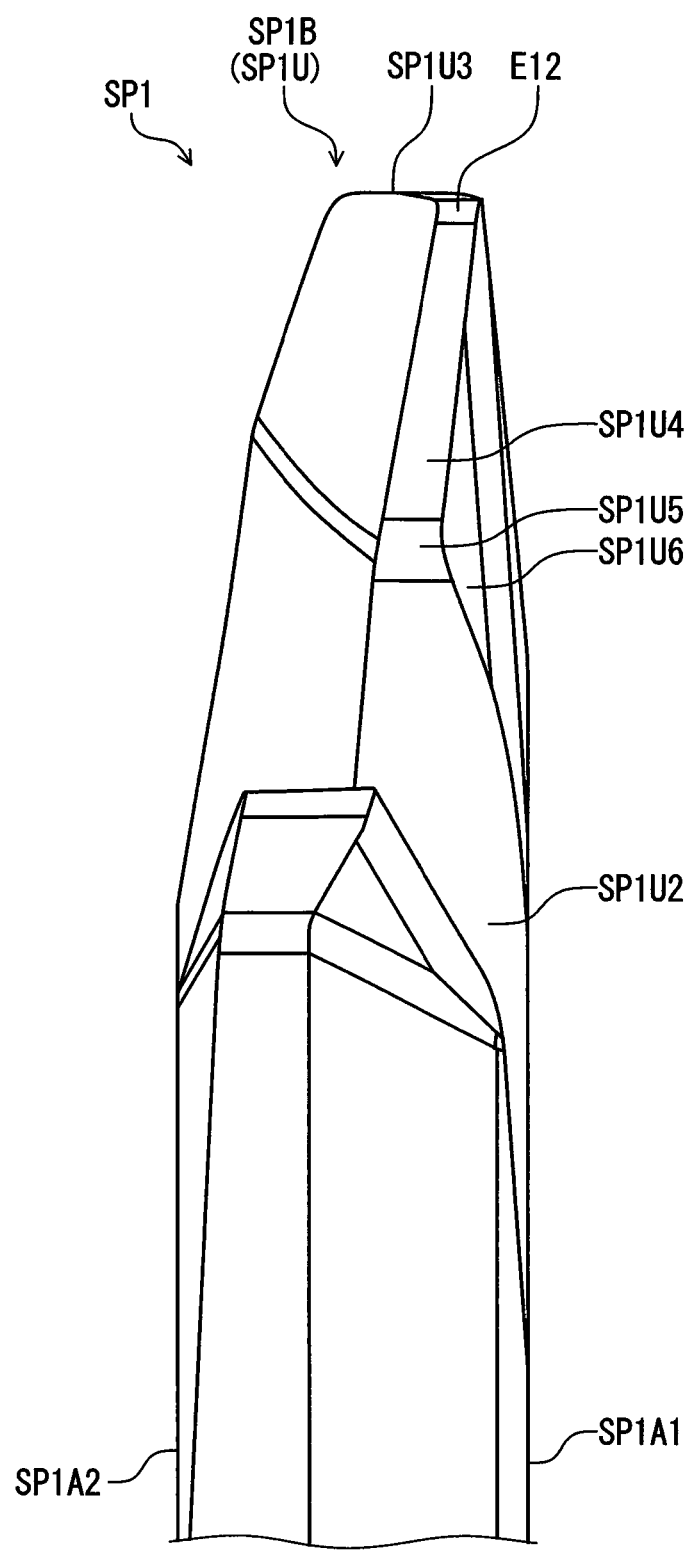
FIG. 31 is a partial front view of the sprocket illustrated in FIG. 4.
Figure 32:
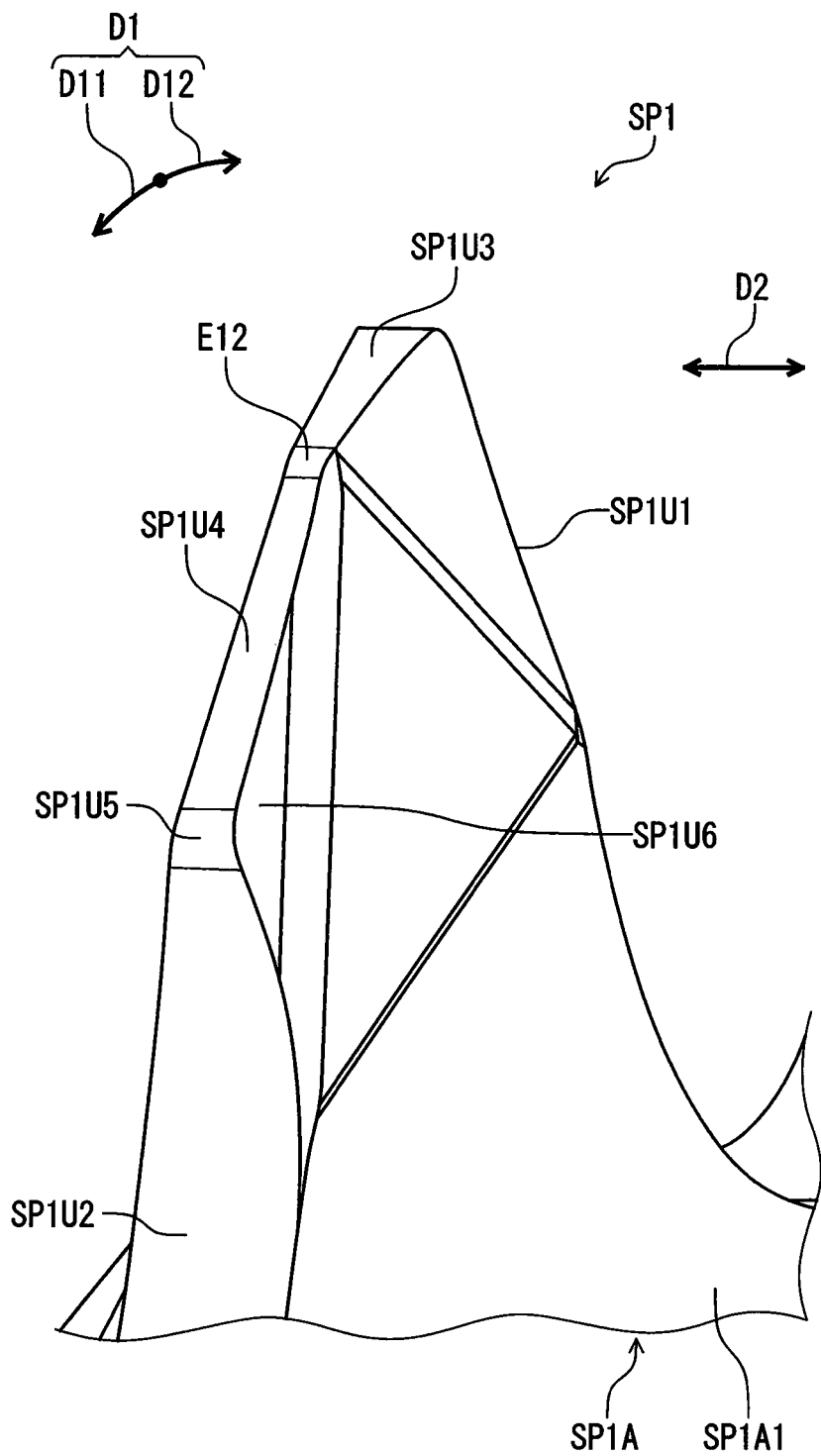
FIG. 32 is a partial perspective view of the sprocket illustrated in FIG. 4.

As seen in FIGS. 31 and 32, the protrusion tip SP1U5 is disposed closer to the second axially-facing surface SP1A2 than the non-driving-surface-side tooth tip end E12 in the axial direction D2 so that a guiding slope SP1U6 extends from the protrusion tip SP1U5 toward the first axially-facing surface SP1A1. The guiding slope SP1U6 is provided on the non-driving surface protrusion SP1U4 and is closer to the first axially-facing surface SP1A1 than to the second axially-facing surface SP1A2 in the axial direction D2.

Figure 33:
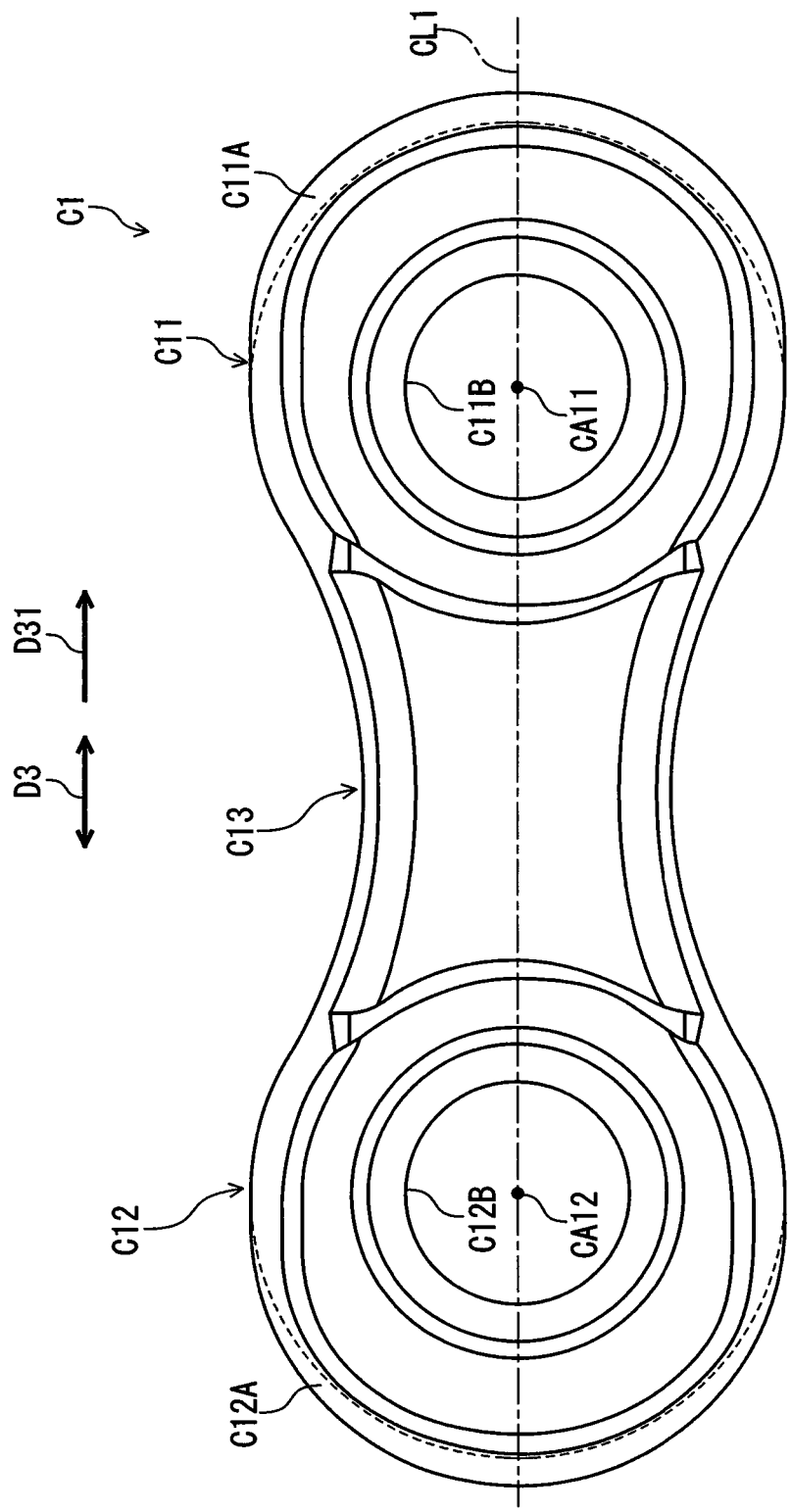
FIG. 33 is a side elevational view of an inner link plate of the bicycle chain of the bicycle drive train illustrated in FIG. 1.

As seen in FIG. 33, the bicycle chain C comprises an inner link plate C1 and an outer link plate C2. The inner link plate C1 includes a first inner-link end portion C11, a second inner-link end portion C12, and an inner-link intermediate portion C13 interconnecting the first inner-link end portion C11 and the second inner-link end portion C12. The first inner-link end portion C11 has a first longitudinally elongated edge C11A in a longitudinal direction D3 with respect to a longitudinal centerline CL1 of the inner link plate C1. The first longitudinally elongated edge C11A extends in a first longitudinal direction D31 defined from the second inner-link end portion C12 toward the first inner-link end portion C11 along the longitudinal direction D3. The first inner-link end portion C11 includes a first inner-link opening C11B having a first center axis CA11. The second inner-link end portion C12 includes a second inner-link opening C12B having a second center axis CA12. The longitudinal centerline CL1 intersects with the first center axis CA11 and the second center axis CA12. The longitudinal direction D3 is parallel to the longitudinal centerline CL1.

The second inner-link end portion C12 has a second longitudinally elongated edge C12A in the longitudinal direction D3. The second longitudinally elongated edge C12A extends in a second longitudinal direction D32 defined from the first inner-link end portion toward the second inner-link end portion C12 along the longitudinal direction D3.

Figure 34:
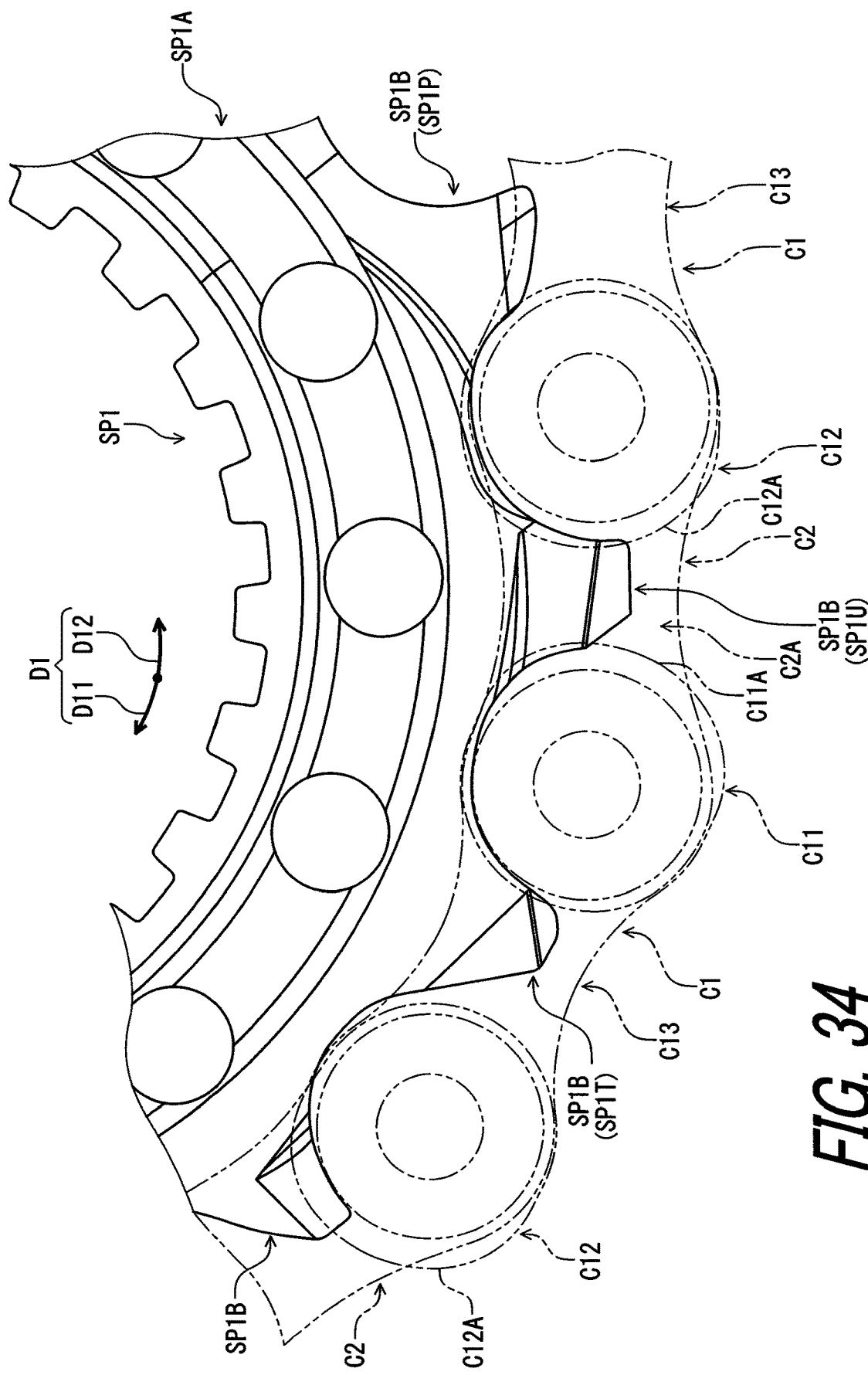
FIG. 34 is a partial side elevational view of the sprocket illustrated in FIG. 4, with the bicycle chain.

As seen in FIG. 34, the first longitudinally elongated edge C11A is configured to support one of the plurality of sprocket teeth SP1B of the bicycle sprocket SP1 in the axial direction D2 in an engagement state where the one of the plurality of sprocket teeth SP1B is positioned in the outer link space C2A defined between the pair of outer link plates C2 of the bicycle chain C. The second longitudinally elongated edge C12A is configured to support one of the plurality of sprocket teeth SP1B of the bicycle sprocket SP1 in the axial direction D2 in an engagement state where the one of the plurality of sprocket teeth SP1B is positioned in the outer link space C2A defined between the pair of outer link plates C2 of the bicycle chain C.

Figure 35:
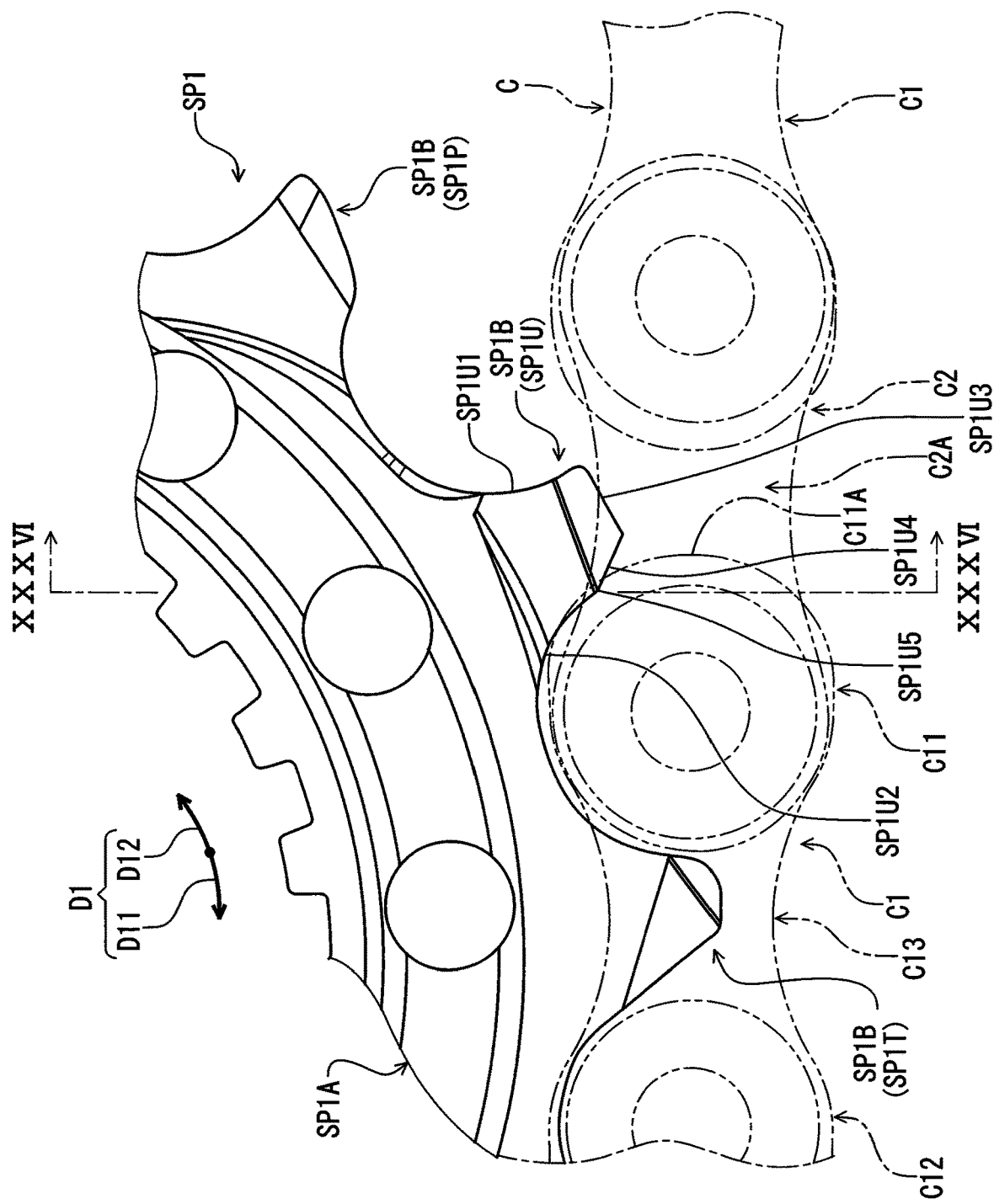
FIG. 35 is a partial side elevational view of the sprocket illustrated in FIG. 4, with the bicycle chain.
Figure 36:
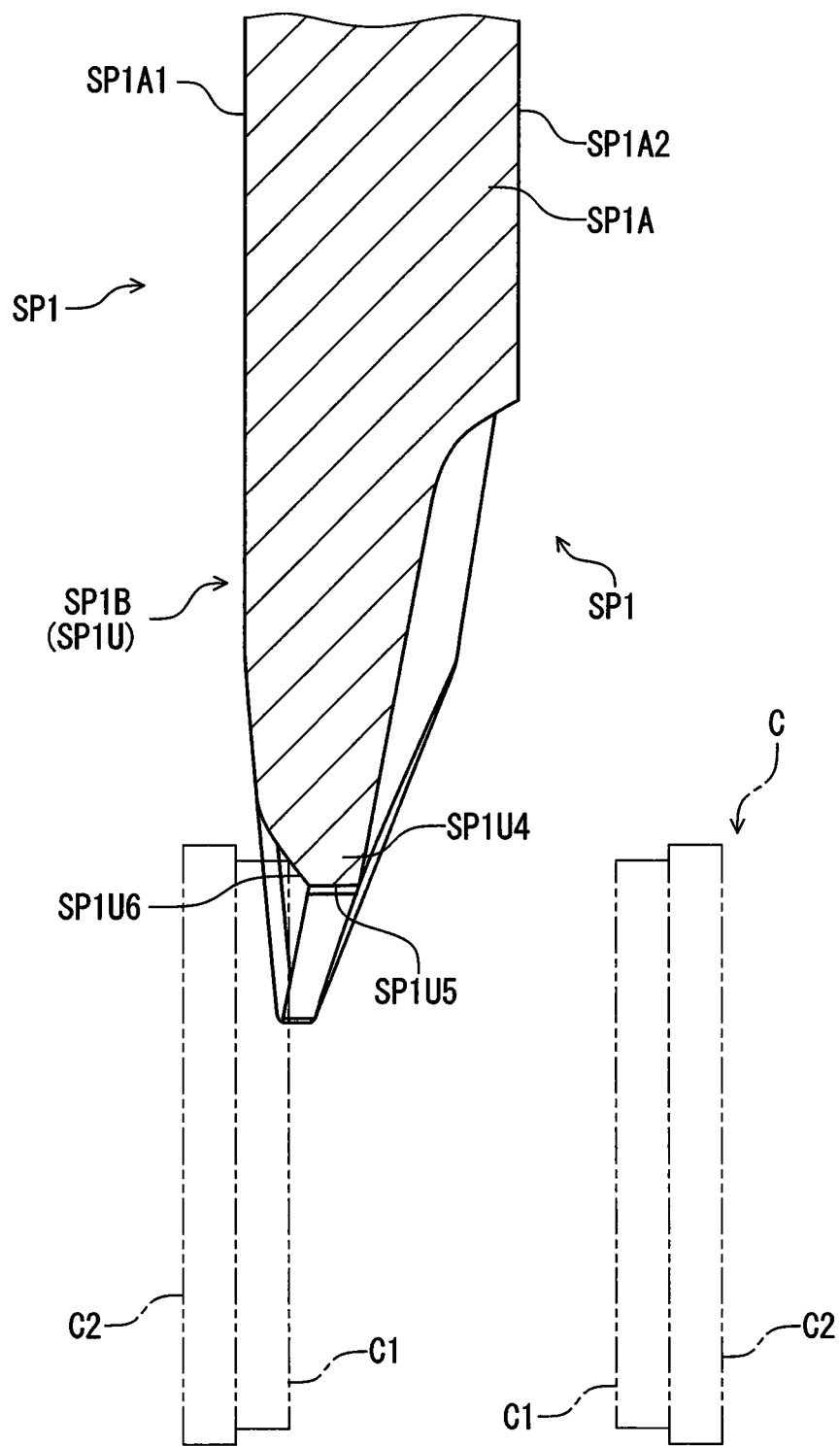
FIG. 36 is a cross-sectional view of the sprocket taken along line XXXVI-XXXVI of FIG. 35, with the bicycle chain.

As seen in FIGS. 35 and 36, the guiding slope SP1U6 of the non-driving surface protrusion SP1U4 is contactable with the first longitudinally elongated edge C11A of the inner link plate C1 of the bicycle chain C in the upshifting operation in which the bicycle chain C is shifted from the bicycle sprocket SP1 to the smaller sprocket SP2. Thus, the non-driving surface protrusion SP1U4 guides the bicycle chain C with the guiding slope SP1U6 so that the axially recessed upshifting initiation tooth SP1U (SP1UA) enters into the outer link space C2A of the opposed pair of outer link plates C2 in the upshifting operation. The axially recessed upshifting initiation tooth SP1U (SP1UB) first disengages from the opposed pair of inner link plates C1 of the bicycle chain C in the upshifting operation.

Sprocket teeth of other sprockets can include the structure of the axially recessed upshifting initiation tooth SP1U of the sprocket SP1. For example, as seen in FIG. 5, the plurality of sprocket teeth SP2B includes at least one axially recessed upshifting initiation tooth SP2U recessed axially with respect to the rotational center axis A1. In this embodiment, the at least one axially recessed upshifting initiation tooth SP2U includes a plurality of axially recessed upshifting initiation teeth SP2U. Specifically, the at least one axially recessed upshifting initiation tooth SP2U includes a first axially recessed upshifting initiation tooth SP2UA and a second axially recessed upshifting initiation tooth SP2UB. However, a total number of the axially recessed upshifting initiation teeth SP2U is not limited to this embodiment.

As seen in FIG. 7, the plurality of sprocket teeth SP4B includes at least one axially recessed upshifting initiation tooth SP4U recessed axially with respect to the rotational center axis A1. In this embodiment, the at least one axially recessed upshifting initiation tooth SP4U includes a plurality of axially recessed upshifting initiation teeth SP4U. Specifically, the at least one axially recessed upshifting initiation tooth SP4U includes a first axially recessed upshifting initiation tooth SP4UA and a second axially recessed upshifting initiation tooth SP4UB. However, a total number of the axially recessed upshifting initiation teeth SP4U is not limited to this embodiment.

As seen in FIG. 8, the plurality of sprocket teeth SP5B includes at least one axially recessed upshifting initiation tooth SP5U recessed axially with respect to the rotational center axis A1. In this embodiment, the at least one axially recessed upshifting initiation tooth SP5U includes a plurality of axially recessed upshifting initiation teeth SP5U. Specifically, the at least one axially recessed upshifting initiation tooth SP5U includes a first axially recessed upshifting initiation tooth SP5UA and a second axially recessed upshifting initiation tooth SP5UB. However, a total number of the axially recessed upshifting initiation teeth SP5U is not limited to this embodiment.

As seen in FIG. 9, the plurality of sprocket teeth SP6B includes at least one axially recessed upshifting initiation tooth SP6U recessed axially with respect to the rotational center axis A1. In this embodiment, the at least one axially recessed upshifting initiation tooth SP6U includes a plurality of axially recessed upshifting initiation teeth SP6U. Specifically, the at least one axially recessed upshifting initiation tooth SP6U includes a first axially recessed upshifting initiation tooth SP6UA, a second axially recessed upshifting initiation tooth SP6UB, and a third axially recessed upshifting initiation tooth SP6UC. However, a total number of the axially recessed upshifting initiation teeth SP6U is not limited to this embodiment.

As seen in FIG. 10, the plurality of sprocket teeth SP7B includes at least one axially recessed upshifting initiation tooth SP7U recessed axially with respect to the rotational center axis A1. In this embodiment, the at least one axially recessed upshifting initiation tooth SP7U includes a plurality of axially recessed upshifting initiation teeth SP7U. Specifically, the at least one axially recessed upshifting initiation tooth SP7U includes a first axially recessed upshifting initiation tooth SP7UA, a second axially recessed upshifting initiation tooth SP7UB, and a third axially recessed upshifting initiation tooth SP7UC. However, a total number of the axially recessed upshifting initiation teeth SP7U is not limited to this embodiment.

As seen in FIG. 11, the plurality of sprocket teeth SP8B includes at least one axially recessed upshifting initiation tooth SP8U recessed axially with respect to the rotational center axis A1. In this embodiment, the at least one axially recessed upshifting initiation tooth SP8U includes a plurality of axially recessed upshifting initiation teeth SP8U. Specifically, the at least one axially recessed upshifting initiation tooth SP8U includes a first axially recessed upshifting initiation tooth SP8UA, a second axially recessed upshifting initiation tooth SP8UB, a third axially recessed upshifting initiation tooth SP8UC, and a fourth axially recessed upshifting initiation tooth SP8UD. However, a total number of the axially recessed upshifting initiation teeth SP8U is not limited to this embodiment.

The axially recessed upshifting initiation teeth SP2U to SP8U have substantially the same structure as that of the axially recessed upshifting initiation tooth SP1U of the sprocket SP1. Thus, they will not be described in detail here for the sake of brevity.

Sprocket teeth of other sprockets can include the structures of the first downshifting initiation tooth SP1N, the first axially recessed tooth SP1R, the axially recessed tooth SP1P, and the lastly chain-engaging tooth SP1T of the sprocket SP1. For example, as seen in FIG. 5, the plurality of sprocket teeth SP2B includes a first downshifting initiation tooth SP2N, a first axially recessed tooth SP2R, a plurality of axially recessed teeth SP2P, and a plurality of lastly chain-engaging teeth SP2T. As seen in FIG. 7, the plurality of sprocket teeth SP4B includes a plurality of first downshifting initiation teeth SP4N, a plurality of first axially recessed teeth SP4R, a plurality of axially recessed teeth SP4P, and a plurality of lastly chain-engaging teeth SP4T. As seen in FIG. 8, the plurality of sprocket teeth SP5B includes a plurality of first downshifting initiation teeth SP5N, a plurality of first axially recessed teeth SP5R, a plurality of axially recessed teeth SP5P, and a plurality of lastly chain-engaging teeth SP5T. As seen in FIG. 9, the plurality of sprocket teeth SP6B includes a plurality of first downshifting initiation teeth SP6N, a plurality of first axially recessed teeth SP6R, a plurality of axially recessed teeth SP6P, and a plurality of lastly chain-engaging teeth SP6T. As seen in FIG. 10, the plurality of sprocket teeth SP7B includes a plurality of first downshifting initiation teeth SP7N, a plurality of first axially recessed teeth SP7R, a plurality of axially recessed teeth SP7P, and a plurality of lastly chain-engaging teeth SP7T. As seen in FIG. 11, the plurality of sprocket teeth SP8B includes a plurality of first downshifting initiation teeth SP8N, a plurality of first axially recessed teeth SP8R, a plurality of axially recessed teeth SP8P, and a plurality of lastly chain-engaging teeth SP8T.

The first downshifting initiation teeth SP2N to SP8N have substantially the same structures as that of the first downshifting initiation teeth SP1N of the sprocket SP1. The first axially recessed teeth SP2R to SP8R have substantially the same structures as that of the first axially recessed tooth SP1R of the sprocket SP1. The axially recessed teeth SP2P to SP8P have substantially the same structures as that of the axially recessed tooth SP1P of the sprocket SP1. The lastly chain-engaging teeth SP2T to SP8T have substantially the same structures as that of the lastly chain-engaging tooth SP1T of the sprocket SP1. Thus, they will not be described in detail here for the sake of brevity.

As seen in FIG. 12, the plurality of sprocket teeth SP9B includes an intermediate tooth SP9M and at least one axially recessed upshifting tooth SP9X recessed axially with respect to the rotational center axis A1. The at least one axially recessed upshifting tooth SP9X is disposed in the at least one upshifting facilitation area FU9. The axially recessed upshifting tooth SP9X is configured to reduce interference between the bicycle sprocket SP9 and the bicycle chain C in an upshifting operation in which the bicycle chain C is shifted from the bicycle sprocket SP9 to the smaller sprocket SP8. In this embodiment, the plurality of sprocket teeth SP9B includes a plurality of axially recessed upshifting teeth SP9X. The axially recessed upshifting tooth SP9X is disposed in the upshifting facilitation area FU9. However, a total number of the axially recessed upshifting teeth SP9X is not limited to this embodiment.

The plurality of sprocket teeth SP9B includes at least one axially recessed downshifting tooth SP9D recessed axially with respect to the rotational center axis A1. The at least one axially recessed downshifting tooth SP9D is disposed in the at least one downshifting facilitation area FD9. The axially recessed downshifting tooth SP9D is configured to reduce interference between the bicycle sprocket SP9 and the bicycle chain C in a downshifting operation in which the bicycle chain C is shifted from the smaller sprocket SP8 to the bicycle sprocket SP9. In this embodiment, the plurality of sprocket teeth SP9B includes a plurality of axially recessed downshifting teeth SP9D. The axially recessed downshifting tooth SP9D is disposed in the downshifting facilitation area FD9. However, a total number of the axially recessed downshifting teeth SP9D is not limited to this embodiment. The axially recessed downshifting teeth SP9D has substantially the same structure as that of the first axially recessed tooth SP1R (FIG. 4) of the sprocket SP1.

As seen in FIG. 12, the intermediate tooth SP9M can be an axially recessed downshifting tooth configured to reduce interference between the bicycle sprocket SP9 and the bicycle chain C in the downshifting operation in which the bicycle chain C is shifted from the smaller sprocket SP8 to the bicycle sprocket SP9. The plurality of sprocket teeth SP9B includes a plurality of downshifting initiation teeth SP9N configured to first receive the bicycle chain C in the downshifting operation in which the bicycle chain C is shifted from the smaller sprocket SP8 to the bicycle sprocket SP9. The downshifting initiation teeth SP9N is provided in the downshifting facilitation area FD9.

The plurality of sprocket teeth SP9 includes a plurality of first derailing teeth SP9Y, a plurality of second derailing teeth SP9Q, and a plurality of upshifting facilitation teeth SP9Z. The first derailing tooth SP9Y is configured to first derail the bicycle chain C from the bicycle sprocket SP9 in the upshifting operation in which the bicycle chain C is shifted from the bicycle sprocket SP9 to the smaller sprocket SP8 in a first chain-phase. The second derailing tooth SP9Q is configured to first derail the bicycle chain C from the bicycle sprocket SP9 in the upshifting operation in which the bicycle chain C is shifted from the bicycle sprocket SP9 to the smaller sprocket SP8 in a second chain-phase different from the first chain-phase. The second derailing tooth SP9Q is configured to facilitate derailing the bicycle chain C from the bicycle sprocket SP9 at the upshifting facilitation tooth SP9Z in the upshifting operation. The upshifting facilitation tooth SP9Z is configured to lastly disengage from the bicycle chain C in the upshifting operation in the second chain-phase. The second derailing tooth SP9Q is configured to lastly disengage from the bicycle chain C in the upshifting operation in the first chain-phase. The first derailing tooth SP9Y, the second derailing tooth SP9Q, and the upshifting facilitation tooth SP9Z are provided in the upshifting facilitation area FU9.

The axially recessed upshifting tooth SP9X has substantially the same function as that of the axially recessed tooth SP1P (FIG. 4) of the sprocket SP1. Thus, the axially recessed upshifting tooth SP9X can be regarded as being the axially recessed tooth SP9X. The first derailing tooth SP9Y and the second derailing tooth SP9Q have substantially the same function as that of the axially recessed upshifting initiation tooth SP1U (FIG. 4) of the sprocket SP1. Thus, the first derailing tooth SP9Y and the second derailing tooth SP9Q can be regarded as being the axially recessed upshifting initiation tooth SP9Y and the axially recessed upshifting initiation tooth SP9Q. The second derailing tooth SP9Q and the upshifting facilitation tooth SP9Z have substantially the same function as that of the lastly chain-engaging tooth SP1T (FIG. 4) of the sprocket SP1. Thus, the second derailing tooth SP9Q and the upshifting facilitation tooth SP9Z can be regarded as being the lastly chain-engaging tooth SP9Q and the lastly chain-engaging tooth SP9Z.

As seen in FIG. 3, the sprocket body SP9A includes a first axially-facing surface SP9E and a second axially-facing surface SP9F. The first axially-facing surface SP9E and the second axially-facing surface SP9F face in the axial direction D2 with respect to the rotational center axis A1 of the bicycle sprocket SP9. The second axially-facing surface SP9F is provided on a reverse side of the first axially-facing surface SP9E in the axial direction D2. The first axially-facing surface SP9E is configured to face toward the center plane 10A (FIG. 1) of the bicycle 10 in an assembled state where the bicycle sprocket SP9 is mounted to the bicycle 10.

Figure 37:
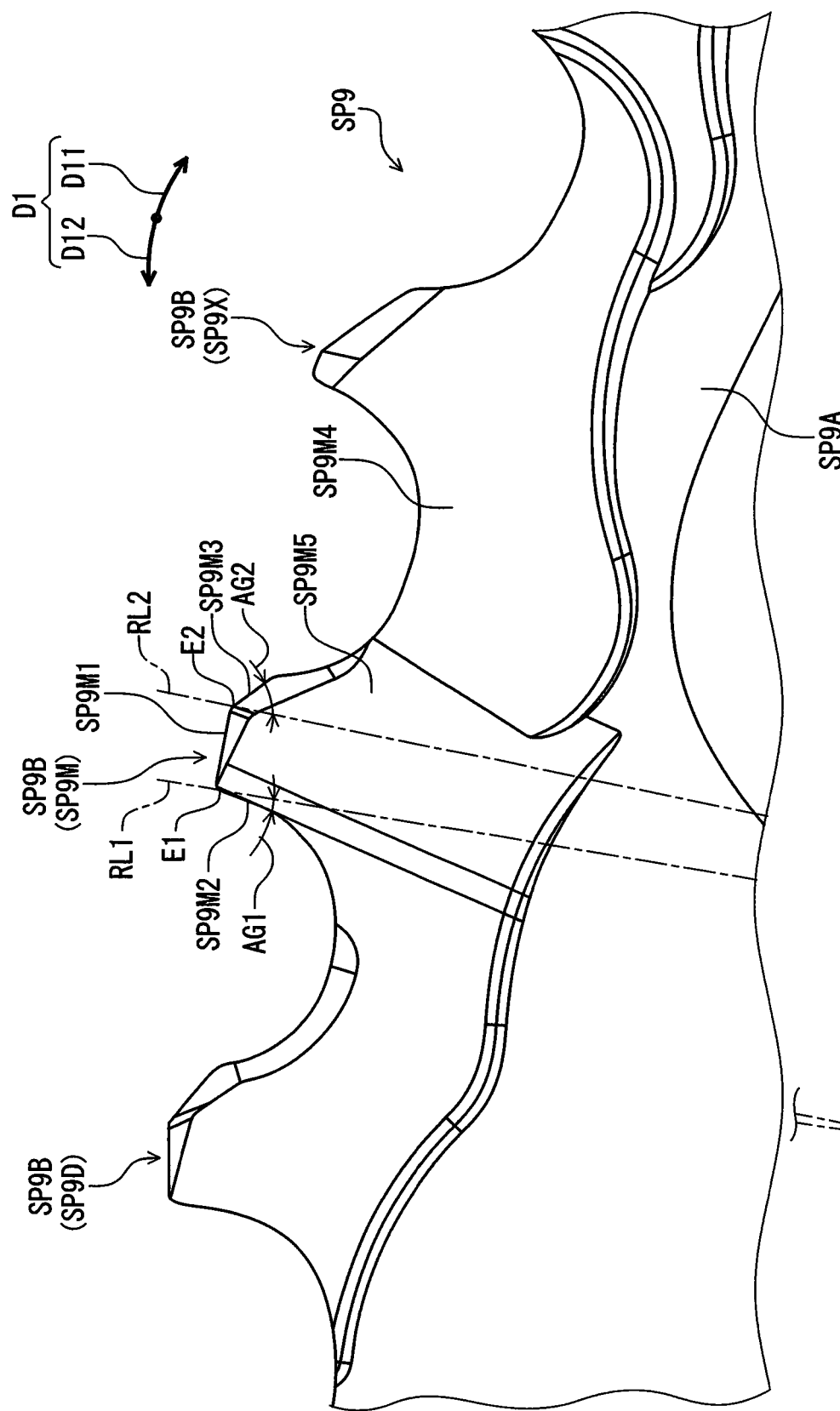
FIG. 37 is a partial side elevational view of the sprocket illustrated in FIG. 12.

As seen in FIG. 37, the at least one axially recessed upshifting tooth SP9X is adjacent to the intermediate tooth SP9M without another tooth therebetween on a downstream side of the rotational driving direction D11. The axially recessed upshifting tooth SP9X is provided on a downstream side of the intermediate tooth SP9M in the rotational driving direction D11. The at least one axially recessed downshifting tooth SP9D is adjacent to the intermediate tooth SP9M without another tooth therebetween on an upstream side of the rotational driving direction D11. The axially recessed downshifting tooth SP9D is provided on an upstream side of the intermediate tooth SP9M in the rotational driving direction D11. However, another tooth can be provided between the axially recessed downshifting tooth SP9D and the intermediate tooth SP9M in the circumferential direction D1.

The intermediate tooth SP9M includes a driving-tooth tip portion SP9M1, a driving-surface linear portion SP9M2, and a non-driving-surface linear portion SP9M3. The driving-surface linear portion SP9M2 has a driving-surface angle AG1 defined between the driving-surface linear portion SP9M2 and a first radial line RL1 extending from the rotational center axis A1 to a radially outermost edge E1 of the driving-surface linear portion SP9M2. The non-driving-surface linear portion SP9M3 has a non-driving-surface angle AG2 defined between the non-driving-surface linear portion SP9M3 and a second radial line RL2 extending from the rotational center axis A1 to a radially outermost edge E2 of the non-driving-surface linear portion SP9M3. The non-driving-surface angle AG2 is larger than the driving-surface angle AG1. The driving-surface angle AG1 ranges from 0 degree to 20 degrees. The non-driving-surface angle AG2 ranges from 20 degrees to 60 degrees. In this embodiment, the driving-surface angle AG1 is 8 degrees, and the non-driving-surface angle AG2 is 40 degrees. However, the driving-surface angle AG1 is not limited to this embodiment and the above range. The non-driving-surface angle AG2 is not limited to this embodiment and the above range.

The bicycle sprocket SP9 comprises a first non-stepped slope SP9M4 provided between the at least one axially recessed upshifting tooth SP9X and the intermediate tooth SP9M in the circumferential direction D1 with respect to the rotational center axis A1. The bicycle sprocket SP9 further comprises a second non-stepped slope SP9M5 provided between the at least one axially recessed downshifting tooth SP9D and the first non-stepped slope SP9M4 in the circumferential direction D1. However, the second non-stepped slope SP9M5 can be omitted from the bicycle sprocket SP9.

Figure 38:
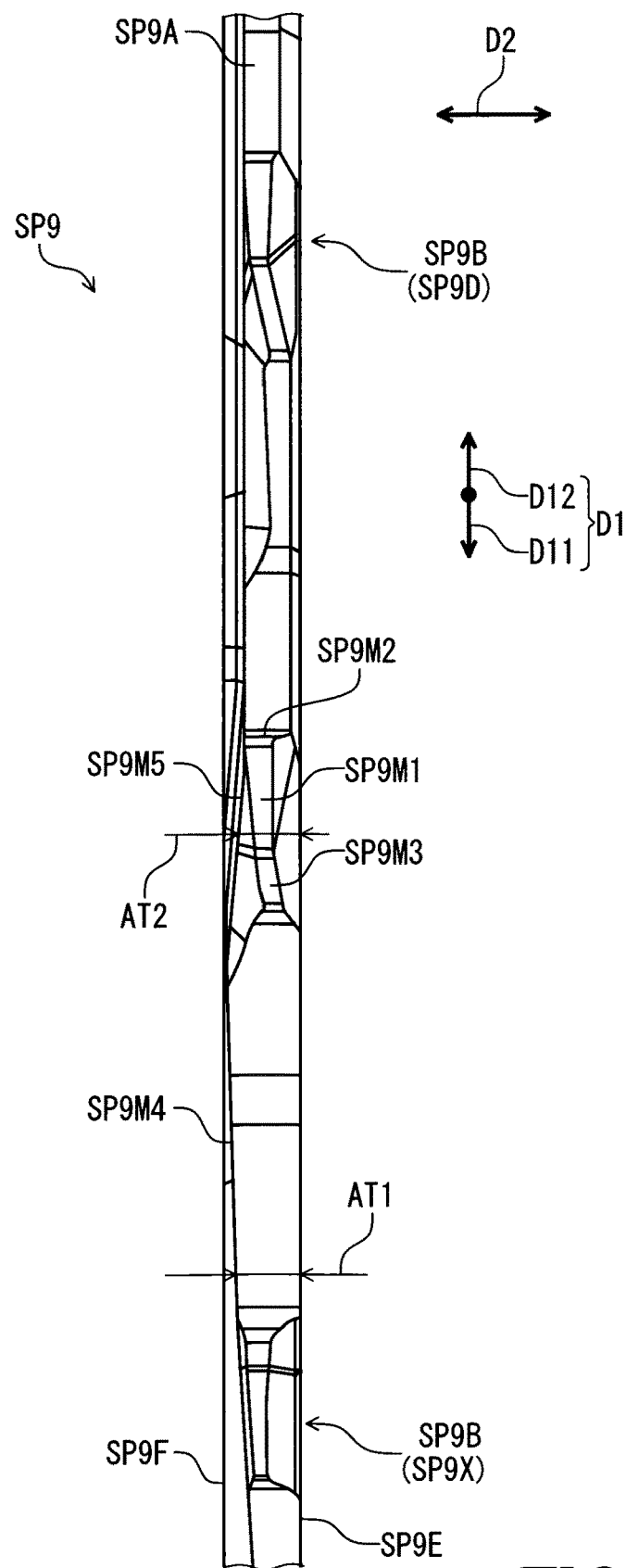
FIG. 38 is a partial front view of the sprocket illustrated in FIG. 12.

As seen in FIG. 38, a first axial thickness AT1 is defined from the first non-stepped slope SP9M4 to the first axially-facing surface SP9E in the axial direction D2. A second axial thickness AT2 is defined from the second non-stepped slope SP9M5 to the first axially-facing surface SP9E in the axial direction D2. The first non-stepped slope SP9M4 extends from the intermediate tooth SP9M toward the axially recessed upshifting tooth SP9X in the circumferential direction D1 to gradually reduce the first axial thickness AT1. The second non-stepped slope SP9M5 extends from the first non-stepped slope SP9M4 toward the axially recessed downshifting tooth SP9D in the circumferential direction D1 to gradually reduce the second axial thickness AT2. Thus, each of the first non-stepped slope SP9M4 and the second non-stepped slope SP9M5 is free of any steps. The maximum value of the first axial thickness AT1 is equal to the maximum value of the second axial thickness AT2. Thus, the first non-stepped slope SP9M4 is smoothly connected to the second non-stepped slope SP9M5 in the circumferential direction D1 without any steps.

The driving-tooth tip portion SP9M1 is at least partly disposed closer to the first axially-facing surface SP9E than to the second axially-facing surface SP9F in the axial direction D2. In this embodiment, the driving-tooth tip portion SP9M1 is partly disposed closer to the first axially-facing surface SP9E than to the second axially-facing surface SP9F in the axial direction D2.

As seen in FIG. 13, the plurality of sprocket teeth SP10B includes a plurality of intermediate teeth SP10M, a plurality of axially recessed upshifting teeth SP10X, a plurality of axially recessed downshifting teeth SP10D, a plurality of downshifting initiation teeth SP1N, a plurality of first derailing teeth SP10Y, a plurality of second derailing teeth SP10Q, and a plurality of upshifting facilitation teeth SP OZ. As seen in FIG. 14, the plurality of sprocket teeth SP11B includes a plurality of intermediate teeth SP11M, a plurality of axially recessed upshifting teeth SP11X, a plurality of axially recessed downshifting teeth SP11D, a plurality of downshifting initiation teeth SP11N, a plurality of first derailing teeth SP11Y, a plurality of second derailing teeth SP11Q, and a plurality of upshifting facilitation teeth SP11Z. As seen in FIG. 15, the plurality of sprocket teeth SP12B includes a plurality of intermediate teeth SP12M, a plurality of axially recessed upshifting teeth SP12X, a plurality of axially recessed downshifting teeth SP12D, a plurality of downshifting initiation teeth SP12N, a plurality of first derailing teeth SP12Y, a plurality of second derailing teeth SP12Q, and a plurality of upshifting facilitation teeth SP12Z.

The axially recessed upshifting teeth SP10X, SP11X, and SP12X have substantially the same structure as that of the axially recessed upshifting teeth SP9X of the sprocket SP9. Thus, the axially recessed upshifting teeth SP10X, SP11X, and SP12X can be regarded as being the axially recessed teeth SP10X, SP11X, and SP12X. The axially recessed downshifting teeth SP10D, SP11D, and SP12D have substantially the same structure as that of the axially recessed downshifting teeth SP9D of the sprocket SP9. The downshifting initiation teeth SP10N, SP11N, and SP12N have substantially the same structure as that of the downshifting initiation teeth SP9N of the sprocket SP9. The first derailing teeth SP10Y, SP11Y, and SP12Y have substantially the same structure as that of the first derailing teeth SP9Y of the sprocket SP9. Thus, the first derailing teeth SP10Y, SP11Y, and SP12Y can be regarded as being the axially recessed upshifting initiation teeth SP10Y, SP11Y, and SP12Y. The second derailing teeth SP10Q, SP11Q, and SP12Q have substantially the same structure as that of the second derailing teeth SP9Q of the sprocket SP9. Thus, the second derailing teeth SP10Q, SP11Q, and SP12Q can be regarded as being the axially recessed upshifting initiation teeth SP10Q, SP11Q, and SP12Q, or as being the lastly chain-engaging teeth SP10Q, SP11Q, and SP12Q. The upshifting facilitation teeth SP10Z, SP11Z, and SP12Z have substantially the same structure as that of the upshifting facilitation teeth SP9Z of the sprocket SP9. Thus, the upshifting facilitation teeth SP10Z, SP11Z, and SP12Z can be regarded as being the lastly chain-engaging teeth SP10Z, SP11Z, and SP12Z. Accordingly, they will not be described in detail here for the sake of brevity.

Modifications

Figure 39:
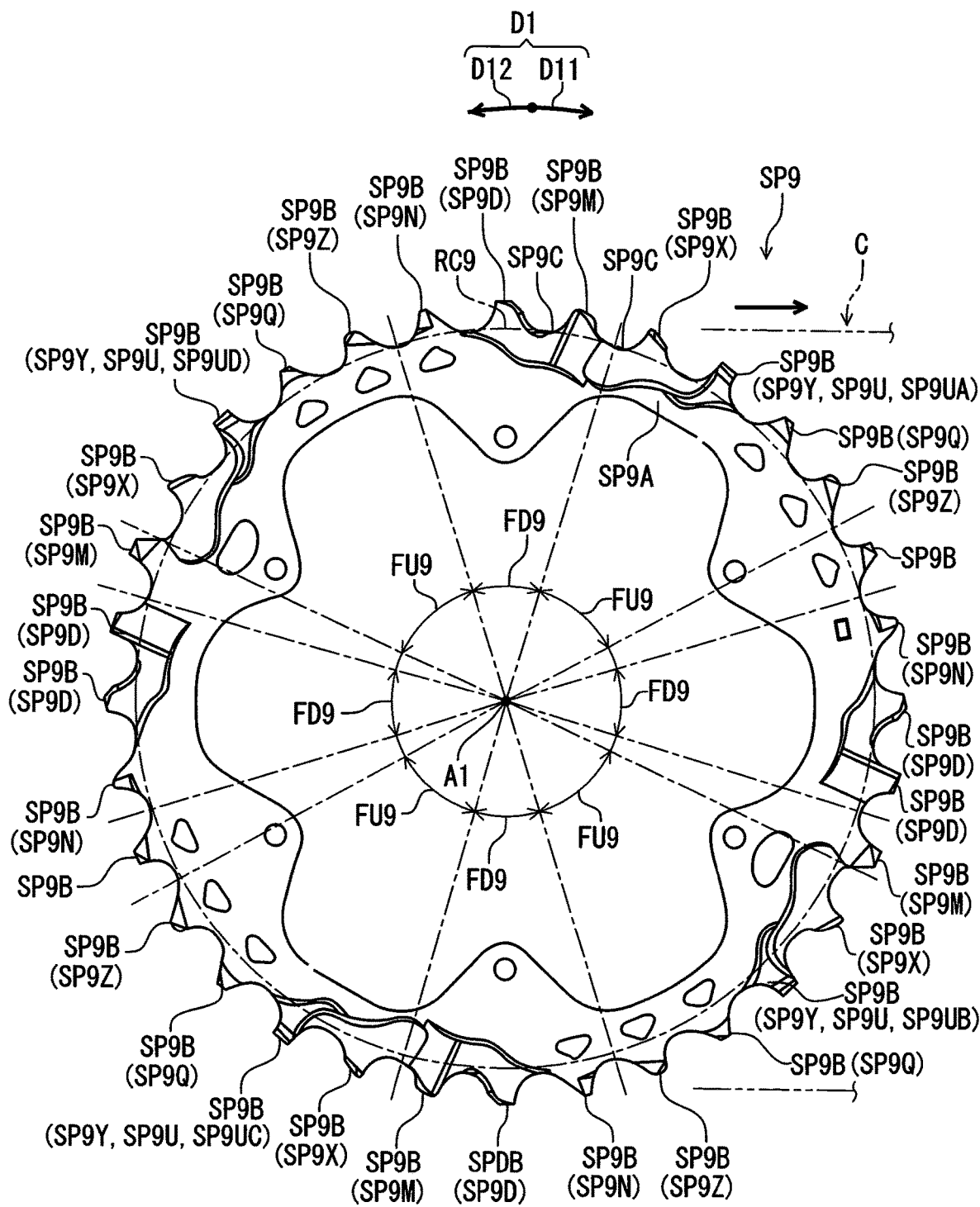
FIG. 39 is a side elevational view of a sprocket in accordance with a modification of the sprocket illustrated in FIG. 12.

The structure of the axially recessed upshifting initiation tooth SP1U of the sprocket SP1 can apply to the sprockets SP9 to SP12. As seen in FIG. 39, for example, the structure of the axially recessed upshifting initiation tooth SP1U can apply to the sprocket teeth SP9B of the sprocket SP9. In this modification, the plurality of sprocket teeth SP9B can include at least one axially recessed upshifting initiation tooth SP9U recessed axially with respect to the rotational center axis A1. Specifically, the at least one axially recessed upshifting initiation tooth SP9U includes a first axially recessed upshifting initiation tooth SP9UA, a second axially recessed upshifting initiation tooth SP9UB, a third axially recessed upshifting initiation tooth SP9UC, and a fourth axially recessed upshifting initiation tooth SP9UD.

Figure 40:
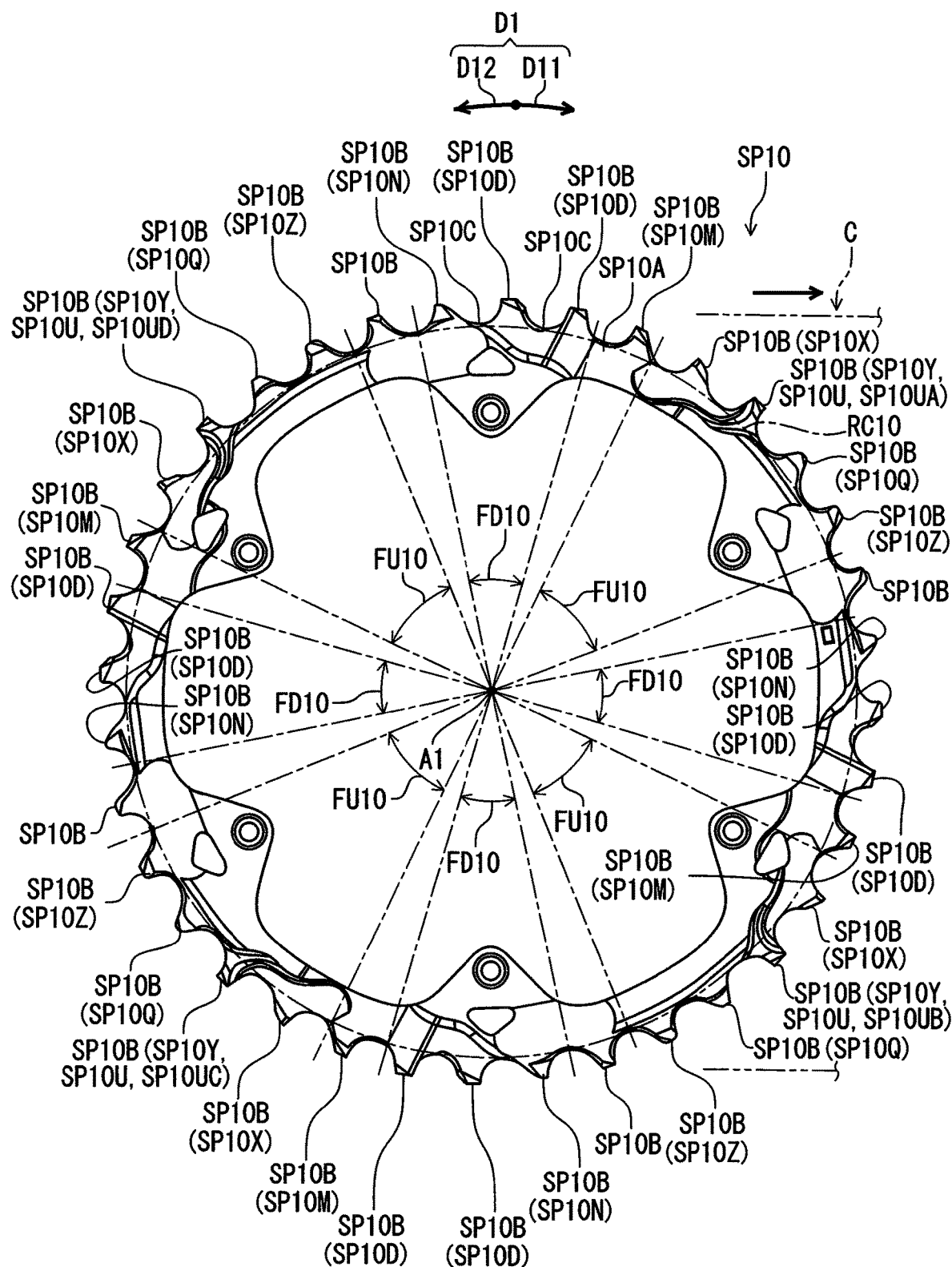
FIG. 40 is a side elevational view of a sprocket in accordance with a modification of the sprocket illustrated in FIG. 13.

As seen in FIG. 40, the structure of the axially recessed upshifting initiation tooth SP1U can apply to the sprocket teeth SP10B of the sprocket SP10. In this modification, the plurality of sprocket teeth SP10B can include at least one axially recessed upshifting initiation tooth SP10U recessed axially with respect to the rotational center axis A1. Specifically, the at least one axially recessed upshifting initiation tooth SP10U includes a first axially recessed upshifting initiation tooth SP10UA, a second axially recessed upshifting initiation tooth SP10UB, a third axially recessed upshifting initiation tooth SP10UC, and a fourth axially recessed upshifting initiation tooth SP10UD.

Figure 41:
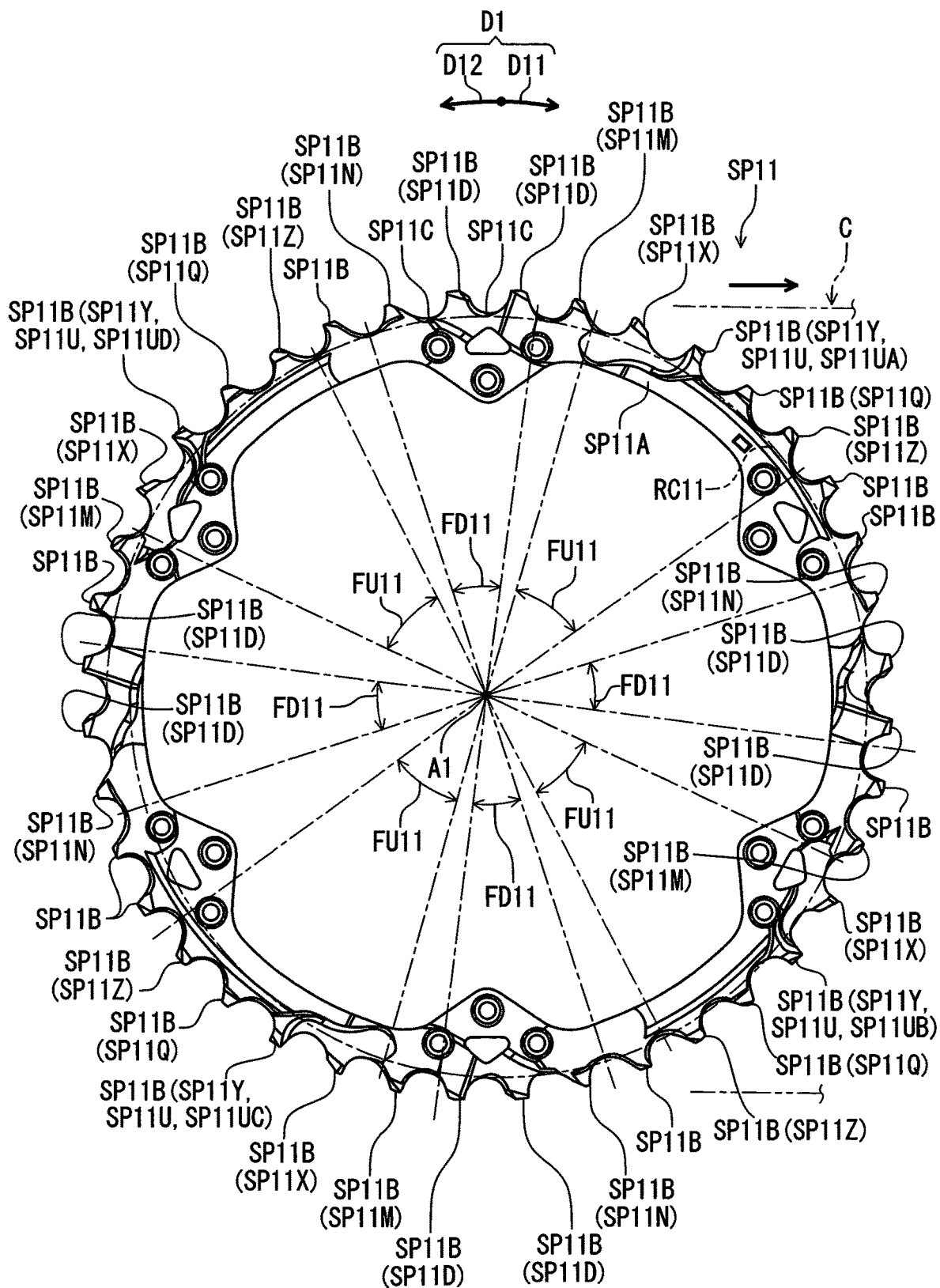
FIG. 41 is a side elevational view of a sprocket in accordance with a modification of the sprocket illustrated in FIG. 14.

As seen in FIG. 41, the structure of the axially recessed upshifting initiation tooth SP1U can apply to the sprocket teeth SP11B of the sprocket SP11. In this modification, the plurality of sprocket teeth SP11B can include at least one axially recessed upshifting initiation tooth SP11U recessed axially with respect to the rotational center axis A1. Specifically, the at least one axially recessed upshifting initiation tooth SP11U includes a first axially recessed upshifting initiation tooth SP11UA, a second axially recessed upshifting initiation tooth SP11UB, a third axially recessed upshifting initiation tooth SP11UC, and a fourth axially recessed upshifting initiation tooth SP11UD.

Figure 42:
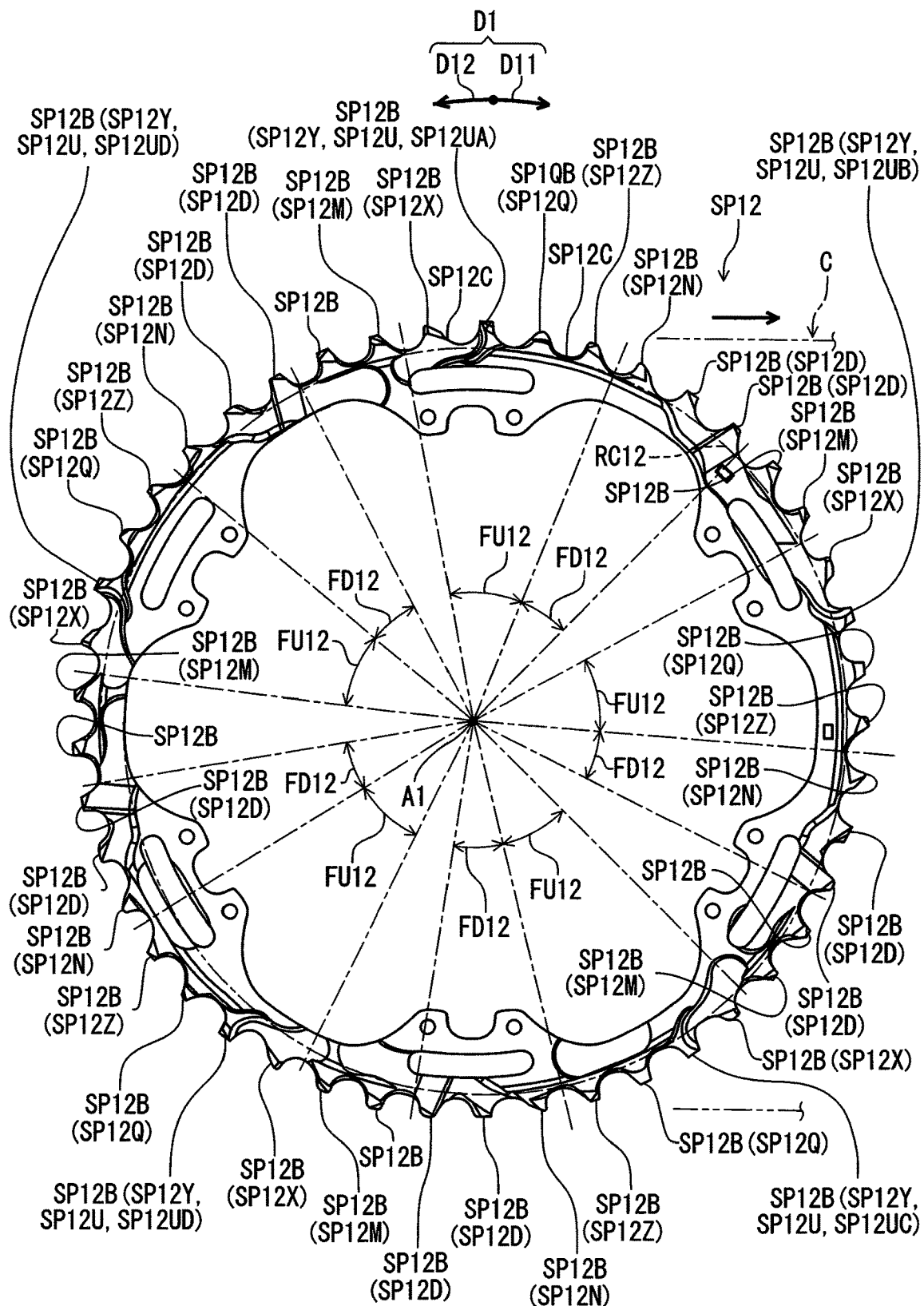
FIG. 42 is a side elevational view of a sprocket in accordance with a modification of the sprocket illustrated in FIG. 15.

As seen in FIG. 42, the structure of the axially recessed upshifting initiation tooth SP1U can apply to the sprocket teeth SP12B of the sprocket SP12. In this modification, the plurality of sprocket teeth SP12B can include at least one axially recessed upshifting initiation tooth SP12U recessed axially with respect to the rotational center axis A1. Specifically, the at least one axially recessed upshifting initiation tooth SP12U includes a first axially recessed upshifting initiation tooth SP12UA, a second axially recessed upshifting initiation tooth SP12UB, a third axially recessed upshifting initiation tooth SP12UC, a fourth axially recessed upshifting initiation tooth SP12UD, and a fifth axially recessed upshifting initiation tooth SP12UE.

In the above embodiment, the sprocket teeth have substantially the same axial width as each other. However, an axial width of the sprocket tooth can be different from an axial width of another sprocket tooth. For example, the sprocket teeth can have an inner-link engaging tooth and an outer link engaging tooth. An axial width of the outer-link engaging tooth is larger than an axial width of the inner-link engaging tooth. The axial width of the outer-link tooth engaging is larger than an axial distance provided between the opposed pair of inner link plates and is smaller than an axial distance provided between the opposed pair of outer link plates. The axial width of the inner-link engaging tooth is smaller than the axial distance of the opposed inner link plates.

In the above embodiment, as seen in FIG. 1, the crank assembly 2 includes the front sprocket 2D as a single sprocket. However, the crank assembly 2 can include a plurality of sprockets. When the crank assembly 2 includes the front sprocket 2D as a single sprocket, it is possible to save weight of the bicycle drive train 11. When the crank assembly 2 includes a plurality of sprockets, it is possible to increase a total number of shift gear stages of the bicycle drive train 11.

In the above embodiment, as seen in FIG. 43, the combination of the total tooth numbers of the sprockets SP1 to SP12 is 10, 12, 14, 16, 18, 21, 24, 28, 32, 36, 40, and 45. However, the bicycle multiple sprocket 12 can have other combinations of the total tooth numbers of the sprocket SP1 to SP12. For example, another combination of the total tooth numbers of the sprockets SP1 to SP12 can be 10, 12, 14, 16, 18, 21, 24, 28, 33, 39, 45, and 51. In a case where the total number of sprockets is 11, another combination of the total tooth numbers of the sprockets SP1 to SP12 can be 10, 12, 14, 16, 18, 21, 24, 28, 33, 39, and 45.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body including a first axially-facing surface and a second axially-facing surface which face in an axial direction with respect to a rotational center axis of the bicycle sprocket, the second axially-facing surface being provided on a reverse side of the first axially-facing surface in the axial direction, the first axially-facing surface being configured to face toward a center plane of a bicycle in an assembled state where the bicycle sprocket is mounted to the bicycle;
a plurality of sprocket teeth extending radially outwardly from the sprocket body with respect to the rotational center axis;
at least one upshifting facilitation area configured to facilitate shifting a bicycle chain from the bicycle sprocket toward a smaller sprocket adjacent to the bicycle sprocket without another sprocket therebetween in the axial direction;
the plurality of sprocket teeth including at least one axially recessed upshifting initiation tooth recessed axially with respect to the rotational center axis;
the at least one axially recessed upshifting initiation tooth being disposed in the at least one upshifting facilitation area and being configured to disengage an inner link plate of the bicycle chain from the at least one axially recessed upshifting initiation tooth during an upshifting operation in which the bicycle chain shifts from the bicycle sprocket toward the smaller sprocket;
the at least one axially recessed upshifting initiation tooth including a driving surface, a non-driving surface and a tooth tip portion;
the driving surface including a driving-surface-side tooth tip end;
the non-driving surface including a non-driving-surface-side tooth tip end;
the tooth tip portion connecting the driving-surface-side tooth tip end and the non-driving-surface-side tooth tip end;
the non-driving surface extending from the non-driving-surface-side tooth tip end in a circumferential direction with respect to the rotational center axis;
the non-driving surface including a non-driving surface protrusion disposed radially inwardly from the non-driving surface side tooth tip end with respect to the rotational center axis; and
the non-driving surface protrusion having a protrusion tip disposed closer to the second axially-facing surface than the non-driving-surface-side tooth tip end in the axial direction so that a guiding slope extends from the protrusion tip toward the first axially-facing surface.

2. The bicycle sprocket according to claim 1, wherein the protrusion tip is disposed radially inwardly from the non-driving-surface-side tooth tip end with respect to the rotational center axis.

3. The bicycle sprocket according to claim 1, wherein the protrusion tip is disposed radially outwardly from a tooth bottom circle of the bicycle sprocket with respect to the rotational center axis.

4. The bicycle sprocket according to claim 1, wherein the plurality of sprocket teeth includes a lastly chain-engaging tooth adjacent to the at least one axially recessed upshifting initiation tooth,
the lastly chain-engaging tooth is disposed on a downstream side of the at least one axially recessed upshifting initiation tooth with respect to a rotational driving direction, and
the lastly chain-engaging tooth is configured to lastly disengage from an outer link plate of the bicycle chain in the upshifting operation.

5. The bicycle sprocket according to claim 1, wherein the plurality of sprocket teeth includes at least one axially recessed tooth adjacent to the at least one axially recessed upshifting initiation tooth without another tooth in a circumferential direction with respect to the rotational center axis on an upstream side of the at least one axially recessed upshifting initiation tooth with respect to a rotational driving direction.

6. The bicycle sprocket according to claim 1, wherein
the at least one axially recessed upshifting initiation tooth includes a plurality of axially recessed upshifting initiation teeth.

7. The bicycle sprocket according to claim 1, wherein
the at least one axially recessed upshifting initiation tooth includes a first axially recessed upshifting initiation tooth and a second axially recessed upshifting initiation tooth, and
a total tooth number of the bicycle sprocket is equal to or larger than 11.

8. The bicycle sprocket according to claim 1, wherein
the at least one axially recessed upshifting initiation tooth includes a first axially recessed upshifting initiation tooth, a second axially recessed upshifting initiation tooth, and a third axially recessed upshifting initiation tooth, and
a total tooth number of the bicycle sprocket is equal to or larger than 19.

9. The bicycle sprocket according to claim 1, wherein
the at least one axially recessed upshifting initiation tooth includes a first axially recessed upshifting initiation tooth, a second axially recessed upshifting initiation tooth, a third axially recessed upshifting initiation tooth, and a fourth axially recessed upshifting initiation tooth, and
a total tooth number of the bicycle sprocket is equal to or larger than 25.

10. The bicycle sprocket according to claim 1, wherein
the at least one axially recessed upshifting initiation tooth includes a first axially recessed upshifting initiation tooth, a second axially recessed upshifting initiation tooth, a third axially recessed upshifting initiation tooth, a fourth axially recessed upshifting initiation tooth, and a fifth axially recessed upshifting initiation tooth, and
a total tooth number of the bicycle sprocket is equal to or larger than 41.

11. A bicycle drive train comprising:
the bicycle sprocket according to claim 1; and
a bicycle chain comprising an inner link plate including:
    a first inner-link end portion;
    a second inner-link end portion; and
    an inner-link intermediate portion interconnecting the first inner-link end portion and the second inner-link end portion.

12. The bicycle drive train according to claim 11, wherein
the first inner-link end portion has a first longitudinally elongated edge in a longitudinal direction with respect to a longitudinal centerline of the inner link plate,
the first longitudinally elongated edge extends in a first longitudinal direction defined from the second inner-link end portion toward the first inner-link end portion along the longitudinal direction, and
the first longitudinally elongated edge is configured to support one of the plurality of sprocket teeth of the bicycle sprocket in the axial direction in an engagement state where the one of the plurality of sprocket teeth is positioned in an outer link space defined between a pair of outer link plates of the bicycle chain.

13. The bicycle drive train according to claim 12, wherein
the second inner-link end portion has a second longitudinally elongated edge in the longitudinal direction,
the second longitudinally elongated edge extends in a second longitudinal direction defined from the first inner-link end portion toward the second inner-link end portion along the longitudinal direction, and
the second longitudinally elongated edge is configured to support one of the plurality of sprocket teeth of the bicycle sprocket in the axial direction in an engagement state where the one of the plurality of sprocket teeth is positioned in an outer link space defined between a pair of outer link plates of the bicycle chain.

* * * * *